United States Patent
Chen et al.

(10) Patent No.: US 9,070,491 B2
(45) Date of Patent: Jun. 30, 2015

(54) POLYMER NANOCOMPOSITES FOR ELECTRONIC APPLICATIONS

(71) Applicant: SABIC Global Technologies B.V., Bergen op zoom (NL)

(72) Inventors: Qin Chen, Schenectady, NY (US); Norberto Silvi, Clifton Park, NY (US); John Krahn, Schenectady, NY (US); Anne Bolvari, West Chester, PA (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 92 days.

(21) Appl. No.: 13/621,754

(22) Filed: Sep. 17, 2012

(65) Prior Publication Data
US 2014/0080935 A1    Mar. 20, 2014

(51) Int. Cl.
*H01B 3/30* (2006.01)
*C08K 3/18* (2006.01)
*C08K 3/30* (2006.01)

(52) U.S. Cl.
CPC .. *H01B 3/30* (2013.01); *C08K 3/18* (2013.01); *C08K 3/30* (2013.01)

(58) Field of Classification Search
CPC .......... H02G 15/00; C08K 3/189; C08K 9/00; H01B 3/30
USPC ........... 521/180; 524/602, 430, 413, 497, 493
See application file for complete search history.

(56) References Cited

U.S. PATENT DOCUMENTS

| | | |
|---|---|---|
| 3,875,116 A | 4/1975 | Heath et al. |
| 4,548,997 A | 10/1985 | Mellinger et al. |
| 4,629,759 A | 12/1986 | Rock |
| 4,690,997 A | 9/1987 | Cella et al. |
| 4,808,686 A | 2/1989 | Cella et al. |
| 4,816,527 A | 3/1989 | Rock |
| 5,229,482 A | 7/1993 | Brunelle |
| 6,310,145 B1 | 10/2001 | Puyenbroek et al. |
| 6,355,723 B1 | 3/2002 | van Baal et al. |
| 6,919,422 B2 | 7/2005 | Gallucci et al. |
| 7,041,773 B2 | 5/2006 | Gallucci et al. |
| 7,230,066 B2 | 6/2007 | Khouri et al. |
| 2005/0256240 A1 | 11/2005 | Nelson |
| 2007/0199729 A1* | 8/2007 | Siegel et al. ................. 174/73.1 |

FOREIGN PATENT DOCUMENTS

| | | |
|---|---|---|
| DE | 102010019723 | 11/2011 |
| WO | WO 9642089 | 12/1996 |
| WO | WO 2011092533 | 8/2011 |
| WO | WO 2011095208 | 8/2011 |

OTHER PUBLICATIONS

Aliev et al.,"Porous silica and polysilsesquioxane with covalently linked phosphonates and phosphonic acids," *J. Mater. Chem.*, 10, 2758-2764 (2000).

(Continued)

*Primary Examiner* — Robert Harlan
(74) *Attorney, Agent, or Firm* — Baker & Hostetler LLP

(57) ABSTRACT

Disclosed herein are nanocomposite materials, devices thereof and methods thereof with a dielectric constant and corona resistance while having an increased or substantially maintained energy density, breakdown strength and/or dissipation factor relative to the polymer.

43 Claims, 36 Drawing Sheets

(56) References Cited

OTHER PUBLICATIONS

Jain, P. et al., "Embedded Thin Film Capacitors—Theoretical Limits," IEEE Transactions on Advanced Packaging, vol. 25, No. 3, August 2002, pp. 454-458.

Kim et al., "Phosphonic acid-modiried barium titanate polymer nanocomposites with high permittivity and dielectric strength," *Adv. Mater.* 19:7, pp. 1001-1005 (2007).

Li, H. et al., "Dielectric properties of polyimide / Al2O3 hybrids synthesized by in-situ polymerization," Materials Letters; vol. 61, Issue, 7, Mar. 2007, pp. 1507-1511.

McPherson, J. et al. "Proposed Universal Relationship Between Dielectric Breakdown and Dielectric Constant," Electron Devices Meeting, 2002. IEDM '02. Digest. International Issue Date: 2002, pp. 633-636.

International Search Report issued Nov. 29, 2013 by the International Searching Authority for PCT Application PCT/US2013/060135 filed Sep. 17, 2013 (Inventor—Qin Chen // Applicant—SABIC Innovative Plastics IP, B.V.) (5 pages).

Written Opinion issued Nov. 29, 2013 by the International Searching Authority for PCT Application PCT/US2013/060135 filed Sep. 17, 2013 (Inventor—Qin Chen // Applicant—SABIC Innovative Plastics IP, B.V.) (5 pages).

\* cited by examiner

A.

B.

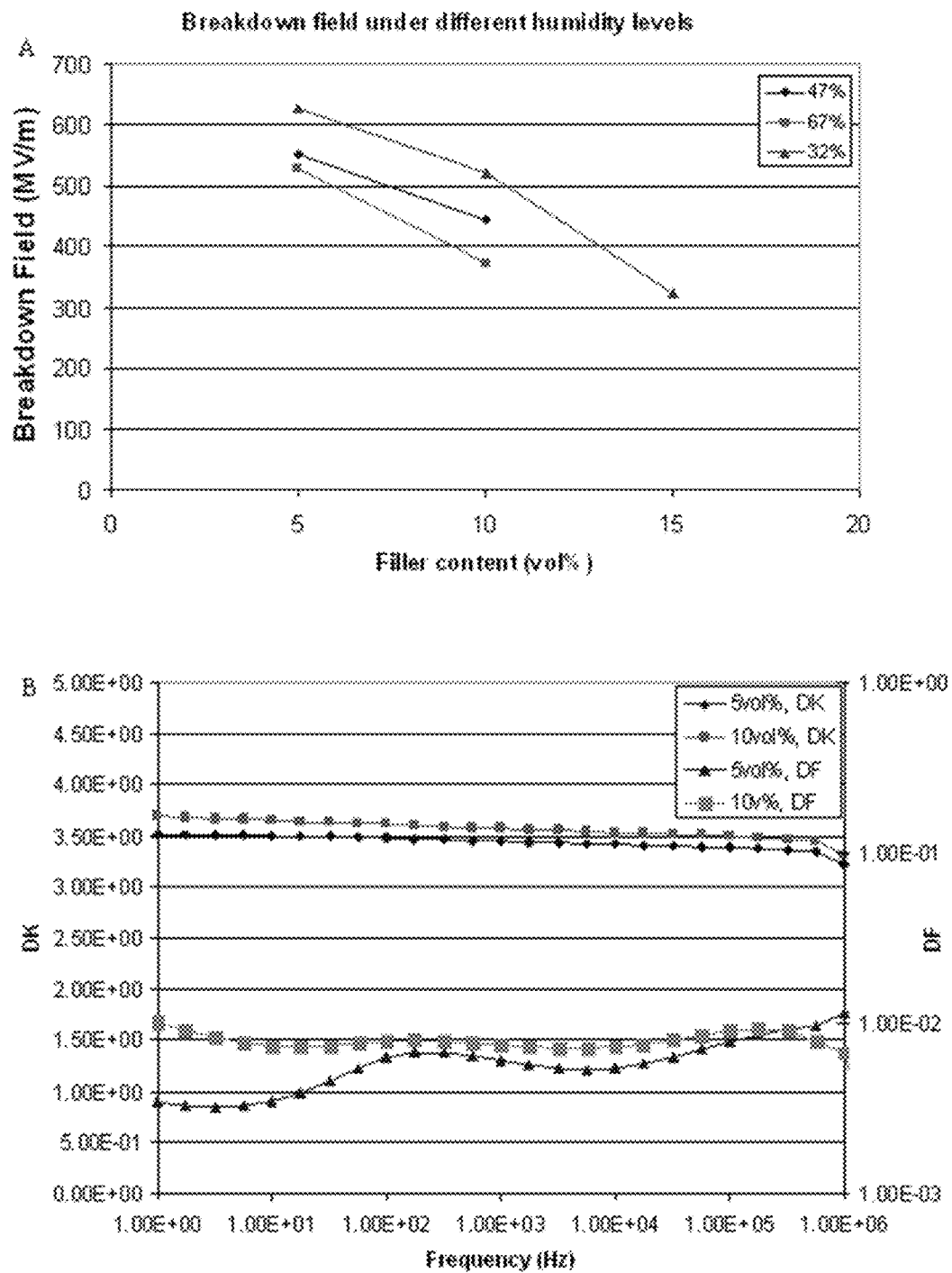
Fig. 29A and B

A.

B.

POLYMER NANOCOMPOSITES FOR ELECTRONIC APPLICATIONS

BACKGROUND

1. Technical Field

The present disclosure relates to nanocomposite materials.

2. Technical Background

Energy Density and Corona Resistance (or Voltage Endurance) are two critical properties that are commonly used to characterize the performance of materials targeted for insulation and capacitor applications. A common problem in such dielectric designs involves the maximization of both energy density and voltage endurance. One of the strategies that have been used to improve both of these dielectric properties in the case of plastic materials involves the addition of inorganic fillers of nanometer size to the polymeric matrix. Polymers have relatively high dielectric breakdown strengths but relatively low dielectric constant (DK). Inorganic fillers have high DK but relatively low dielectric breakdown strength. Composite polymeric materials, containing a high breakdown strength polymer as the continuous phase and a high DK filler as the dispersed phase, can offer an alternative in the design of materials for insulation applications that require improved energy density and/or corona resistance.

A classical approach that has been used in the literature to produce materials of improved dielectric properties is to add high DK fillers to polymers in an effort to increase both the voltage endurance and energy density of the starting polymer. Such materials can be useful in capacitors and/or supercapacitors which have an estimated market of about $ 400 million per year. Supercapacitors developed to date typically have high power density, but lack sufficient energy density to be utilized in many applications. The lack of energy density can result in rapid charge and discharge of the supercapacitor and can restrict power output to a period of a few seconds. There is a strong interest in increasing the energy density of supercapacitors to more closely approximate that available for conventional commercial batteries.

Accordingly, there is a need for nanocomposites materials, devices thereof and methods thereof that have a high DK and corona resistance while having an increased or substantially maintained energy density, breakdown strength and dissipation factor (DF) relative to the polymer. Such nanocomposites materials, devices using such nanocomposites, and methods are described herein.

SUMMARY

In accordance with the purpose(s) of the invention, as embodied and broadly described herein, this disclosure, in one aspect, relates to nanocomposites materials, and specifically to nanocomposites materials having an increased or substantially maintained energy density, breakdown strength and dissipation factor (DF) relative to the polymer.

Disclosed herein are nanocomposites comprising a continuous polymer phase comprising a polymeric material that exhibits a base corona resistance, a base DK value $K_1$, a base energy density, and a base dielectric breakdown strength; and a dispersed particulate phase comprising a nano particulate inorganic filler material that exhibits a DK value $K_2$, wherein the value of $K_2$ is greater than $K_1$ and wherein the nano particulate inorganic filler material is dispersed within the continuous polymer phase; and wherein the nanocomposite exhibits a corona resistance that is greater than the base corona resistance of the polymeric material.

The nanocomposites can have a high DK and improved corona resistance compared to the unfilled polymer. The nanocomposites have a higher corona resistance (or voltage endurance) and high DK compared to the polymeric material, and a dielectric breakdown strength and energy density similar or slightly lower than those for the unfilled polymer. Further, the DF of these nanocomposites made from a polymer and a filler can be below 1% and be similar or slightly increased with the addition of fillers of increasing DK compared to the unfilled polymer.

Also disclosed herein are thin films made from these nanocomposite materials that can be used as dielectric layers in electronic applications, such as capacitors and supercapacitors. The films used in these applications can be, for example, 10 μm in thickness or less, and can be made by either solution (solvent cast) or melt (extrusion) processes.

Also disclosed herein are articles of manufacturer or devices that comprise a nanocomposite. Such devices can be, for example, capacitors or supercapacitors.

Also disclosed herein are methods of making nanocomposites comprising the step of a. dispersing a nano particulate inorganic filler material in a solvent; b. making a system by dissolving a polymeric material in the solvent; and c. casting a nanocomposite material from the system. The nanocomposites can be any nanocomposite described herein. An alternative method to make these nanocomposites is to use mixing equipment, such as mixers and extruders, in which the filler is uniformly dispersed into a polymer melt to form the nanocomposite. In this case, there is no solvent used to affect the dispersion of the filler into the polymer.

BRIEF DESCRIPTION OF THE FIGURES

The accompanying figures, which are incorporated in and constitute a part of this specification, illustrate several aspects and together with the description serve to explain the principles of the invention.

FIGS. 29A and 29B show the dielectric breakdown strength, DK and DF of nanocomposites with fumed silica (average primary particle size 12 nm) at different humidity levels in ULTEM 1000.

Figure 1:
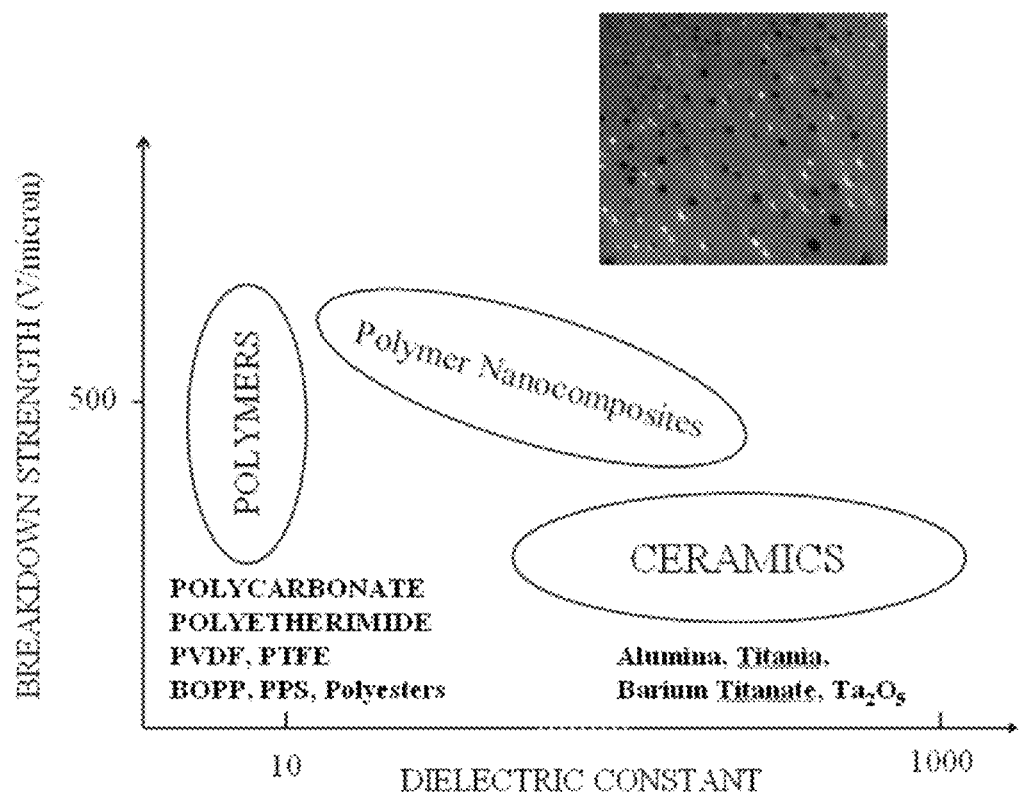
FIG. 1 shows the relationship of different materials relative to their dielectric breakdown strength and DK.
Figure 2:
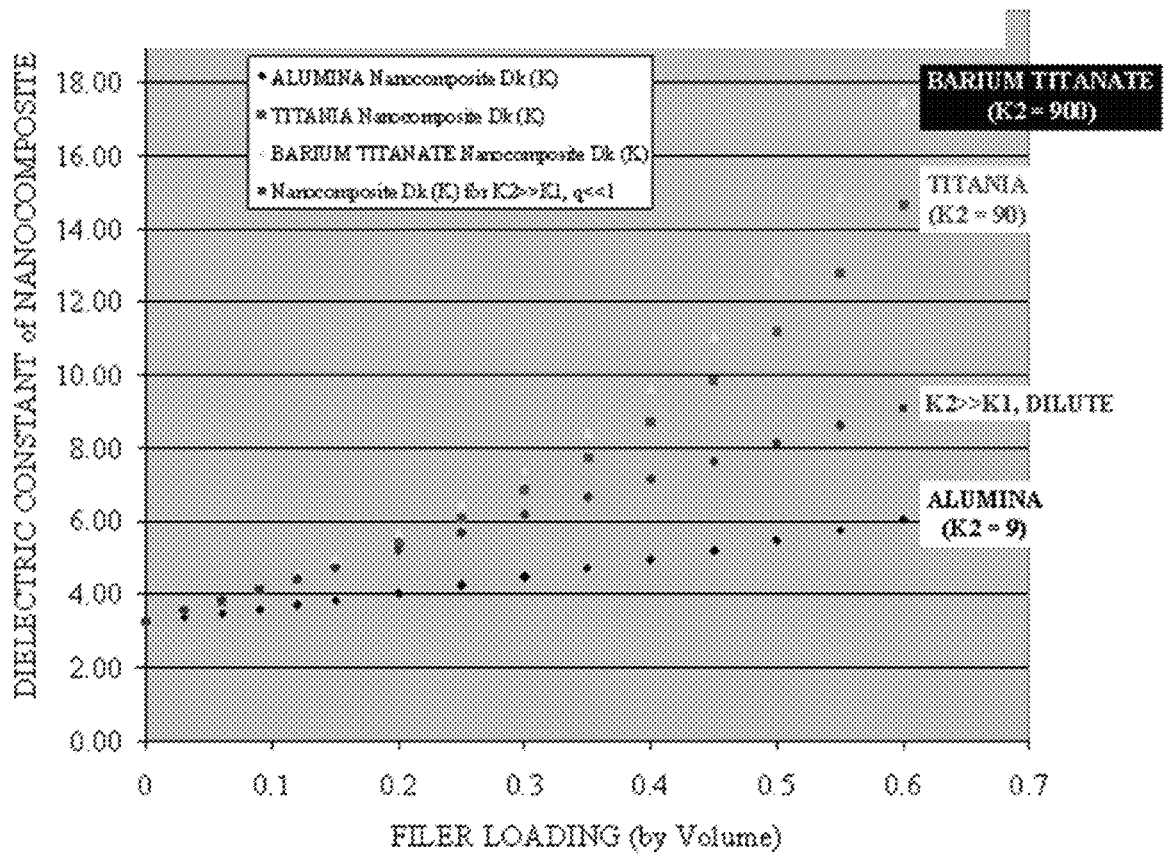
FIG. 2 shows the modeling results of the increase in DK of a nanocomposite by the addition of different fillers at different concentrations.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a nanocomposite" includes mixtures of two or more nanocomposites, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "corona resistance" and "voltage endurance" are used interchangeably and refer to the ability of an insulating material to withstand a specified level of field-intensified ionization to prevent its immediate, complete breakdown. The corona resistance or voltage endurance is measured in terms of the time it takes for the material to fail under specified conditions of temperature, frequency, and intensity of an electric field.

The terms "dielectric breakdown strength" and breakdown strength" are used interchangeably and refer to the maximum electric field strength that a material can withstand intrinsically without breaking down, for example, without experiencing failure of its insulating properties. For example, the breakdown strength of an electrical insulator is measured by applying a rising voltage to a sample of the material of known thickness until it fails, and it is calculated as the ratio between the voltage required for breakdown and the thickness of the material at the point where breakdown occurred, and it is expressed in kV/mm or V/μm.

As used herein, the term "dissipation factor" or "DF" or the like terms refer to the irreversible transformation of electric energy into a less usable form of energy such as heat. Thus, dielectric materials having large DFs produce electronic devices of reduced energy-storing capability.

As used herein, the term "energy density" or the like terms refers to amount of energy stored in a given system or region of space per unit volume. For example, the energy density of a capacitor is the amount of electrical energy that the capacitor can store per unit volume of the capacitor, and it is measured in Joule per cubic centimeter (cc) of capacitor. The energy density of an insulating material, in general, depends on the DK of the material and the square of its dielectric breakdown strength.

As used herein, the term "nano particulate inorganic filler material", "filler material" or "filler" are used interchangeably and refer to a material, such as an inorganic material, that can be embedded into a polymeric material to form a nanocomposite.

As used herein, the term "interface modifier" or the like terms refer to a substance that changes the interaction between a filler and polymer. For example, an interface modifier can make the filler more compatible with polymer. As a result, the dielectric breakdown strength can be retained at a higher value, for example, a nanocomposite with an interface modifier can have a breakdown strength that is closer to the polymer's breakdown strength compared to a nanocomposite without an interface modifier.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed function and it is understood that there are a variety of structures that can perform the same function that are related to the disclosed structures, and that these structures will typically achieve the same result.

B. COMPOSITIONS

Disclosed herein are dielectric nanocomposites, comprising a continuous polymer phase comprising a polymeric material that exhibits a base corona resistance, a base DK value $K_1$, a base energy density, and a base dielectric breakdown strength; and a dispersed particulate phase comprising a nano particulate inorganic filler material that exhibits a DK value $K_2$, wherein the value of $K_2$ is greater than $K_1$ and wherein the nano particulate inorganic filler material is dispersed within the continuous polymer phase; and wherein the nanocomposite exhibits a corona resistance that is greater than the base corona resistance of the polymeric material.

In one aspect, the filler can be dispersed homogenously within the continuous polymer phase. Homogenous dispersion can increase the breakdown strength of the nanocomposite compared to a nanocomposite with heterogeneous dispersion of the filler within the continuous polymer phase.

In one aspect, the nanocomposite can exhibit an energy density that is not less than the base energy density of the polymeric material within the error of the techniques used to measure/calculate energy densities. In another aspect, the nanocomposite can exhibit an energy density that is not less than 50%, 60%, 70%, 75%, 80%, 85%, 90%, 95%, 96%, 97%, 98% or 99% of the base energy density of the polymeric material. In a another aspect, the nanocomposite can exhibit an energy density that is not less than 65% of the base energy density of the polymeric material. In a another aspect, the nanocomposite can exhibit an energy density that is not less than 75%, 85% or 90% of the base energy density of the polymeric material.

In one aspect, the nanocomposite can exhibit a dielectric breakdown strength that is not less than the base dielectric breakdown strength of the polymeric material. In another aspect, the nanocomposite can exhibit a dielectric breakdown strength that is not less than 50%, 60%, 70%, 75%, 80%, 85%, 90%, 95%, 96%, 97%, 98% or 99% of the base dielectric breakdown strength of the polymeric material. In another aspect, the nanocomposite can exhibit a dielectric breakdown strength that is not less than 80% of the base dielectric breakdown strength of the polymeric material. In another aspect, the nanocomposite can exhibit a dielectric breakdown strength that is not less than 90% of the base dielectric breakdown strength of the polymeric material.

In one aspect, the nanocomposite can exhibit a corona resistance that is substantially greater than the base corona resistance of the polymeric material. For example, the nanocomposite can exhibit a corona resistance that is at least 3, 6, 9, 12, 15, 20, 25, 30, 40, 50, 60, 70, 80, 90 or 100 times greater than the base corona resistance of the polymeric material. In a another aspect, the nanocomposite can exhibit a corona resistance that is at least 6, 12 or 50 times greater than the base corona resistance of the polymeric material. In a more another aspect, the nanocomposite can exhibit a corona resistance that is at least 6 times greater than the base corona resistance of the polymeric material. In another aspect, the nanocomposite can exhibit a corona resistance that is at least 50 times greater than the base corona resistance of the polymeric material.

In one aspect, $K_2$ can be greater than $K_1$. For example, $K_2$ can be substantially greater than $K_1$. $K_2$ can, for example, be at least 1.5, 2, 3, 5, 8, 11, 15, 20, 25, 30, 40, 50, 100, 200, 300, 500, 1,000 or 2,000 times greater than $K_1$. In another aspect, $K_2$ can be at least 2 or 30 times greater than $K_1$. In a more another aspect, $K_2$ can be at least 30 times greater than In one aspect, the nanocomposite can have a DK that is greater than the DK of the polymeric material. For example, the nanocomposite can have a DK that is at least 10%, 25%, 40%, 60%, 80%, 100%, 200%, 300%, or 500% greater than the DK of the polymeric material. In another aspect, the nanocomposite can have a DK that is at least 25%, 60%, or 300% greater than the DK of the polymeric material.

In one aspect, the polymeric material exhibits a base DF. The DF of nanocomposite can be substantially similar to the base DF of the polymeric material. In one aspect, the base DF and the DF of the nanocomposite can be less than 0.01%, 0.05%, 0.10%, 0.25%, 0.50%, 0.75% or 1.0%. In another aspect, the base DF and the DF of the nanocomposite can be less than 1.0%. In one aspect, the DF of the nanocomposite can be less than 5, 4, 3, 2, 1, 0.5, 0.25 or 0.10 times greater than the base DF of the polymeric material.

1. Modeling of Nanocomposites

The DK of a nanocomposite can be determined by equation (I):

$$K = K_1\left\{1 + \frac{nq(K_2 - K_1)}{nK_1 + (K_2 - K_1)(1 - q)}\right\} \quad \text{Equation (I)}$$

wherein K is the DK of the nanocomposite, $K_1$ is the DK of the polymer, $K_2$ is the DK of the filler (i.e. nanoparticle), q is the volume fraction of the filler, and n is a shape related parameter (n=3 for spheres). The addition of a filler to a polymer usually decreases the breakdown strength of the polymer and increases its dissipation factor. Accordingly, nanocomposites with low filler loading are desired. Thus, if $q \ll 1$, then $(1-q) \rightarrow 1$ providing for Equation (II) as follows:

$$K = K_1\left\{1 + \frac{nq(K2 - K1)}{nK_1 + (K_2 - K_1)}\right\}. \quad \text{Equation (II)}$$

Thus, adding a filler with a higher DK than the polymer would be beneficial. If $K_2 \gg K_1$, then $(K_2-K_1) \rightarrow K_2$, and $(K_2-K_1) > nK_1$, therefore for dilute systems the DK for a nanocomposite with a filler having a high DK can be expressed by equation (III) as follows:

$$K = K_1(1+nq) \quad \text{Equation (III)}$$

Equation (III) is applicable when q is smaller than about 0.20 and $K_2$ is at least 30 times greater than $K_1$. In such system the DK of the nanocomposite is independent of the filler's DK as long as the filler's DK is at least 30 times greater than the polymer's DK. FIG. 3 shows that the model predicts a nanocomposite's DK as high as 5.5 for a dilute system, regardless of the filler's DK as long as the filler's DK is at least 30 times greater than the polymer's DK.

The energy density of a material, such as a nanocomposite or polymer, can be determined by Equation (IV):

$$D=(Dk\in_0 E_{BD}^2)/2 \quad \text{Equation (IV)}$$

where D is the energy density, Dk is the relative DK for the medium, $\in_0$ is the permittivity of free space (equal to 8.85× $10^{-14}$ F/cm) and $E_{BD}$ is the dielectric breakdown strength. The $E_{BD}$ of ULTEM 1000 is approximately 600 V/µ, and its DK is approximately 3.2. These values combine for an energy density of Ultem 1000 equal to about 5 J/cc.

Experimentally, the DK of a material is calculated from the measured capacitance and dimensions of a specimen of the material using dielectric spectroscopy.

Experimental results in the literature correlate the breakdown strength of a dielectric material with the inverse of the square root of the DK of the material (Pushkar Jain, *Student Member, IEEE*, and Eugene J. Rymaszewski, *Life Senior Member, IEEE*, IEEE TRANSACTIONS ON ADVANCED PACKAGING, 25:3, (2002); J. McPherson, et al., Electron Devices Meeting, 2002. IEDM '02. Digest. International, 2002, 633-636 (2002).

2. Polymer

The polymeric material or polymer can be a homopolymer or copolymer. The polymeric material can comprise one or more polymers.

The polymeric material can have an average molecular weight (MW) of at least 5,000, 10,000, 20,000, 30,000, 50,000, 100,000 or 1,000,000. The polymeric material can have an average molecular weight (MW) less than 5,000, 10,000, 20,000, 30,000, 50,000, 100,000 or 1,000,000. In one aspect, the polymeric material can have an average molecular weight of about 20,000 to about 70,000. For example, the polymeric material can have an average molecular weight of about 20,000, 30,000, 40,000, 50,000, 60,000, or 70,000.

The polymeric material can be soluble in one or more solvents, such as organic solvents. Suitable organic solvents include but are not limited to, acetone, toluene, dichloromethane, N-Methyl-2-pyrrolidone (NMP), tetrahydrofuran, chloroform, veratrole, anisole, chlorobenzeen, sulfolane, orthodichlorobenzene (ODCB), dimethylformamide (DMF), dimethylacetamide (DMAC), or a mixture thereof. In another aspect, the polymeric material is soluble in NMP. In one aspect, the filler can be dispersed in the suitable solvent for the polymeric material.

Polymeric materials or polymers include, but are not limited to, polyetherimide, polyesters, polystyrenes, polyethers, polyamides, polyurethane, polyethylene, polyethylene oxide or polyethylene glycol (PEG), polylactides, such as polylactic acid (PLA) and poly(lactic-co-glycolic acid) PLGA, polyvinylidene fluoride (PVDF), polyimides, polymethylmethacrylate (PMMA), polycarbonates, cyanated polycarbonate, cyanated polyetherimide, cyanated polysulfone, polyphenylene oxides, or polyvinyl chloride. In another aspect, the polymeric material can comprise a polyetherimide (PEI).

a. Polyether Imide

In an aspect, the polymeric material can comprise polyetherimides and polyetherimides copolymers. The polyetherimide can be selected from (i) polyetherimidehomopolymers, e.g., polyetherimides, (ii) polyetherimide co-polymers, e.g., polyetherimidesulfones, and (iii) combinations thereof. Polyetherimides are known polymers and are sold by SABIC Innovative Plastics under the ULTEM®*, EXTEM®*, and Siltem* brands (Trademark of SABIC Innovative Plastics IP B.V.).

In an aspect, the polyetherimides can be of formula (1):

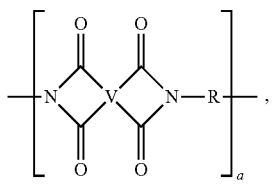

(1)

wherein a is more than 1, for example 10 to 1,000 or more, or more specifically 10 to 500. In one example, n can be 10-100, 10-75, 10-50 or 10-25.

The group V in formula (1) is a tetravalent linker containing an ether group (a "polyetherimide" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

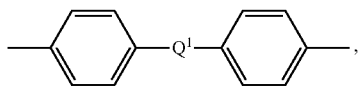

(2)

wherein Q1 includes but is not limited to a divalent moiety such as —O—, —S—, —C(O)—, —SO2-, —SO—, -CyH2y- (y being an integer from 1 to 5), and halogenated derivatives thereof, including perfluoroalkylene groups.

In an embodiment, linkers V include but are not limited to tetravalent aromatic groups of formula (3):

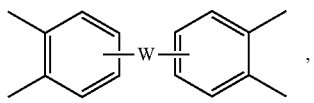

(3)

wherein W is a divalent moiety including —O—, —SO2—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

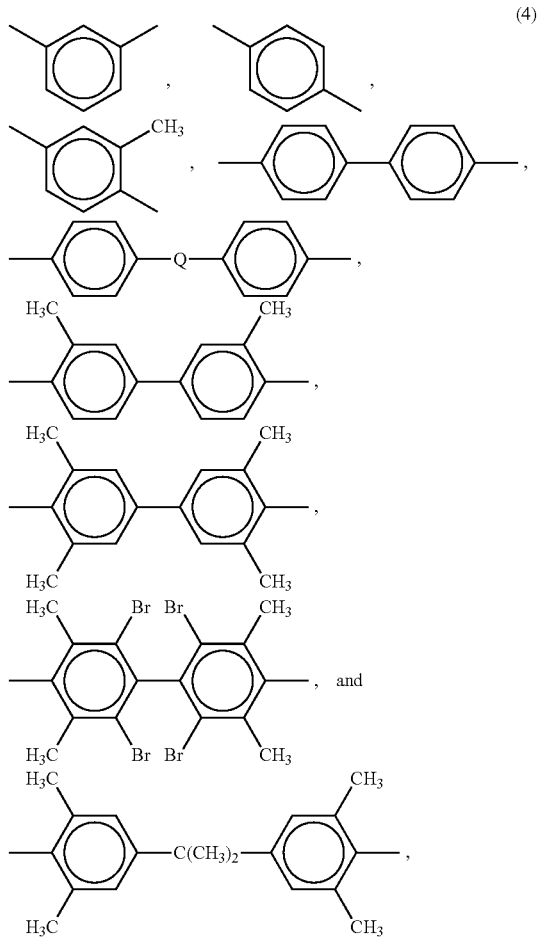

(4)

wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In an aspect, the polyetherimide comprise more than 1, specifically 10 to 1,000, or more specifically, 10 to 500 structural units, of formula (5):

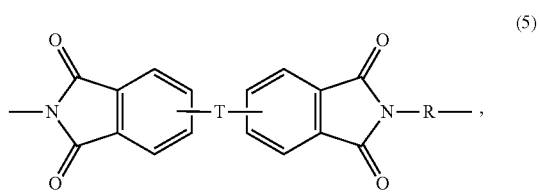

(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another aspect, the polyetherimidesulfones are polyetherimides comprising ether groups and sulfone groups wherein at least 50 mole % of the linkers V and the groups R in formula (1) comprise a divalent arylenesulfone group. For example, all linkers V, but no groups R, can contain an arylenesulfone group; or all groups R but no linkers V can contain an arylenesulfone group; or an arylenesulfone can be present in some fraction of the linkers V and R groups, provided that the total mole fraction of V and R groups containing an aryl sulfone group is greater than or equal to 50 mole %.

Even more specifically, polyetherimidesulfones can comprise more than 1, specifically 10 to 1,000, or more specifically, 10 to 500 structural units of formula (6):

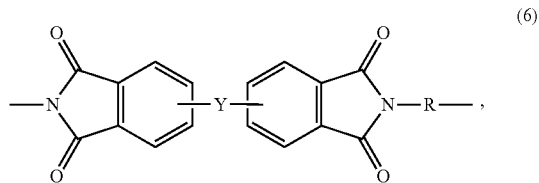

wherein Y is —O—, —SO2-, or a group of the formula —O—Z—O— wherein the divalent bonds of the —O—, SO2-, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+ moles R in formula (2) contain —SO2— groups.

It is to be understood that the polyetherimides and polyetherimidesulfones can optionally comprise linkers V that do not contain ether or ether and sulfone groups, for example linkers of formula (7):

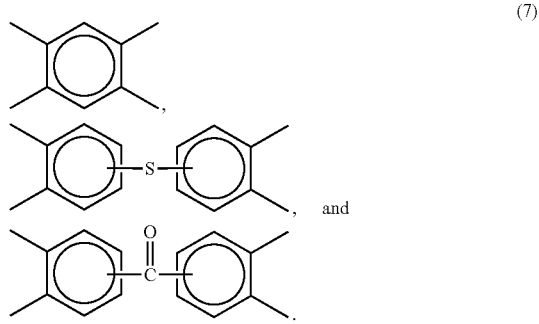

Imide units containing such linkers are generally be present in amounts ranging from 0 to 10 mole % of the total number of units, specifically 0 to 5 mole %. In one embodiment no additional linkers V are present in the polyetherimides and polyetherimidesulfones.

In another aspect, the polyetherimide comprises 10 to 500 structural units of formula (5) and the polyetherimidesulfone contains 10 to 500 structural units of formula (6).

Polyetherimides and polyetherimidesulfones can be prepared by any suitable process. In one embodiment, polyetherimides and polyetherimide copolymers include polycondensation polymerization processes and halo-displacement polymerization processes.

Polycondensation methods can include a method for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO2 in what is known as the nitro-displacement step. After purification, the BPA-bisimide is reacted with phthalic anhydride in an imide exchange reaction to afford BPA-dianhydride (BPADA), which in turn is reacted with a diamine such as meta-phenylene diamine (MPD) in ortho-dichlorobenzene in an imidization-polymerization step to afford the product polyetherimide.

Other diamines are also possible. Examples of suitable diamines include: m-phenylenediamine; p-phenylenediamine; 2,4-diaminotoluene; 2,6-diaminotoluene; m-xylylenediamine; p-xylylenediamine; benzidine; 3,3'-dimethylbenzidine; 3,3'-dimethoxybenzidine; 1,5-diaminonaphthalene; bis(4-aminophenyl)methane; bis(4-aminophenyl)propane; bis(4-aminophenyl)sulfide; bis(4-aminophenyl)sulfone; bis(4-aminophenyl)ether; 4,4'-diaminodiphenylpropane; 4,4'-diaminodiphenylmethane(4, 4'-methylenedianiline); 4,4'-diaminodiphenylsulfide; 4,4'-diaminodiphenylsulfone; 4,4'-diaminodiphenylether(4,4'-oxydianiline); 1,5-diaminonaphthalene; 3,3' dimethylbenzidine; 3-methylheptamethylenediamine; 4,4-dimethylheptamethylenediamine; 2,2',3,3'-tetrahydro-3,3,3', 3'-tetramethyl-1,1'-spirobi[1H-indene]-6,6'-diamine; 3,3',4, 4'-tetrahydro-4,4,4',4'-tetramethyl-2,2'-spirobi[2H-1-benzopyran]-7,7'-diamine; 1,1'-bis[1-amino-2-methyl-4-phenyl] cyclohexane, and isomers thereof as well as mixtures and blends comprising at least one of the foregoing. In one embodiment, the diaminesare specifically aromatic diamines, especially m- and p-phenylenediamine and mixtures comprising at least one of the foregoing.

Suitable dianhydrides that can be used with the diamines include and are not limited to 2,2-bis[4-(3,4-dicarboxyphenoxy)phenyl]propane dianhydride; 4,4'-bis(3,4-dicarboxyphenoxy)diphenyletherdianhydride; 4,4'-bis(3,4-dicarboxyphenoxy)diphenylsulfidedianhydride; 4,4'-bis(3,4-dicarboxyphenoxy)benzophenonedianhydride; 4,4'-bis(3,4-dicarboxyphenoxy)diphenylsulfonedianhydride; 2,2-bis[4-(2,3-dicarboxyphenoxy)phenyl]propane dianhydride; 4,4'-bis(2,3-dicarboxyphenoxy)diphenyletherdianhydride; 4,4'-bis(2,3-dicarboxyphenoxy)diphenylsulfidedianhydride; 4,4'-bis(2,3-dicarboxyphenoxy)benzophenonedianhydride; 4,4'-bis(2,3-dicarboxyphenoxy)diphenylsulfonedianhydride; 4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy)diphenyletherdianhydride; 4-(2,3-dicarboxyphenoxy)-4'-(3,4-dicarboxyphenoxy) diphenylsulfide dianhydride; 4-(2,3-dicarboxyphenoxy)-4'-(3,4-dicarboxyphenoxy)benzophenonedianhydride; 4-(2,3-dicarboxyphenoxy)-4'-(3,4-dicarboxyphenoxy) diphenylsulfone dianhydride; 1,3-bis(2,3-dicarboxyphenoxy)benzene dianhydride; 1,4-bis(2,3-dicarboxyphenoxy)benzene dianhydride; 1,3-bis(3,4-dicarboxyphenoxy)benzene dianhydride; 1,4-bis(3,4-dicarboxyphenoxy)benzene dianhydride; 3,3',4,4'-diphenyl tetracarboxylicdianhydride; 3,3',4,4'-benzophenonetetracarboxylic dianhydride; naphthalicdianhydrides, such as 2,3,6, 7-naphthalic dianhydride, etc.; 3,3',4,4'-biphenylsulphonictetracarboxylic dianhydride; 3,3',4,4'-biphenylethertetracarboxylic dianhydride; 3,3',4,4'-dimethyldiphenylsilanetetracarboxylic dianhydride; 4,4'-bis (3,4-dicarboxyphenoxy)diphenylsulfidedianhydride; 4,4'-bis (3,4-dicarboxyphenoxy)diphenylsulphonedianhydride; 4,4'- bis(3,4-dicarboxyphenoxy)diphenylpropanedianhydride; 3,3',4,4'-biphenyltetracarboxylic dianhydride; bis(phthalic) phenylsulphineoxidedianhydride; p-phenylene-bis(triphenylphthalic)dianhydride; m-phenylene-bis(triphenylphthalic)dianhydride; bis(triphenylphthalic)-4,4'-diphenylether dianhydride; bis(triphenylphthalic)-4,4'-diphenylmethane dianhydride; 2,2'-bis(3,4-dicarboxyphenyl)hexafluoropropanedianhydride; 4,4'-oxydiphthalic dianhydride; pyromelliticdianhydride; 3,3',4,4'-diphenylsulfonetetracarboxylic dianhydride; 4',4'-bisphenol A dianhydride; hydroquinone diphthalic dianhydride; 6,6'-bis(3,4-dicarboxyphenoxy)-2,2',3,3'-tetrahydro-3,3,3',3'-tetramethyl-1-1,1'-spirobi[1H-indene]dianhydride; 7,7'-bis(3,4-dicarboxyphenoxy)-3,3',4,4'-tetrahydro-4,4,4',4'-tetramethyl-1-2,2'-spirobi[2H-1-benzopyran] dianhydride; 1,1'-bis[1-(3,4-dicarboxyphenoxy)-2-methyl-4-phenyl]cyclohexane dianhydride; 3,3',4,4'-diphenylsulfonetetracarboxylic dianhydride; 3,3',4,4'-diphenylsulfidetetracarboxylic dianhydride; 3,3',4,4'-diphenylsulfoxidetetracarboxylic dianhydride; 4,4'-oxydiphthalic dianhydride; 3,4'-oxydiphthalic dianhydride; 3,3'-oxydiphthalic dianhydride; 3,3'-benzophenonetetracarboxylic dianhydride; 4,4'-carbonyldiphthalic dianhydride; 3,3',4,4'-diphenylmethanetetracarboxylic dianhydride; 2,2-bis(4-(3,3-dicarboxyphenyl)propane dianhydride; 2,2-bis(4-(3,3-dicarboxyphenyl)hexafluoropropanedianhydride; (3,3',4,4'-diphenyl)phenylphosphinetetracarboxylicdianhydride; (3,3',4,4'-diphenyl)phenylphosphineoxidetetracarboxylicdianhydride; 2,2'-dichloro-3,3',4,4'-biphenyltetracarboxylic dianhydride; 2,2'-dimethyl-3,3',4,4'-biphenyltetracarboxylic dianhydride; 2,2'-dicyano-3,3',4,4'-biphenyltetracarboxylic dianhydride; 2,2'-dibromo-3,3',4,4'-biphenyltetracarboxylic dianhydride; 2,2'-diiodo-3,3',4,4'-biphenyltetracarboxylic dianhydride; 2,2'-ditrifluoromethyl-3,3',4,4'-biphenyltetracarboxylic dianhydride; 2,2'-bis(1-methyl-4-phenyl)-3,3',4,4'-biphenyltetracarboxylic dianhydride; 2,2'-bis(1-trifluoromethyl-2-phenyl)-3,3',4,4'-biphenyltetracarboxylic dianhydride; 2,2'-bis(1-trifluoromethyl-3-phenyl)-3,3',4,4'-biphenyltetracarboxylic dianhydride; 2,2'-bis(1-trifluoromethyl-4-phenyl)-3,3',4,4'-biphenyltetracarboxylic dianhydride; 2,2'-bis(1-phenyl-4-phenyl)-3,3',4,4'-biphenyltetracarboxylic dianhydride; 4,4'-bisphenol A dianhydride; 3,4'-bisphenol A dianhydride; 3,3'-bisphenol A dianhydride; 3,3',4,4'-diphenylsulfoxidetetracarboxylic dianhydride; 4,4'-carbonyldiphthalic dianhydride; 3,3',4,4'-diphenylmethanetetracarboxylic dianhydride; 2,2'-bis(1,3-trifluoromethyl-4-phenyl)-3,3',4,4'-biphenyltetracarboxylic dianhydride, and all isomers thereof, as well as combinations of the foregoing.

Halo-displacement polymerization methods for making polyetherimides and polyetherimidesulfones include and are not limited to, the reaction of a bis(phthalimide) for formula (8):

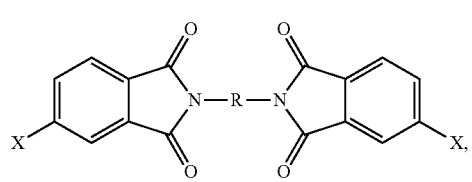

(8)

wherein R is as described above and X is a nitro group or a halogen. Bis-phthalimides (8) can be formed, for example, by the condensation of the corresponding anhydride of formula (9):

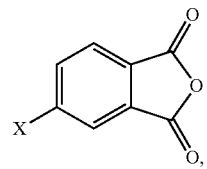

(9)

wherein X is a nitro group or halogen, with an organic diamine of the formula (10):

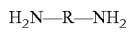

H₂N—R—NH₂  (10), wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methyl-heptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether and 1,3-bis(3-aminopropyl)tetramethyldisiloxane. Mixtures of these amines can be used. Illustrative examples of amine compounds of formula (10) containing sulfone groups include but are not limited to, diaminodiphenylsulfone (DDS) and bis(aminophenoxy phenyl)sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482, which is incorporated herein by reference in its entirety. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimidesulfone comprises structural units of formula (6) wherein at least 50 mole % of the R groups are of formula (4) wherein Q is —SO2- and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimidesulfone can be used alone or in combination with each other and/or other of the disclosed polymeric materials in fabricating the polymeric components of the invention. In one embodiment, only the polyetherimide is used. In another embodiment, the weight ratio of polyetherimide:polyetherimidesulfone can be from 99:1 to 50:50.

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418. In some embodiments, the polyetherimide and, in particular, a polyetherimide has a glass transition temperature of 240 to 350° C.

The polyetherimides can have a melt index of 0.1 to 10 grams per minute (g/min), as measured by American Society for Testing Materials (ASTM) DI 238 at 340 to 370° C., using a 6.7 kilogram (kg) weight.

An alternative halo-displacement polymerization process for making polyetherimides, e.g., polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischlorophthalimide of meta-phenylene diamine (CAS No. 148935-94-8). The bischlorophthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro-displacement with BPA disodium salt as described above.

Siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (1):

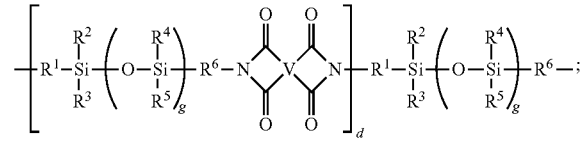

(I)

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyetherimide resin can have a weight average molecular weight (Mw) from 5,000 to 100,000 daltons, from 5,000 to 80,000 daltons, or from 5,000 to 70,000 daltons. The primary alkyl amine modified polyetherimide will have lower molecular weight and higher melt flow than the starting, unmodified, polyetherimide.

The polyetherimide resin can be selected from the group consisting of a polyetherimide, for example as described in U.S. Pat. Nos. 3,875,116; 6,919,422 and 6,355,723 a silicone polyetherimide, for example as described in U.S. Pat. Nos. 4,690,997; 4,808,686 a polyetherimidesulfone resin, as described in U.S. Pat. No. 7,041,773 and combinations thereof, each of these patents are incorporated herein their entirety.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300 and 310 degrees Celsius. For example, the polyetherimide resin can have a glass transition temperature (Tg) greater than about 200 degrees Celsius.

The polyetherimide resin can be substantially free (less than 100 ppm) of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free (less than 100 ppm) of halogen atoms. The polyetherimide resin can be free of halogen atoms. The polyetherimide resin can have an amount of halogen atoms below 100 ppm. In one embodiment, the amount of halogen atoms range from more than 0 to below 100 ppm. In another embodiment, the amount of halogen atoms is not detectable.

Suitable polyetherimides that can be used in the disclosed composites include, but are not limited to, ULTEM™. ULTEM™ is a polymer from the family of polyetherimides (PEI) sold by Saudi Basic Industries Corporation (SABIC). ULTEM™ can have elevated thermal resistance, high strength and stiffness, and broad chemical resistance. ULTEM™ as used herein refers to any or all ULTEM™ polymers included in the family unless otherwise specified. In a further aspect, the ULTEM™ is ULTEM™ 1000. In one aspect, a polyetherimide can comprise any polycarbonate material or mixture of materials, for example, as recited in U.S. Pat. Nos. 4,548,997; 4,629,759; 4,816,527; 6,310,145; and 7,230,066, all of which are hereby incorporated in its entirety for the specific purpose of disclosing various polyetherimide compositions and methods.

In certain aspects, the thermoplastic polymer is a polyetherimide polymer having a structure comprising structural units represented by a organic radical of formula (1):

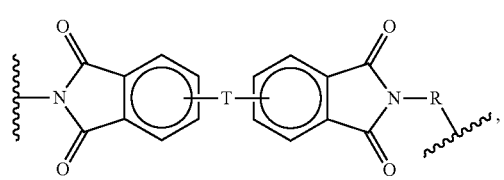
(I)

wherein R in formula (1) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (II):

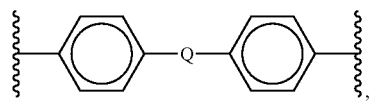
(II)

wherein Q includes a divalent moiety selected from the group consisting of a single bond, —O—, —S—, —C(O)—, —SO2-, —SO—, -CyH2y- (y being an integer from 1 to 5), and halogenated derivatives thereof, including perfluoroalkylene groups; wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III):

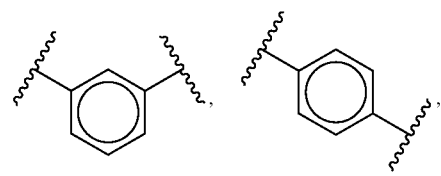
(III)

-continued

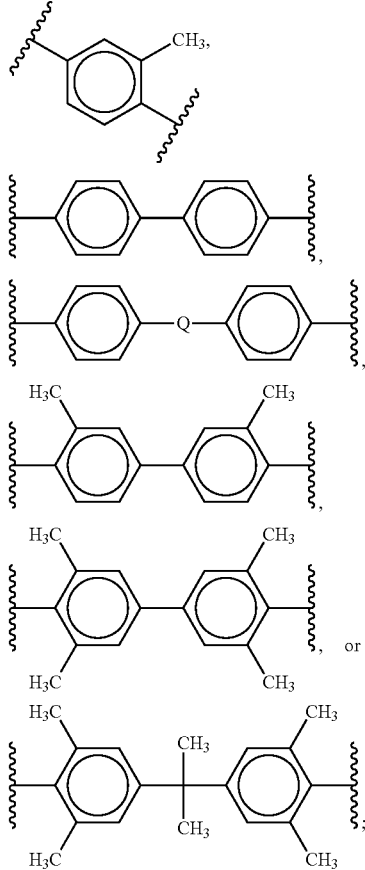

and wherein the polyetherimides which are included by formula (1) have a Mw of at least about 40,000.

In a further aspect, the polyetherimide polymer may be a copolymer, which, in addition to the etherimide units described above, further contains polyimide structural units of the formula (IV):

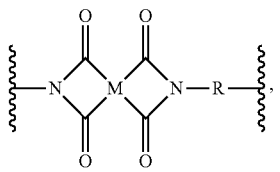
(IV)

wherein R is as previously defined for formula (1) and M includes, but is not limited to, radicals of formula (V):

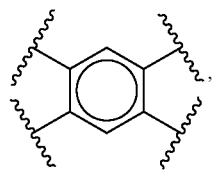
(V)

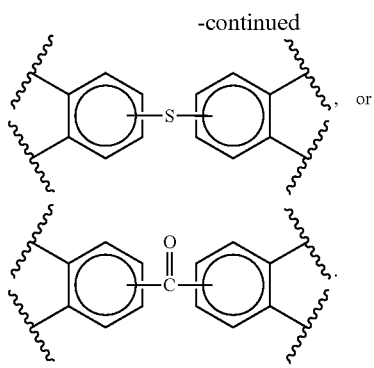

In a further aspect, the thermoplastic resin is a polyetherimide polymer having structure represented by a formula:

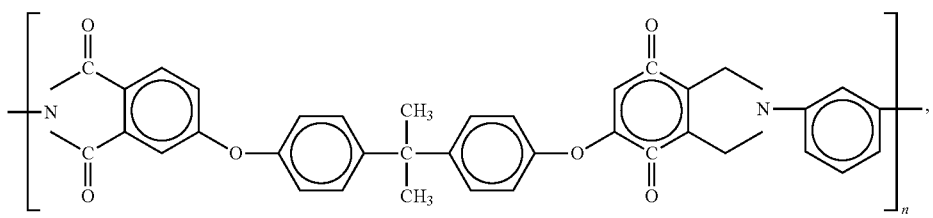

wherein the polyetherimide polymer has a molecular weight of at least 20,000, 30,000, 40,000 Daltons, 50,000 Daltons, 60,000 Daltons, 80,000 Daltons, or 100,000 Daltons.

The polyetherimide polymer can be prepared by methods known to one skilled in the art, including the reaction of an aromatic bis(ether anhydride) of the formula (VI):

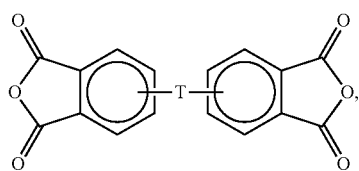

with an organic diamine of the formula (IX):

wherein T and R are defined as described above in formula (1).

Illustrative, non-limiting examples of aromatic bis(ether anhydride)s of formula (VI) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A useful class of aromatic bis(ether anhydride)s included by formula (VI) above includes, but is not limited to, compounds wherein T is of the formula (VIII):

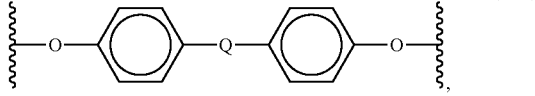

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Illustrative, non-limiting examples of suitable diamino compounds of formula (VII) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecane diamine, 1,18-octadecanediamine, 3-methylheptamethylenediamine, 4,4-dimethylheptamethylenediamine, 4-methylnonamethylenediamine, 5-methylnonamethylene diamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylene diamine, 1,2-bis(3-aminopropoxy) ethane, bis(3-aminopropyl)sulfide, 1,4-cyclohexane diamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis (p-b-amino-t-butylphenyl)ether, bis(p-b-methyl-o-aminophenyl)benzene, bis(p-b-methyl-o-aminopentyl)benzene, 1,3-diamino-4-isopropyl benzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be present. Beneficial diamino compounds are aromatic diamines, especially m- and p-phenylenediamine and mixtures thereof.

In a further aspect, the polyetherimide resin includes structural units according to formula (1) wherein each R is independently p-phenylene or m-phenylene or a mixture thereof and T is a divalent radical of the formula (IX):

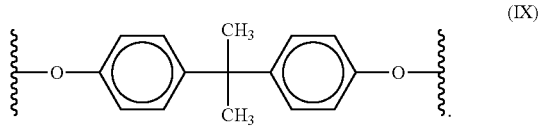

In various aspects, the reactions can be carried out employing solvents such as o-dichlorobenzene, m-cresol/toluene, or the like, to effect a reaction between the anhydride of formula (VI) and the diamine of formula (VII), at temperatures of about 100° C. to about 250° C. Alternatively, the polyetherimide can be prepared by melt polymerization of aromatic bis(ether anhydride)s of formula (VI) and diamines of formula (VII) by heating a mixture of the starting materials to elevated temperatures with concurrent stirring. Melt polymerizations can employ temperatures of about 200° C. to about 400° C. Chain stoppers and branching agents can also be employed in the reaction. The polyetherimide polymers can optionally be prepared from reaction of an aromatic bis (ether anhydride) with an organic diamine in which the diamine is present in the reaction mixture at no more than about 0.2 molar excess, and beneficially less than about 0.2 molar excess. Under such conditions the polyetherimide resin has less than about 15 microequivalents per gram (µeq/g) acid titratable groups in one embodiment, and less than about 10 µeq/g acid titratable groups in an alternative embodiment, as shown by titration with chloroform solution with a solution of 33 weight percent (wt %) hydrobromic acid in glacial acetic acid. Acid-titratable groups are essentially due to amine endgroups in the polyetherimide resin.

In a further aspect, the polyetherimide resin has a weight average molecular weight (Mw) of at least about 24,000 to about 150,000 grams per mole (g/mole), as measured by gel permeation chromatography, using a polystyrene standard. In a still further aspect, the thermoplastic resin can have a molecular weight of at least 20,000 Daltons, 40,000 Daltons, 50,000 Daltons, 60,000 Daltons, 80,000 Daltons, 100,000 Daltons, or 120,000 Daltons. In a yet further aspect, the thermoplastic resin can have a molecular weight of at least 40,000 Daltons. In an even further aspect, the thermoplastic resin can have a molecular weight of at least 45,000 Daltons. In a still further aspect, the thermoplastic resin can have a molecular weight of at least 50,000 Daltons. In a yet further aspect, the thermoplastic resin can have a molecular weight of at least 60,000 Daltons. In an even further aspect, the thermoplastic resin can have a molecular weight of at least 70,000 Daltons. In a still further aspect, the thermoplastic resin can have a molecular weight of at least 100,000 Daltons.

In a further aspect, the thermoplastic resin can comprise a polyetherimide polymer having a molecular weight of at least 40,000 Daltons, 50,000 Daltons, 60,000 Daltons, 80,000 Daltons, or 100,000 Daltons. In a yet further aspect, polyetherimide polymer has a molecular weight of at least Daltons, 40,000 Daltons or 50,000 Daltons. In a still further aspect, the polyetherimide polymer has a molecular weight of at least 40,000 Daltons. In a yet further aspect, the polyetherimide polymer has a molecular weight of at least 50,000 Daltons. In an even further aspect, the polyetherimide polymer has a molecular weight of at least 60,000 Daltons. In a still further aspect, the polyetherimide polymer has a molecular weight of at least 70,000 Daltons. In a yet further aspect, the polyetherimide polymer has a molecular weight of at least 100,000 Daltons.

In one aspect, the polymeric material comprises

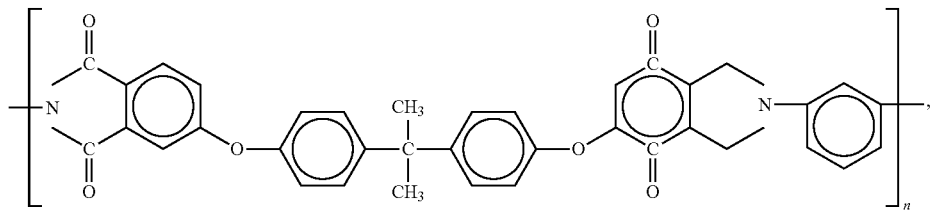

wherein n is greater than 1, for example greater than 10. In one aspect n is between 2-100, 2-75, 2-50 or 2-25, for example 10-100, 10-75, 10-50 or 10-25. In another example, n can be 38, 56 or 65.

3. Filler

In one aspect, the loading of the filler in the nanocomposite can be low or dilute. For example, the loading of the filler in the nanocomposite can be less than 5%, 10%, 15%, 20%, 25%, 30%, 35%, 40% or 45% by volume. In one aspect, the loading of the filler in the nanocomposite can be less than 20% by volume. In a yet another aspect, the loading of the filler in the nanocomposite can be less than 5% by volume. In one aspect, the loading of the filler can be at least 5%, 10%, 15%, 20%, 25%, 30%, 40% or 45% by volume. For example, the loading of the filler can be at least 5% or at least 20% by volume. In another aspect, the loading of the filler in the nanocomposite can be at least 5% by volume.

In one aspect, the filler can comprise a first and a second filler. The first filler can be different from the second filler. The first and second filler can be chosen for the fillers described elsewhere herein.

In one aspect, the filler can be an inorganic filler. The filler can be, for example, commercially available inorganic materials. Suitable fillers include, but are not limited to oxides and sulfides of titanium, zirconium, silicon, hafnium, vanadium, niobium, tantalum, chromium, molybdenum, tungsten, manganese, technetium, rhenium, iron, osmium, cobalt, nickel, copper, silver, gold, zinc, cadmium, scandium, yttrium, lanthanum, boron, gallium, indium, arsenic, thallium, silicon, germanium, tin, lead, magnesium, calcium, strontium, barium and aluminum, and the simple or mixed chalcogenides, in particular, thereof. In one aspect, the filler can be oxides of aluminum, zirconium, silicon, barium, titanium, and zinc which include, but are not limited to $Al_2O_3$, $ZrO_2$, TiO$_2$, SrTiO$_3$, ZnO, BaTiO$_3$, or fumed silica, or a combination thereof. In another aspect, the filler can be TiO$_2$, BaTiO$_3$, Al$_2$O$_3$, or fumed silica, or a mixture thereof.

In one aspect, the filler can have a shape. Suitable shapes include, but are not limited to, spheres, non-spheres, whiskers, rods, triangular, pyramids and domes. In another aspect, the fillers can have spherical shapes.

In one aspect, the filler can have a size. Suitable sizes include, but are not limited to, at least 5 nm, 10 nm, 20 nm, 50 nm, 100 nm, 150 nm, 200 nm, 250 nm, 300 nm, 500 nm, 750 nm, 1 µm, 2 µm, 3 µm, 4 µm and 5 µm. Other sizes include, but are not limited to, less than 5 nm, 10 nm, 20 nm, 50 nm, 100 nm, 150 nm, 200 nm, 250 nm, 300 nm, 500 nm, 750 nm, 900 nm, 1 µm, 2 µm, 3 µm, 4 µm and 5 µm. Other suitable sizes include, but are not limited to, about 5 nm, 10 nm, 20 nm, 50 nm, 100 nm, 150 nm, 200 nm, 250 nm, 300 nm, 500 nm, 750 nm, 900 nm, 1 µm, 2 µm, 3 µm, 4 µm and 5 µm. Other suitable sizes include, but are not limited to 5 nm-10 nm, 10 nm-20 nm, 20 nm-40 nm, 40 nm-60 nm, 60 nm-80 nm, 80 nm-100 nm, 100 nm-150 nm, 150 nm-200 nm, 200 nm-300 nm, 300 nm-500 nm, 500 nm-1 µm, 1 µm-2 µm, 2 µm-3 µm, 3 µm-5 µm, or mixtures thereof. Thus, the sizes also include, for example, 10-200 nm, 50 nm-200 nm, and 100 nm-200 nm.

Table 1 shows non-limiting exemplary fillers

TABLE 1

| Material | DK | Shape | Size (nm) | Vendor |
|---|---|---|---|---|
| Al2O3 | 9 | Sphere | 10 | NanoAmor |
| Al2O3 | 9 | Sphere | 20 | Nanophase |
| Al2O3 | 9 | Sphere | 30-40 | NanoAmor |
| Al2O3 | 9 | Sphere | 40-50 | AlfaAeser |
| Al2O3 | 9 | Sphere | 150 | NanoAmor |
| Al2O3 | 9 | Whisker | 2-4 × 2800 | Sigmaaldrich |
| ZrO2 | 25 | Sphere | 20 | NanoAmor |
| ZrO2 | 25 | Sphere | 35 | NanoAmor |
| TiO2 (anatase) | 80 | Sphere | 10 | MTI |
| TiO2 (rutile) | 80 | Sphere | 20 | MTI |
| TiO2 (rutile) | 80 | Sphere | 50 | NanoAmor |
| TiO2 (rutile) | 80 | Sphere | 100 | Sigmaaldrich |
| TiO2 (rutile) | 80 | Rod | 10 × 40 | NanoAmor |
| SrTiO3 | 300 | Sphere | 100 | Inframat |
| BaTiO3 | ~1500 | Sphere | 20-40 | Amer. Element |
| BaTiO3 | ~1500 | Sphere | 50 | Inframat |
| BaTiO3 | ~1500 | Sphere | 100 | NanoAmor |
| BaTiO3 | ~1500 | Sphere | 200 | NanoAmor | a. Interface Modifier

In one aspect, the filler can be modified with an interface modifier. The interface modifier can modify the interaction between the filler and the polymeric material. For example, the interface modifier can make the filler and the polymeric material more chemically compatible. The interface modifier can, therefore, increase the dielectric breakdown strength of the nanocomposite compared to the nanocomposite lacking an interface modifier. In one aspect, an interface modifier reduces the aggregation of the fillers in the nanocomposite.

In one aspect, the interface modifier can be a chemical group that alters the interaction between the filler and the polymeric material. Suitable interface modifiers include, but are not limited to, phosphonic acid. For example, barium titanate can be modified with phosphonic acid as described by Kim et al., (*Adv. Mater.* 19:7, 1001-1005 (2007)) which is hereby incorporated herein in its entirety by reference. Silica filler can also be modified with phosphonic acid moieties using known silane chemistry described by Aliev et al. (*J. Mater. Chem.*, 10, 2758-2764 (2000)) which is hereby incorporated herein in its entirety by reference.

4. Thin Films

In one aspect, thin films can be made from the nanocomposite. The thin films can be used as dielectric layers in electronic applications, such as capacitors.

In one aspect, the films can have a thickness. The thickness can, for example, be less than 50 µm, 40 µm, 30 µm, 20 µm, 10 µm, 5 µm, 3 µm, 2 µm or 1 µm. In another example, the thickness of a thin film can be less than 10 µm.

The films can be made by processes known in the art such as solution or solvent casting or melt or extrusion processes.

5. Articles of Manufacturer

Also disclosed herein are articles of manufacturers or devices comprising, any nanocomposite material or thin film described elsewhere herein. In one aspect, the article is a capacitor or supercapacitor. Capacitors are devices that store electrical energy on an electrode surface through the use of an electrochemical cell that creates an electrical charge at the electrode. Supercapacitors (also called ultracapacitors), sometimes referred to as double layer capacitors or electrochemical double layer capacitors, are a type of storage device that creates and stores energy by microscopic charge separation at an electrochemical interface between an electrode and an electrolyte. Supercapacitors are able to store more energy per weight than traditional capacitors and typically deliver the energy at a higher power rating than many rechargeable batteries. Supercapacitors typically comprise two porous electrodes that are isolated from electrical contact by a porous separator. The separator and the electrodes can be impregnated with an electrolytic solution, which allows ionic current to flow between the electrodes while preventing electronic current from discharging the cell.

When an electric potential is applied to a supercapacitor cell, ionic current flows due to the attraction of anions to the positive electrode and cations to the negative electrode. Upon reaching the electrode surface, the ionic charge accumulates to create a charged layer at the solid liquid interface region. This is accomplished by absorption of the charge species and by realignment of dipoles of a solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the supercapacitor electrodes causes ionic current to flow as anions are discharged from the surface of the positive electrode and cations are discharged from the surface of the negative electrode while an electric current flows through an external circuit between electrode current collectors.

A supercapacitor can be used in a wide range of energy storage applications. Some advantages of supercapacitors over more traditional energy storage devices include high power capability, long life, wide thermal operating ranges, low weight, flexible packaging, and low maintenance. Supercapacitors can be ideal for any application having a short load cycle, high reliability requirement, such as energy recapture sources including load cranes, forklifts, and electric vehicles. Other applications that can utilize a supercapacitor's ability to nearly instantaneously absorb and release power include power leveling for electric utilities and factory power backup. A bank of supercapacitors, for example, can bridge a short gap between a power failure and the startup of backup power generators.

Many capacitors can have a high power density but low energy density which can lead to rapid charge and discharge rates, allowing for a high power supply for only a few seconds. Thus, the nanocomposites described herein increase the energy density of supercapacitors to approach or surpass the energy density of traditional batteries.

Conventional supercapacitors utilize a high surface area, conductive carbon, such as, for example, activated carbon, sandwiched between a separator and a current collector electrode.

In one aspect, the article or device is an insulator.

6. Methods

Also described herein are methods of making the nanocomposites comprising the step of a. dispersing a nano particulate inorganic filler material in a solvent; b. making a system by dissolving a polymeric material in the solvent; and c. casting a nanocomposite material from the system, wherein the nanocomposite is any nanocomposite described herein.

In one aspect the solvent is an organic solvent. Suitable organic solvents include, but are not limited to, acetone, toluene, dichloromethane, N-Methyl-2-pyrrolidone (NMP), tetrahydrofuran, or a mixture thereof. In another aspect, the polymeric material is soluble in NMP.

In one aspect, the polymeric material is dissolved in the dispersion. In a further aspect, the polymeric material is dissolved in a solvent prior to being added to the dispersion. Thus, for example, the polymeric material can be dissolved in NMP and that solution is then added to the dispersion. This is to ensure that the polymer is dissolved rather than dispersed in the system.

In one aspect, the nanocomposite can be cast from the dispersion. In one aspect, the method further comprises making a thin film from the nanocomposites by casting or melting techniques.

C. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Material and Methods

The DK and DF measurements described herein were performed by a Novocontrol Dielectric Spectrometer. The dielectric breakdown strength was measured using a Hipotronics high voltage source at a 500V/second ramping rate. A ball electrode and plate electrode was used.

2. Example 1

Dielectric Measurements of Ultem Films

A solution of ULTEM 1000 in NMP was prepared at 90° C. 1 hr. A film was cast from this solution. The film was dried using three different conditions as follows: A) dried for 3 hrs at 150° C., B) dried for 3 hrs at. 200° C., and C) dried for 12 hrs at 200° C. under vacuum and $N_2$ gas. Gold was sputtered on the films (25 mA, 4 min). The dielectric measurements were performed at room temperature (rt) and at 1 kHz.

Figures 3A, 3B, 3C:
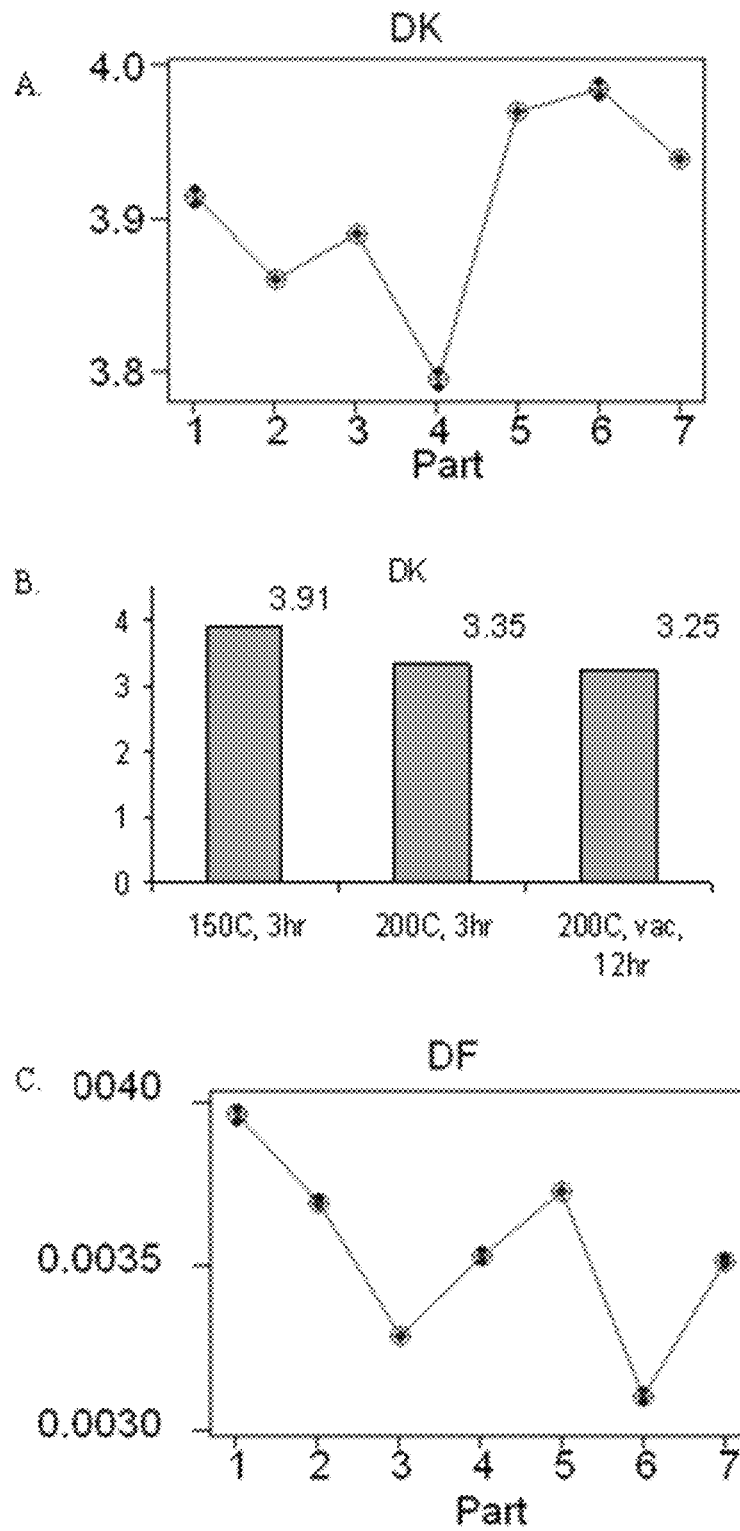
FIG. 3A-3D show the DK and the DF for ULTEM 1000. 3A shows the DK for seven samples of ULTEM 1000. 3B shows the DK for ULTEM 1000 as a function of drying conditions during sample preparation. 3C shows the DF for seven samples of ULTEM 1000. 3D shows the DF for ULTEM 1000 as a function of drying conditions during sample preparation.

As shown in FIGS. 3A and 3C, seven samples were prepared and tested (samples were dried for 3 hrs at 150° C.). The mean DK value was 3.908 with a $\sigma_{repeatability}$ of 4.63E-3 (0.119%) and a $\sigma_{part-to-part}$ of 6.61E-2 (1.69%). The mean dissipation factor (DF) value was 0.00355 with a $\sigma_{repeatability}$ of 1.73E-5 (0.487%) and a $\sigma_{part-to-part}$ of 2.88E-4 (8.11%).

Figure 3D:
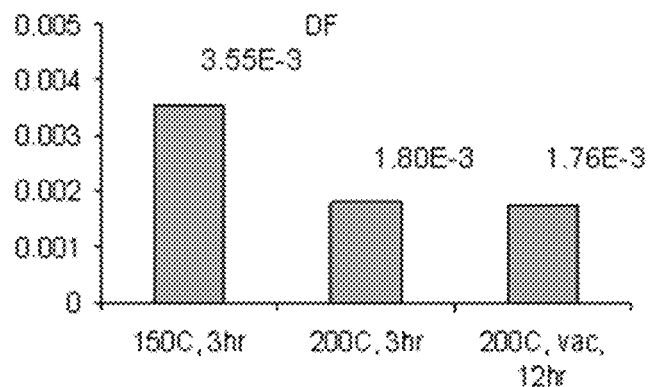

As shown in FIGS. 3B and 3D the different drying of the films affected its DK and DF value. The DK decreased from 3.91 to 3.25 by drying the film for 12 hrs at 200° C. under vacuum and $N_2$ gas (FIG. 3B). The DF decreased from 155E-3 to 10.76E-3 by drying the film for 12 hrs at 200° C. under vacuum and $N_2$ gas (FIG. 3D). ULTEM films at 200° C. was determined to be acceptable.

3. Example 2

Alumina Nanocomposites

Nanocomposites using alumina, a low DK filler, were made and tested. ULTEM 1000 was used as the polymer matrix in the nanocomposites. ULTEM 1000 without filler was used as the control. Table 2 shows the loading and particle size of the alumina used in the nanocomposites.

TABLE 2

| Design of Experiment - size effect | | |
|---|---|---|
| Run # | Loading (vol %) | Size |
| 1 | 5% | 10 nm |
| 2 | 10% | 10 nm |
| 3 | 25% | 10 nm |
| 4 | 40% | 10 nm |
| 5 | 5% | 40-50 nm |
| 6 | 10% | 40-50 nm |
| 7 | 25% | 40-50 nm |
| 8 | 40% | 40-50 nm |
| 9 | 5% | 150 nm |
| 10 | 10% | 150 nm |
| 11 | 25% | 150 nm |
| 12 | 40% | 150 nm |

Figure 4:
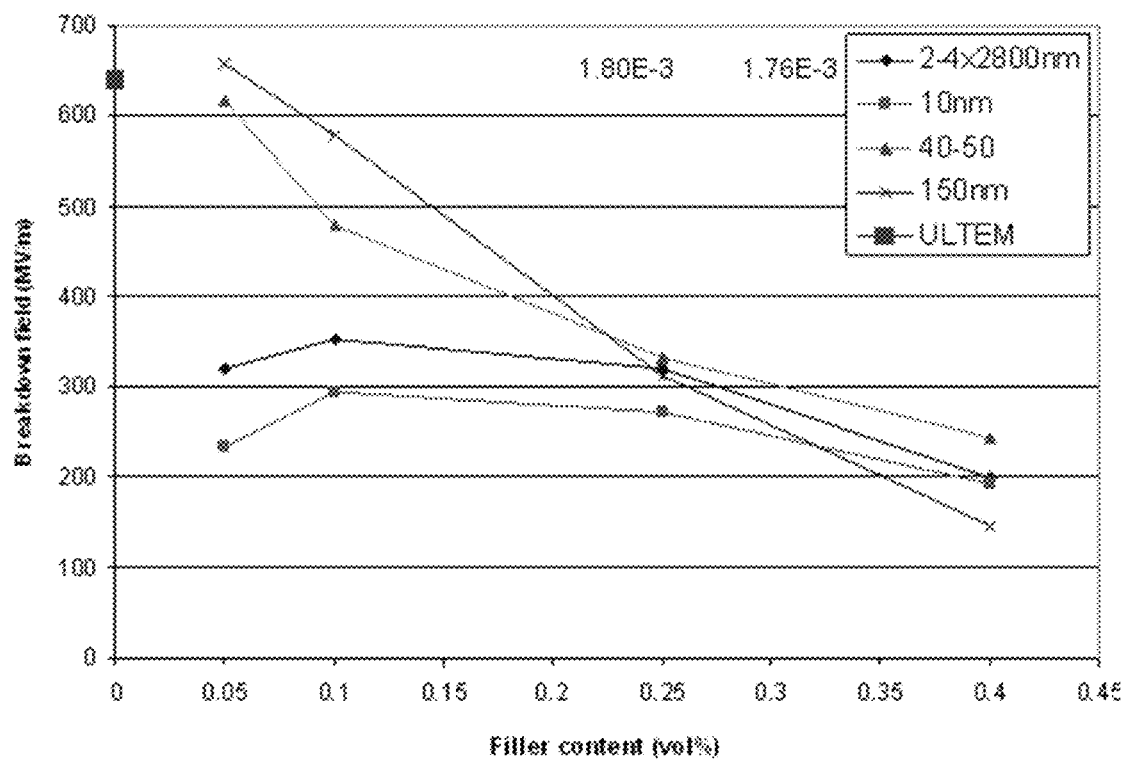
FIG. 4 shows the dielectric breakdown strength of nanocomposites with $Al_2O_3$ as filler in ULTEM 1000.

Samples were prepared by dispersing the filler (i.e. alumina) in NMP by sonicating the suspension for 1 hr. ULTEM 1000 was then dissolved in the suspension and stirred overnight at 80° C. A film was then cast from the solution at 90° C. for 1 hr. The film was dried for 12 hrs at 200° C. under vacuum and $N_2$ gas. Gold was sputtered on the films (25 mA, 4 min), FIG. 4 shows the breakdown strength for the ULTEM-alumina nanocomposites. ULTEM 1000 has a breakdown strength of 640 V/micron, Nanocomposites with 5 volume % of spherical 40-50 nm and 150 nm alumina particles have similar breakdown strength as ULTEM 1000, Nanocomposites with spherical 1.0 nm and 2-4×2800 nm whiskers showed a reduction in the breakdown strength for all filler loadings investigated, Table 2A shows the materials used to determine the shape effect.

TABLE 2A

| Design of Experiment -Shape effect | | |
|---|---|---|
| Run # | Loading (vol %) | Shape |
| 1 | 5% | Spherical 150 nm |
| 2 | 10% | Spherical 150 nm |
| 3 | 25% | Spherical 150 nm |
| 4 | 40% | Spherical 150 nm |
| 5 | 5% | whisker (2-4 nm × 2800 nm) |
| 6 | 10% | whisker (2-4 nm × 2800 nm) |
| 7 | 25% | whisker (2-4 nm × 2800 nm) |
| 8 | 40% | whisker (2-4 nm × 2800 nm) |

Figures 5A, 5B:
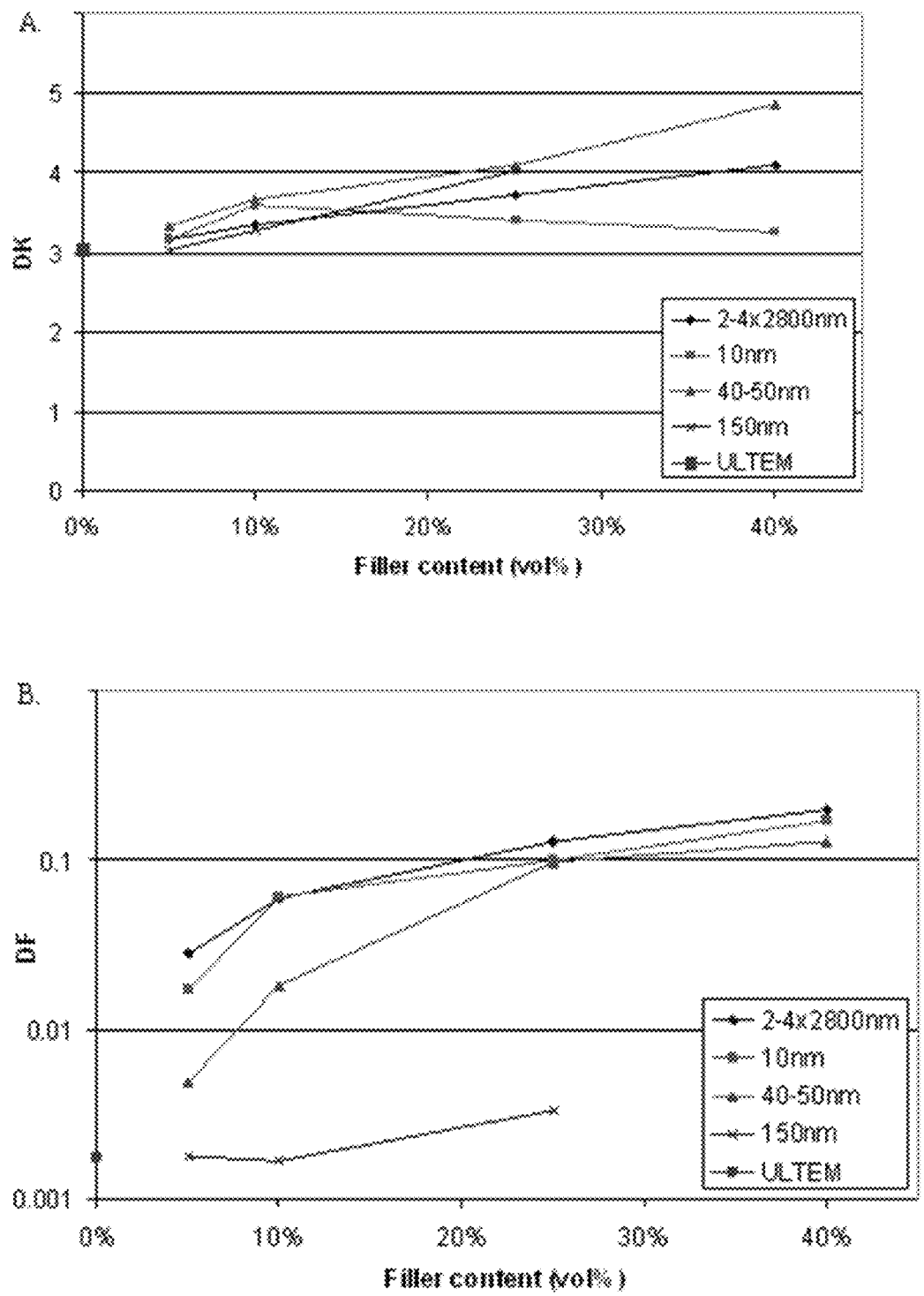
FIGS. 5A and 5B show the DK and DF of nanocomposites with $Al_2O_3$ as filler in ULTEM 1000.
Figure 6:
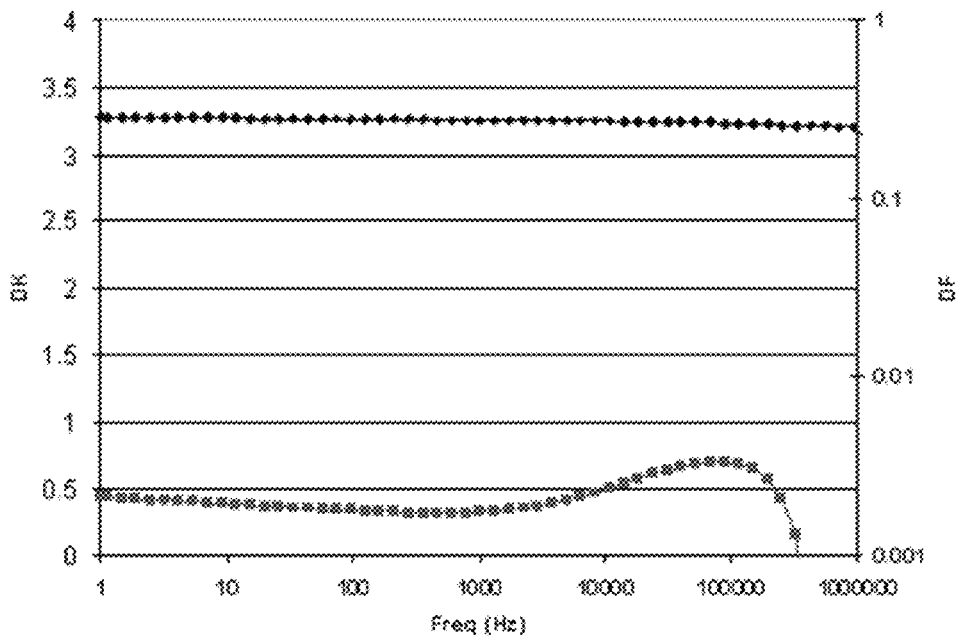
FIG. 6 shows the DK and DF of ULTEM 1000 for different frequencies.
Figure 7A:
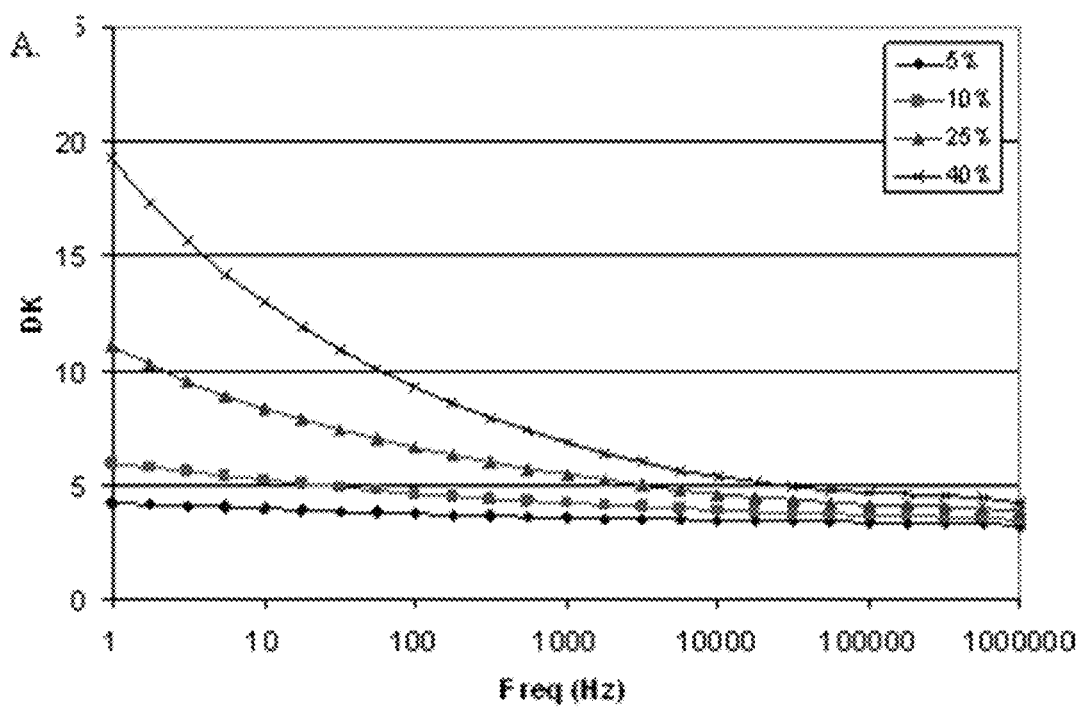
FIGS. 7A and 7B show the DK and DF of nanocomposites with $Al_2O_3$ (2-4×2800 nm whiskers) as filler in ULTEM 1000.
Figure 7B:
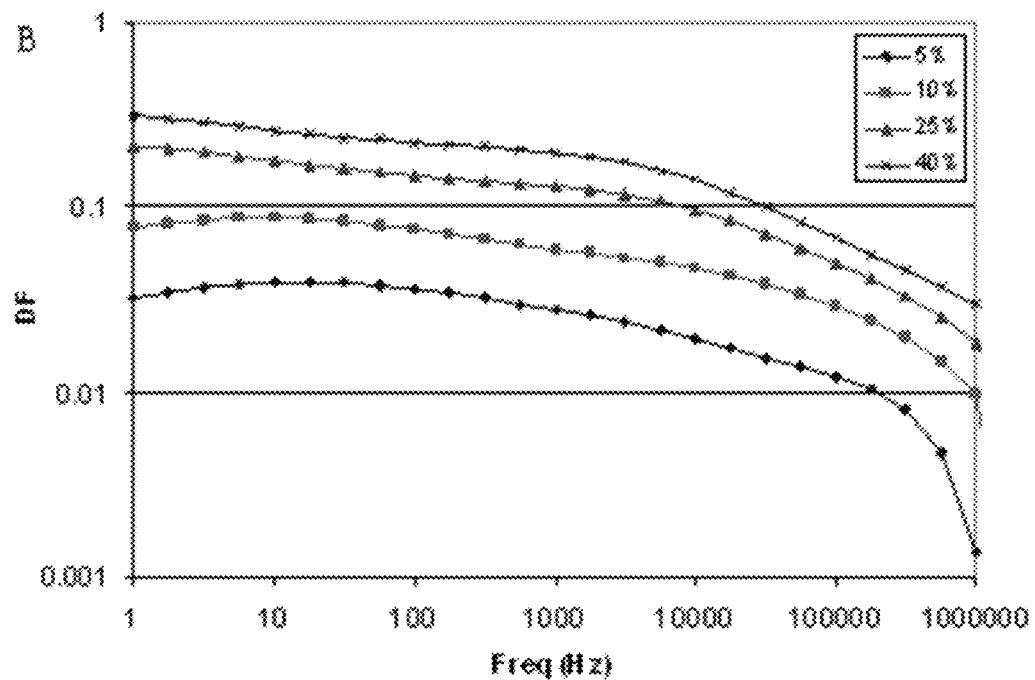
Figure 8A:
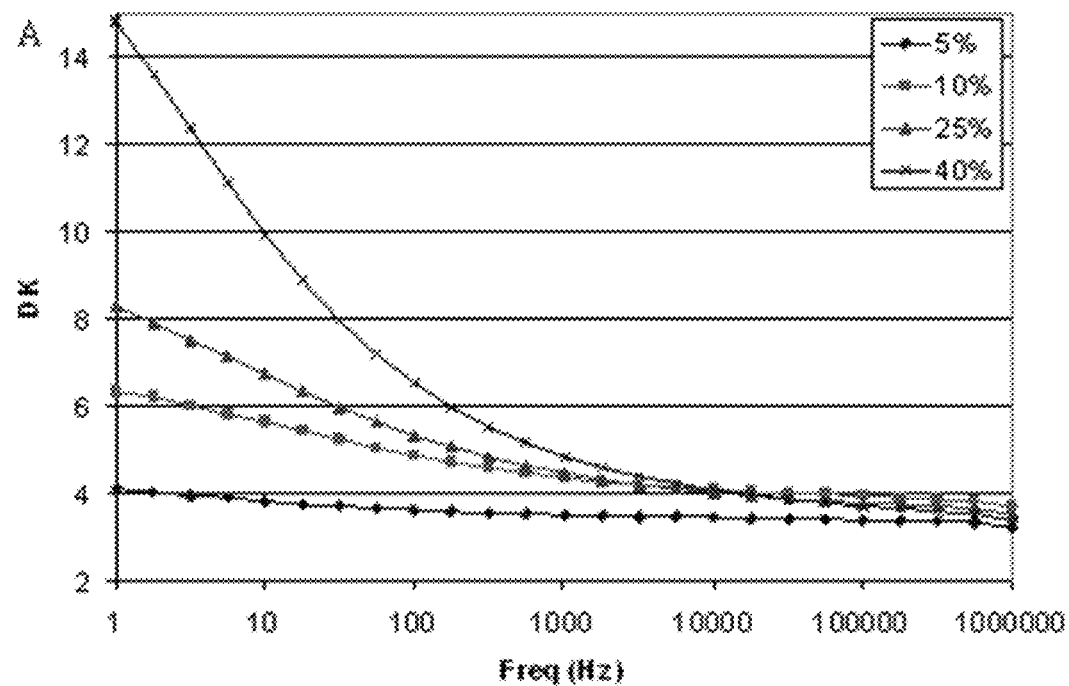
FIGS. 8A and 8B show the DK and DF of nanocomposites with $Al_2O_3$ (10 nm spheres) as filler in ULTEM 1000.
Figure 8B:
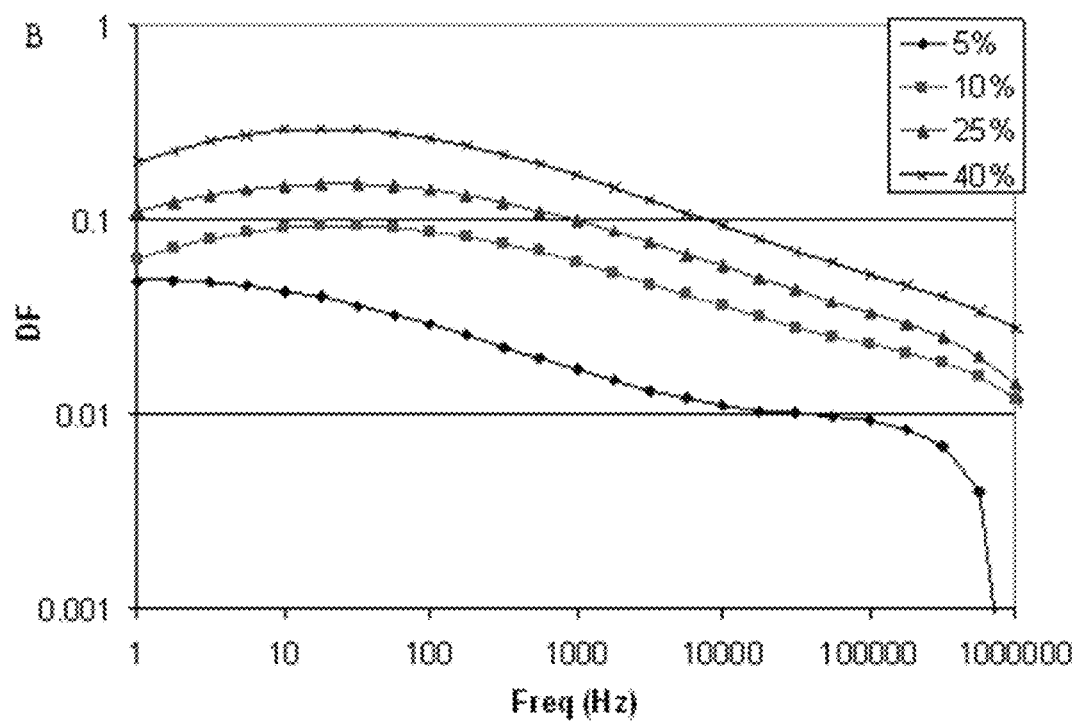

The DK of the nanocomposite increased by adding alumina as filler (see FIG. 5A). The DK increased more as the filler content increased, All DK values have been corrected to subtract the effect of conduction loss. The DF also increased by adding alumina as filler (see FIG. 5B). The composites containing the 150 nm alumina particles retained the lowest DF values. ULTEM 1000 without filler was used as a control (see FIG. 6), DK and DF measurements at varying frequency were performed for 2-4×2800 nm whiskers (see FIGS. 7A and 7B), DK and DF measurements at varying frequency were performed for 10 nm spheres (see FIGS. 8A and 8B).

Figure 9A:
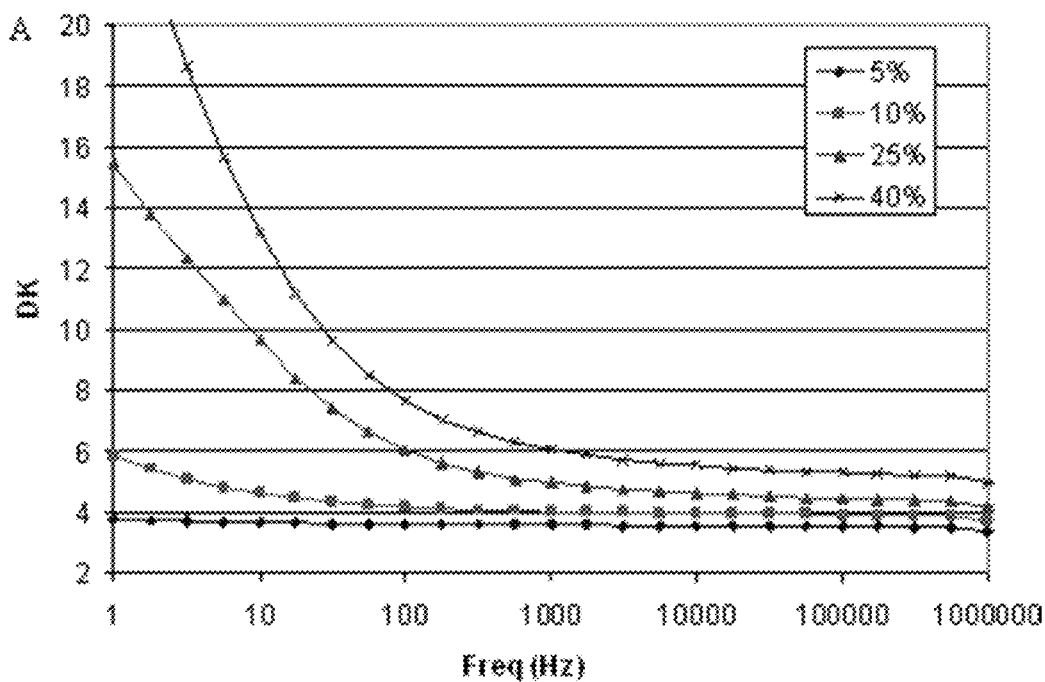
FIGS. 9A and 9B show the DK and DF of nanocomposites with $Al_2O_3$ (40-40 nm spheres) as filler in ULTEM 1000.
Figure 9B:
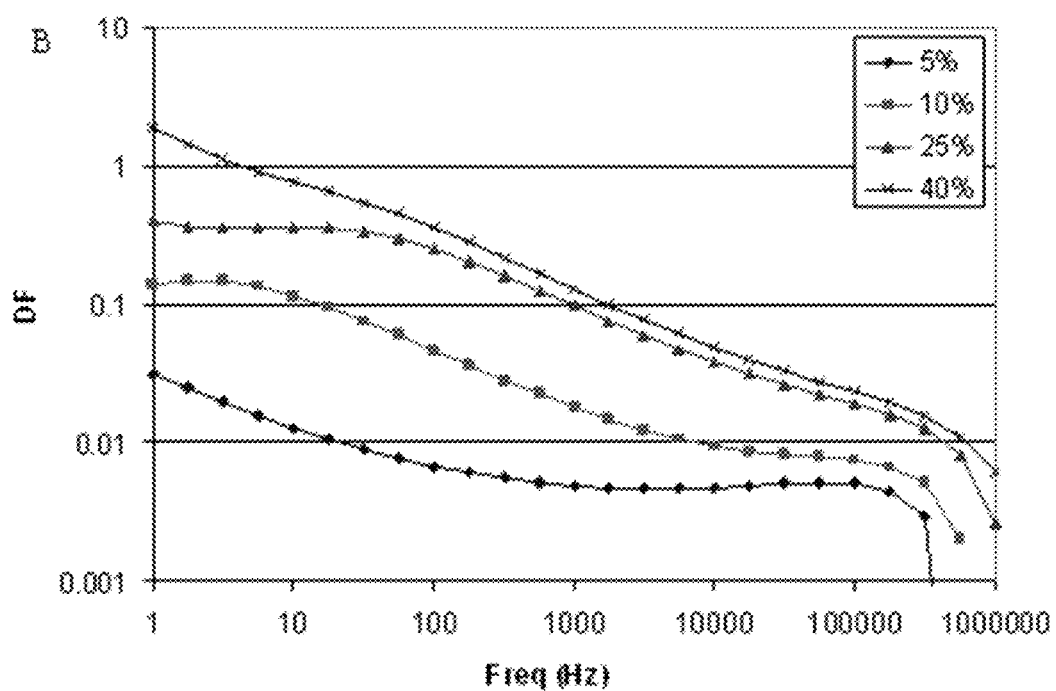
Figure 10A:
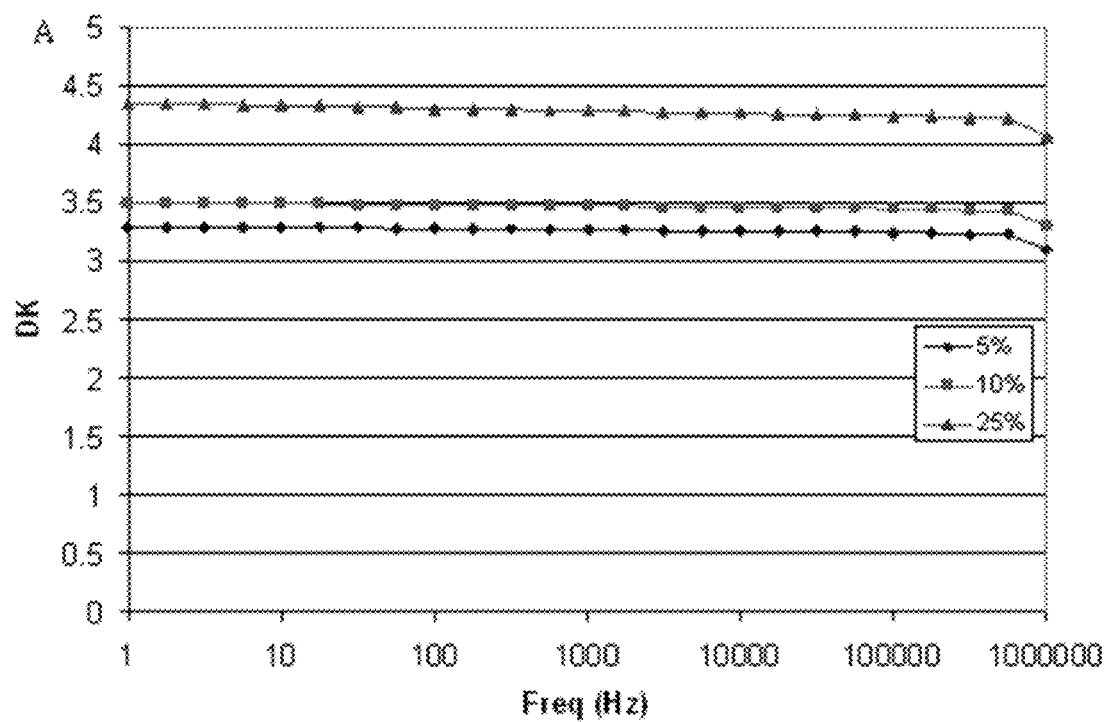
FIGS. 10A and 10B show the DK and DF of nanocomposites with $Al_2O_3$ (150 nm spheres) as filler in ULTEM 1000.
Figure 10B:
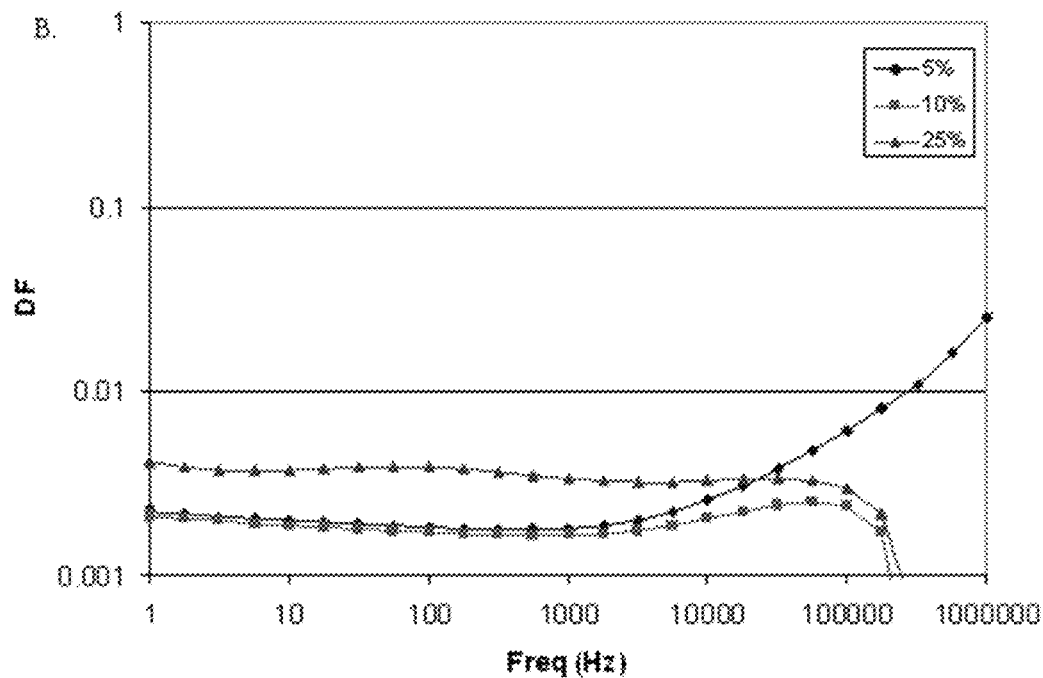

DK and DF measurements at varying frequency were performed for 40-50 nm spheres (see FIGS. 9A and 9B). DK and DE measurements at varying frequency were performed for 150 nm spheres (see FIGS. 10A and 10B). Results indicate that nanocomposites using larger sized alumina retain DK and DF values indicating that the crystal phase is alpha phase (using larger crystals) which is another while gamma phase (or mixed phases) is the only available for smaller size particles.

Figure 11:
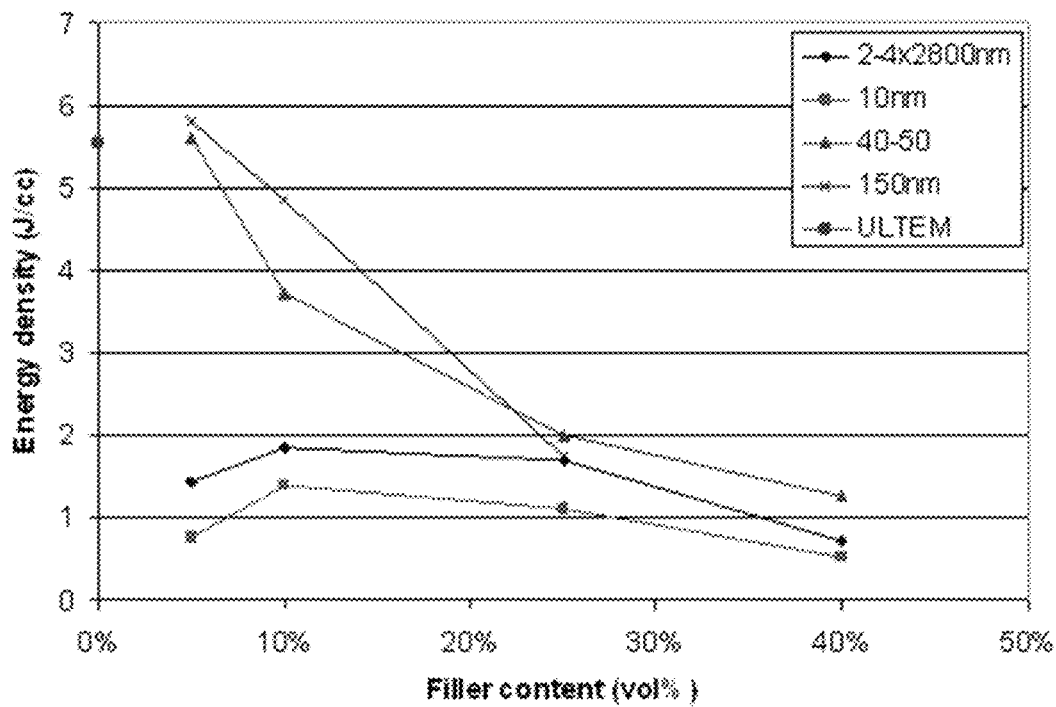
FIG. 11 shows the energy density of nanocomposites with $Al_2O_3$ as filler in ULTEM 1000.

Results show that the energy density for nanocomposites with 40-50 nm and 150 nm alumina fillers at 5 volume % loading was slightly higher than that for the polymer (ULTEM 1000) (see FIG. 11). ULTEM 1000 has an energy density of 5.54 J/cc. The energy density of the nanocomposites with alumina is shown in Table 3.

TABLE 3

| Filler (vol) | 2-4 × 2800 nm | 10 nm | 40-50 nm | 150 nm |
|---|---|---|---|---|
| 0.05 | 1.43 | 0.77 | 5.60 | 5.81 |
| 0.1 | 1.86 | 1.38 | 3.71 | 4.85 |
| 0.25 | 1.69 | 1.11 | 2.00 | 1.73 |
| 0.4 | 0.71 | 0.53 | 1.27 | |

In summary, nanocomposites with 40-50 nm and 150 nm alumina fillers show good dielectric properties while retaining a high breakdown field. Nanocomposites with 10 nm spheres and 2-4×2800 nm whiskers show low DKs with low breakdown fields. The behavior of nanocomposites with smaller size fillers (10 nm and 2-4×2800 nm whiskers) can be due to the large area of the fillers and the mixture of crystalline phases. The energy density for low loading with large particles showed similar values to ULTEM 1000. The breakdown strength and energy density both decreased with higher loadings.

4. Example 3

Barium Titanate Nanocomposites

Nanocomposites using barium titanate ($BaTiO_3$), a high DK filler, were made and tested. ULTEM 1000 was used as the polymer matrix in the nanocomposites. ULTEM 1000 without filler was used as the control. Table 4 shows the loading and particle size of the barium titanate used in the nano composites.

TABLE 4

| Design of Experiment: $BaTiO_3$ | | |
|---|---|---|
| Run # | Loading (vol %) | Size (nm) |
| 1 | 5 | 20-40 |
| 2 | 10 | 20-40 |
| 3 | 15 | 20-40 |
| 4 | 25 | 20-40 |
| 5 | 5 | 50 |

TABLE 4-continued

| Design of Experiment: $BaTiO_3$ | | |
|---|---|---|
| Run # | Loading (vol %) | Size (nm) |
| 6 | 10 | 50 |
| 7 | 15 | 50 |
| 8 | 25 | 50 |
| 9 | 5 | 100 |
| 10 | 10 | 100 |
| 11 | 15 | 100 |
| 12 | 25 | 100 |
| 13 | 5 | 700 |
| 14 | 10 | 700 |
| 15 | 15 | 700 |
| 16 | 25 | 700 |

Samples were prepared by dispersing the filler (i.e. barium titanate) in NMP by sonicating the suspension for 1 hr. ULTEM was then dissolved in the suspension and stirred overnight at 80° C. A film was then cast from the solution at 90° C. for 1 hr. The film was dried for 12 hrs at 200° C. under vacuum and $N_2$ gas. Gold was sputtered on the films (25 mA, 4 min) for metallization.

Figures 12A, 12B:
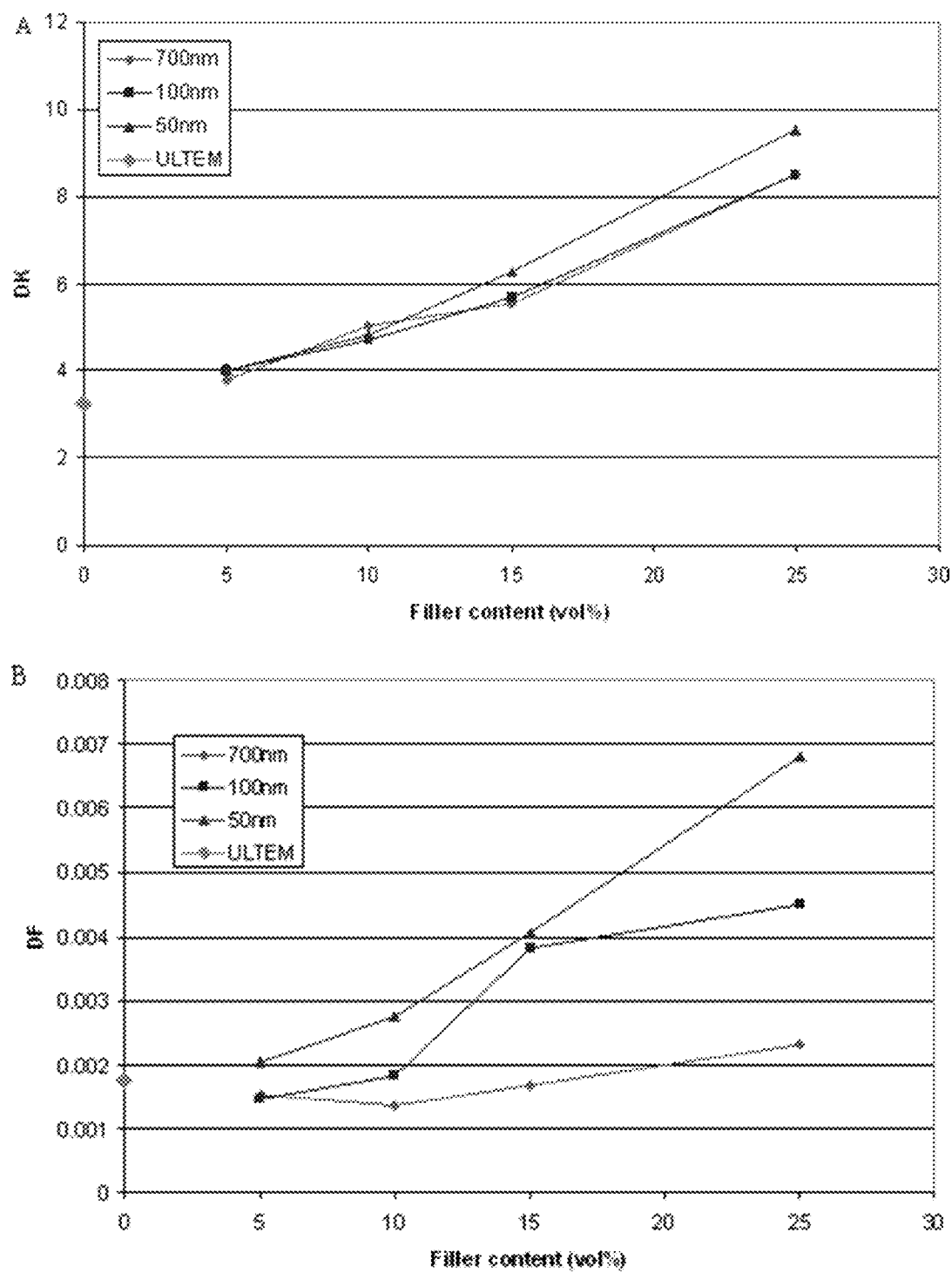
FIGS. 12A and 12B show the DK and DF of nanocomposites with $BaTiO_3$ as filler in ULTEM 1000.

Nanocomposites with barium titanate regardless of the size of the barium titanate particles increased the DK on the nanocomposite compared to the control (see FIG. 12A). The DF of nanocomposites with barium titanate regardless of the size of the barium titanate particles was similar to the control at low loadings. The DF increased at higher loadings for nanocomposites having smaller sized barium titanate particles (50 nm and 100 nm) while the DF remained fairly constant for nanocomposites with larger particles (700 nm) (see FIG. 12B). All DF values for nanocomposites with barium titanate were low (<1%).

Figures 13A, 13B:
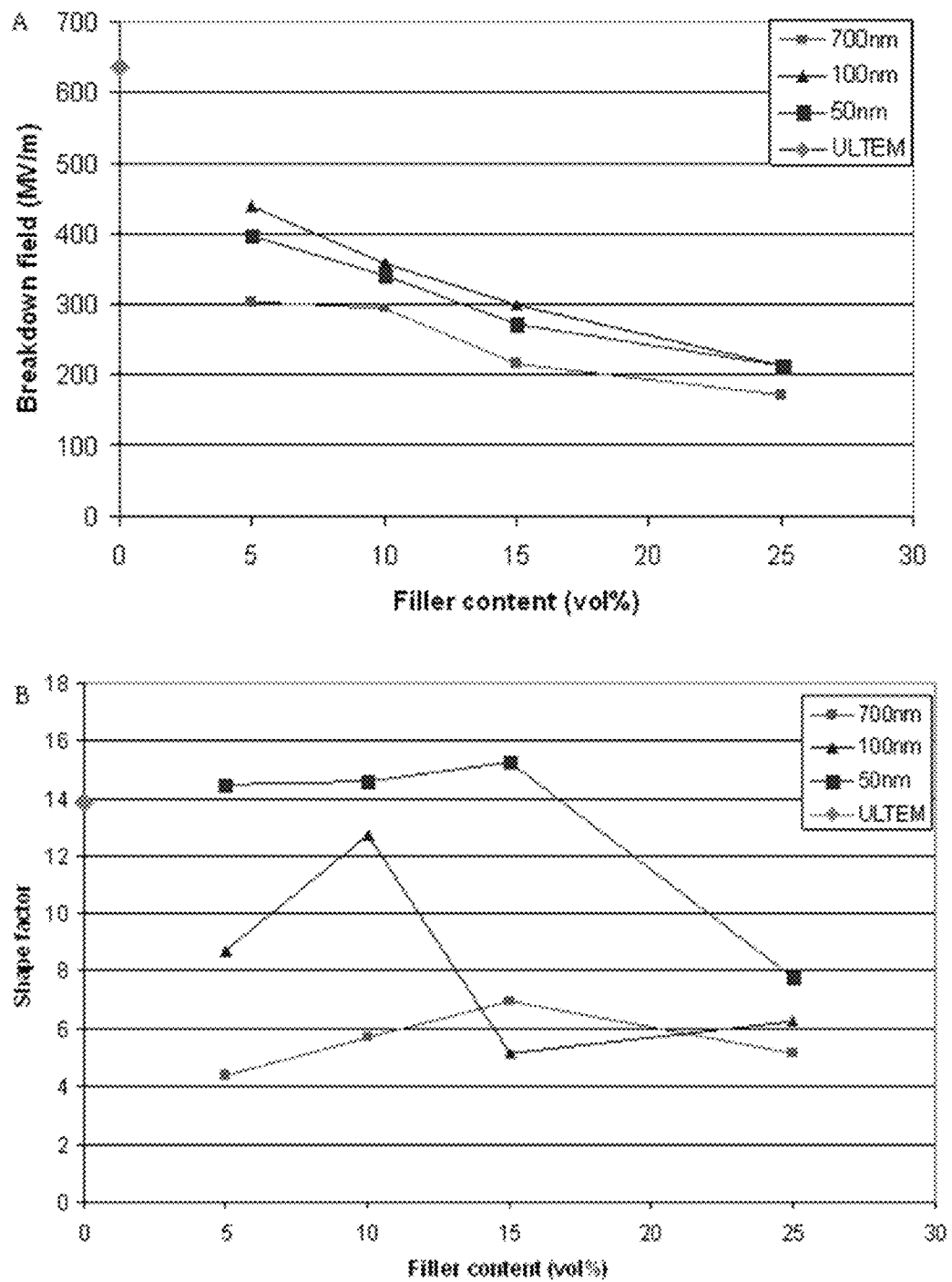
FIGS. 13A and 13B show the break down strength and shape factor of nanocomposites with $BaTiO_3$ as a filler in ULTEM 1000.

The breakdown strength of nanocomposites was lower than the breakdown strength of the control (see FIG. 13A). The shape factor of the nanocomposite varied with the size of the filler (see FIG. 13B). The dielectric breakdown strength of the nanocomposites would likely increase by using an interface modifier.

Figure 14:
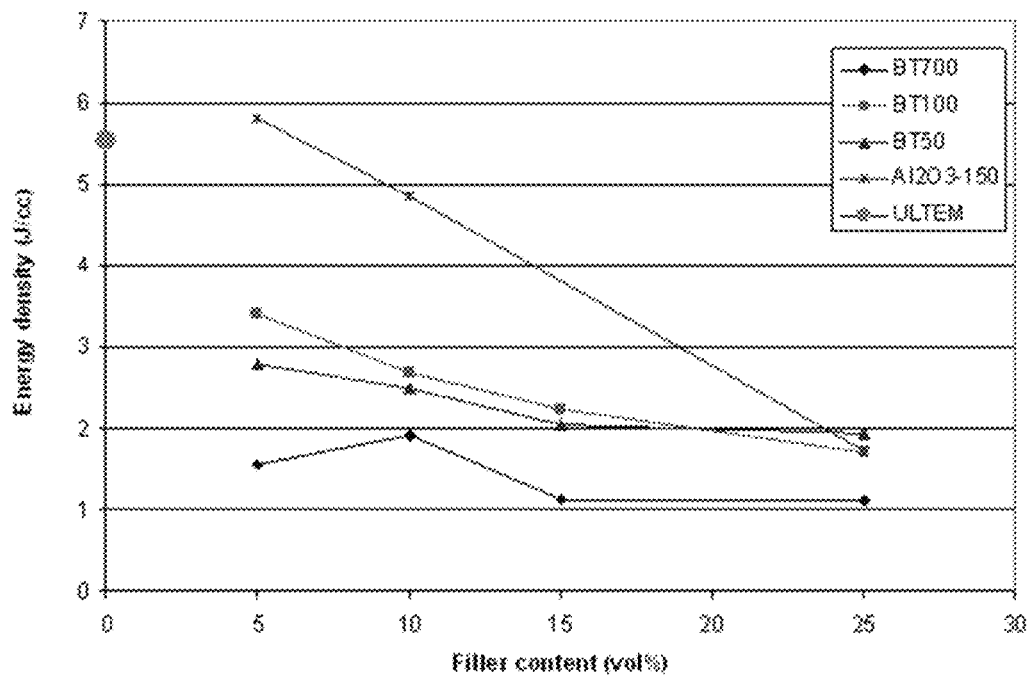
FIG. 14 shows the energy density of nanocomposites with $Al_2O_3$ or $BaTiO_3$ as filler in ULTEM 1000.

The energy density of nanocomposites with barium titanate as filler was lower than the energy density of the control (see FIG. 14). Table 5 shows the energy density of nanocomposites with barium titanate (BT) as filler.

TABLE 5

| Filler (vol %) | BT 50 nm | BT 100 nm | BT 700 nm | $Al_2O_3$ 150 nm |
|---|---|---|---|---|
| 5 | 2.79 | 3.41 | 1.54 | 5.81 |
| 10 | 2.48 | 2.67 | 1.91 | 4.85 |
| 15 | 2.04 | 2.24 | 1.14 | |
| 25 | 1.93 | 1.69 | 1.11 | 1.73 |

5. Example 4

Titania Nanocomposites

Nanocomposites using titania ($TiO_2$), an intermediate DK filler, were made and tested. ULTEM 1000 was used as the polymer matrix in the nanocomposites. ULTEM 1000 without filler was used as the control. Table 6 shows the loading and particle size of the titania used in the nanocomposites.

TABLE 6

Design of Experiment: TiO$_2$

| Run # | Loading (vol %) | Size (nm) |
|---|---|---|
| 1 | 5 | 20 |
| 2 | 10 | 20 |
| 3 | 15 | 20 |
| 4 | 25 | 20 |
| 5 | 5 | 50 |
| 6 | 10 | 50 |
| 7 | 15 | 50 |
| 8 | 25 | 50 |
| 9 | 5 | 100 |
| 10 | 10 | 100 |
| 11 | 15 | 100 |
| 12 | 25 | 100 |
| 13 | 5 | 5000 |
| 14 | 10 | 5000 |
| 15 | 15 | 5000 |
| 16 | 25 | 5000 |

Figure 15A:
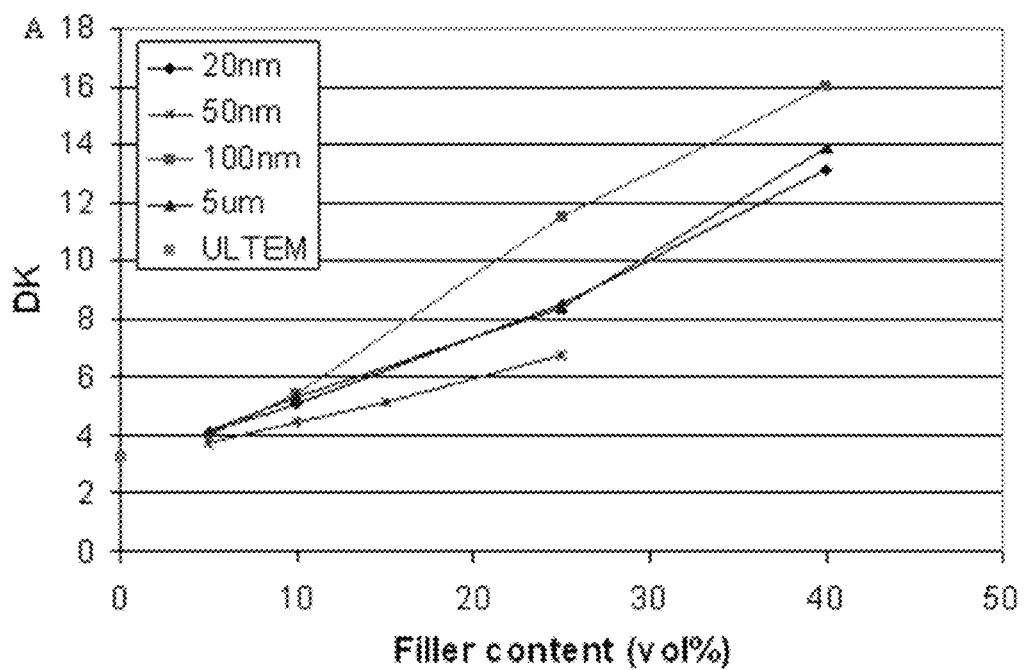
FIGS. 15A and 15B show the DK and DF of nanocomposites with $TiO_2$ as filler in ULTEM 1000.
Figure 15B:
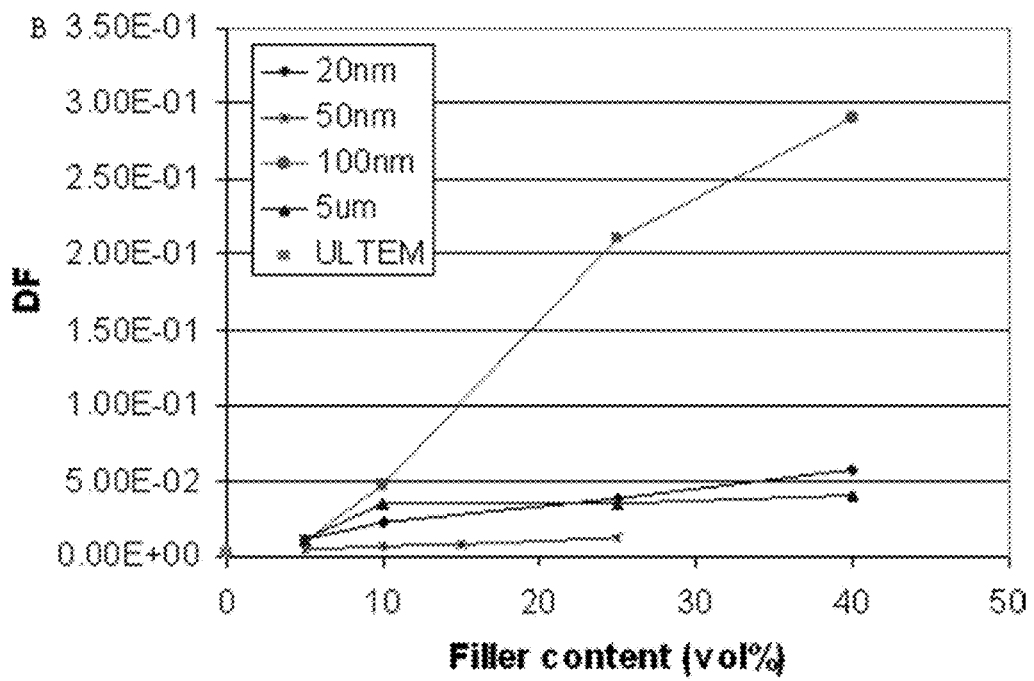

Samples were prepared by dispersing the filler (i.e. titania) in NMP by sonicating the suspension for 1 hr. ULTEM 1000 was then dissolved in the suspension and stirred overnight at 80° C. A film was then cast from the solution at 90° C. for 1 hr. The film was dried for 12 hrs at 200° C. under vacuum and N$_2$ gas. Gold was sputtered on the films (25 mA, 4 min) for metallization, Nanocomposites with titania regardless of the size of the titania particles increased the DK on the nanocomposite compared to the control (see FIG. 15A). The DF of nanocomposites with titania regardless of the size of the titania particles was similar to the control at low loadings. The DF increased at higher loadings for nanocomposites having 100 nm titania particles while the DF remained fairly constant for nanocomposites with smaller and larger particles (20 nm, 50 nm and 5 microns) (see FIG. 15B). No size dependency was detected for these nanocomposites.

Figure 16:
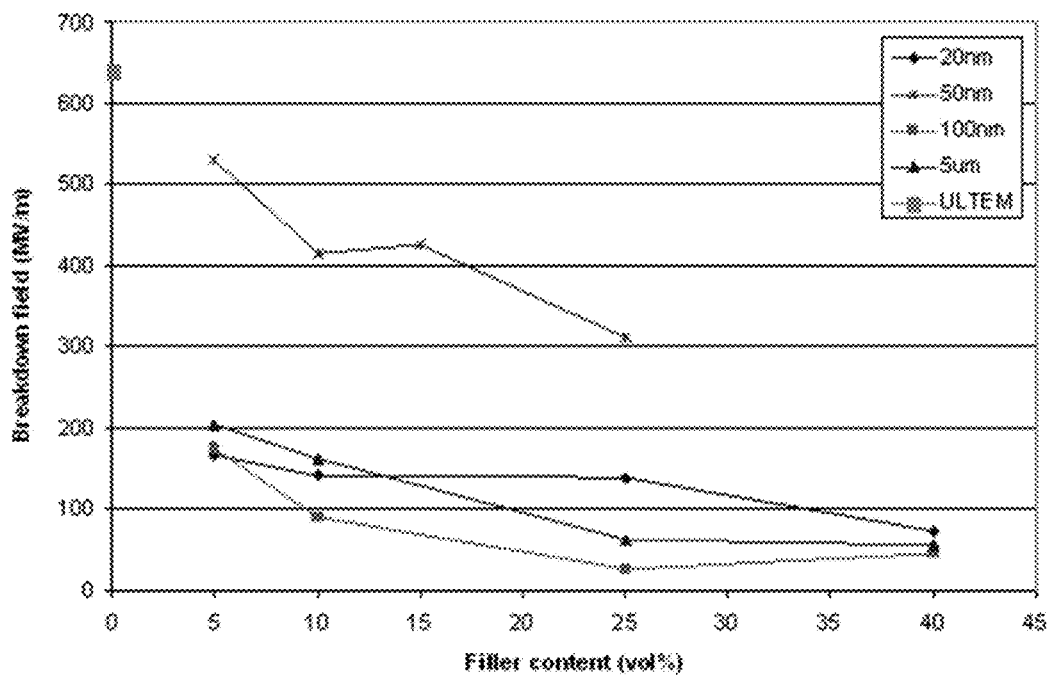
FIG. 16 shows the dielectric breakdown strength of nanocomposites with $TiO_2$ as filler in ULTEM 1000.

The breakdown strength of the nanocomposites was lower than the breakdown strength of the control (see FIG. 16). Nanocomposites with 50 nm filler showed the highest breakdown strength for all loadings. The lower breakdown strengths were due to high conduction loss.

Figure 17:
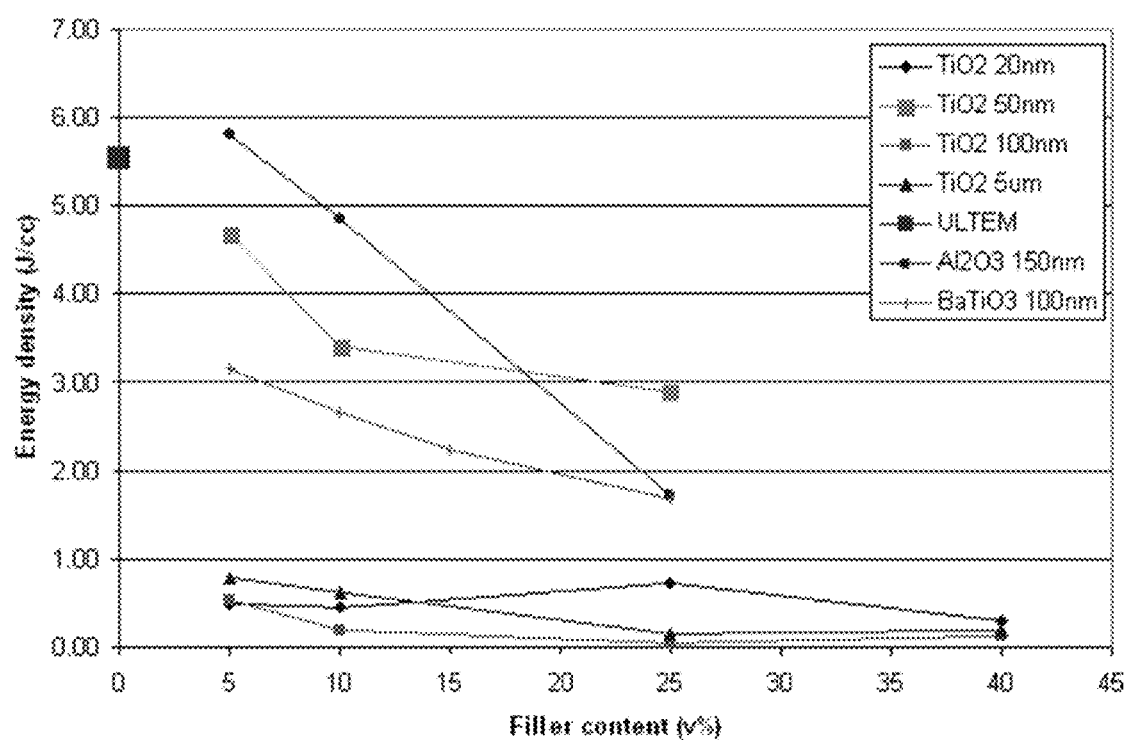
FIG. 17 shows the energy density of nanocomposites with $TiO_2$, $BaTiO_3$, or $Al_2O_3$ as filler in ULTEM 1000.

The energy density of nanocomposites with titania as filler was lower than the energy density of the control (see FIG. 17). Nanocomposites with 50 nm filler showed the highest energy density. Table 7 shows the energy density of nanocomposites with titania as filler.

TABLE 7

| Filler vol % | TiO$_2$ 20 nm | TiO$_2$ 50 nm | TiO$_2$ 100 nm | TiO$_2$ 5 um | Al$_2$O$_3$ 150 nm | BaTiO$_3$ 100 nm |
|---|---|---|---|---|---|---|
| 5 | 0.49 | 4.69 | 0.54 | 0.78 | 5.81 | 3.41 |
| 10 | 0.45 | 3.45 | 0.19 | 0.62 | 4.85 | 2.67 |
| 25 | 0.73 | 2.98 | 0.03 | 0.14 | 1.73 | 1.69 |
| 40 | 0.3 | N/A | 0.14 | 0.19 | N/A | N/A |

6. Example 5

Comparison of Nanocomposites

Figure 18:
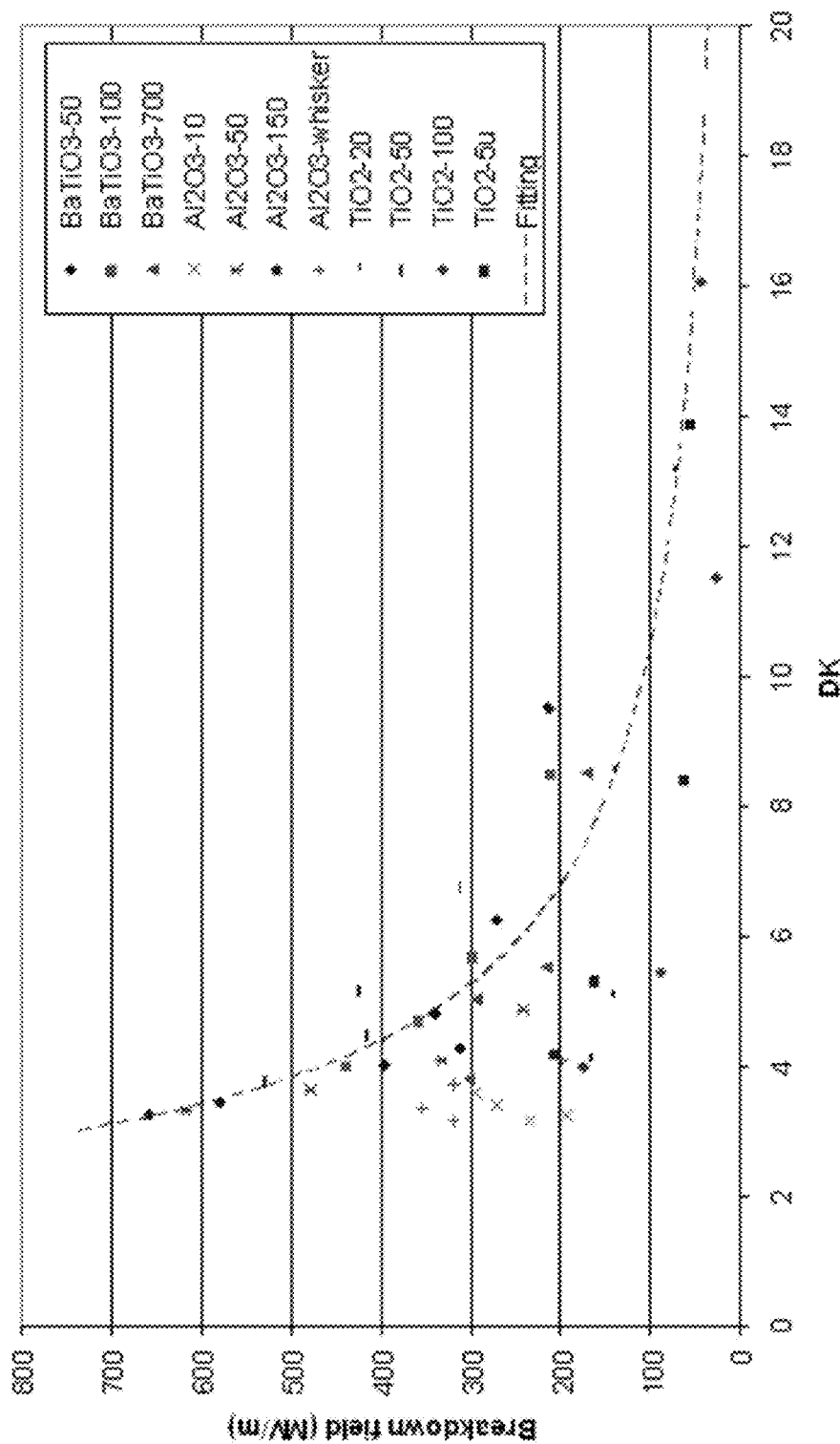
FIG. 18 shows the breakdown strength as a function of the DK of nanocomposites with $TiO_2$, $BaTiO_3$, or $Al_2O_3$ as filler in ULTEM 1000.

Results show that the nanocomposites have decreased breakdown strengths $E_{BD}$ with increasing DK (see FIG. 18). However, when DK increases the $E_{BD}$ decreases faster for nanocomposites than for homogenous materials.

Figure 19:
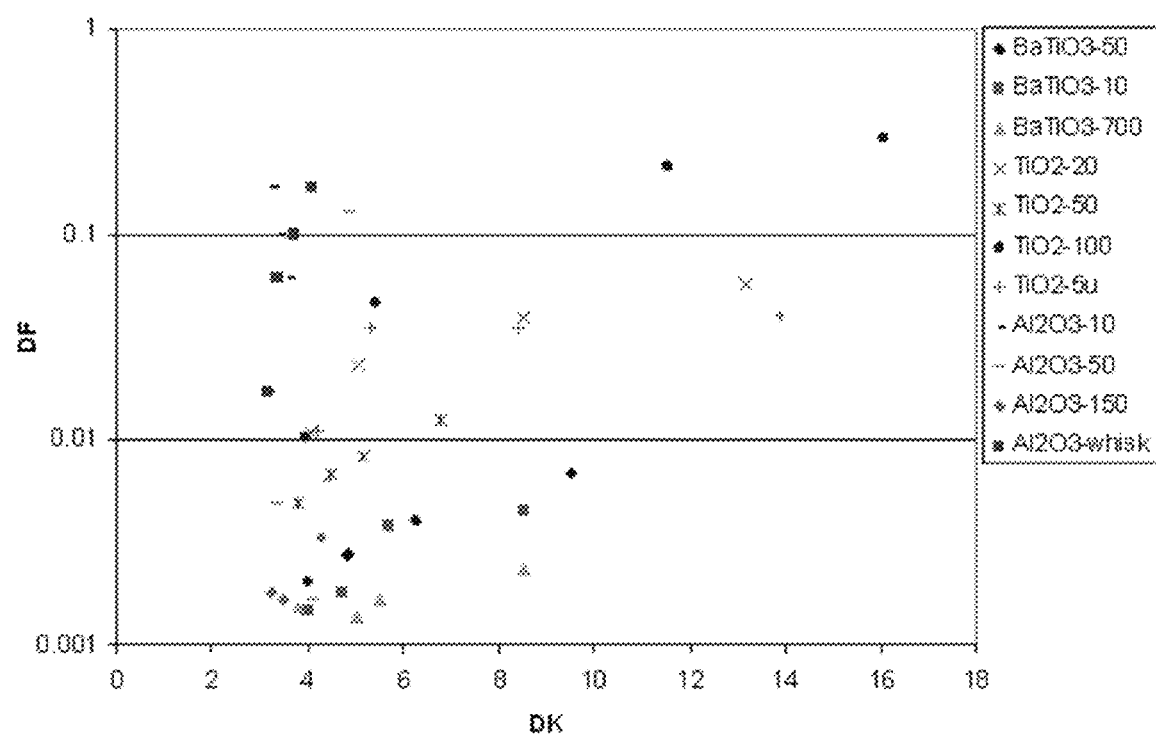
FIG. 19 shows the DF as a function of the DK of nanocomposites with $TiO_2$, $BaTiO_3$, or $Al_2O_3$ as filler in ULTEM 1000.

Frequency dependency and interfacial effects influence the DK and DF relationship. In general, DF increases as DK increases (see FIG. 19). Higher DF values in high DK materials is due to relaxation of large dipoles. The data indicates that DK values of lower than 10 still have DF values below 1%.

Figures 20A, 20B:
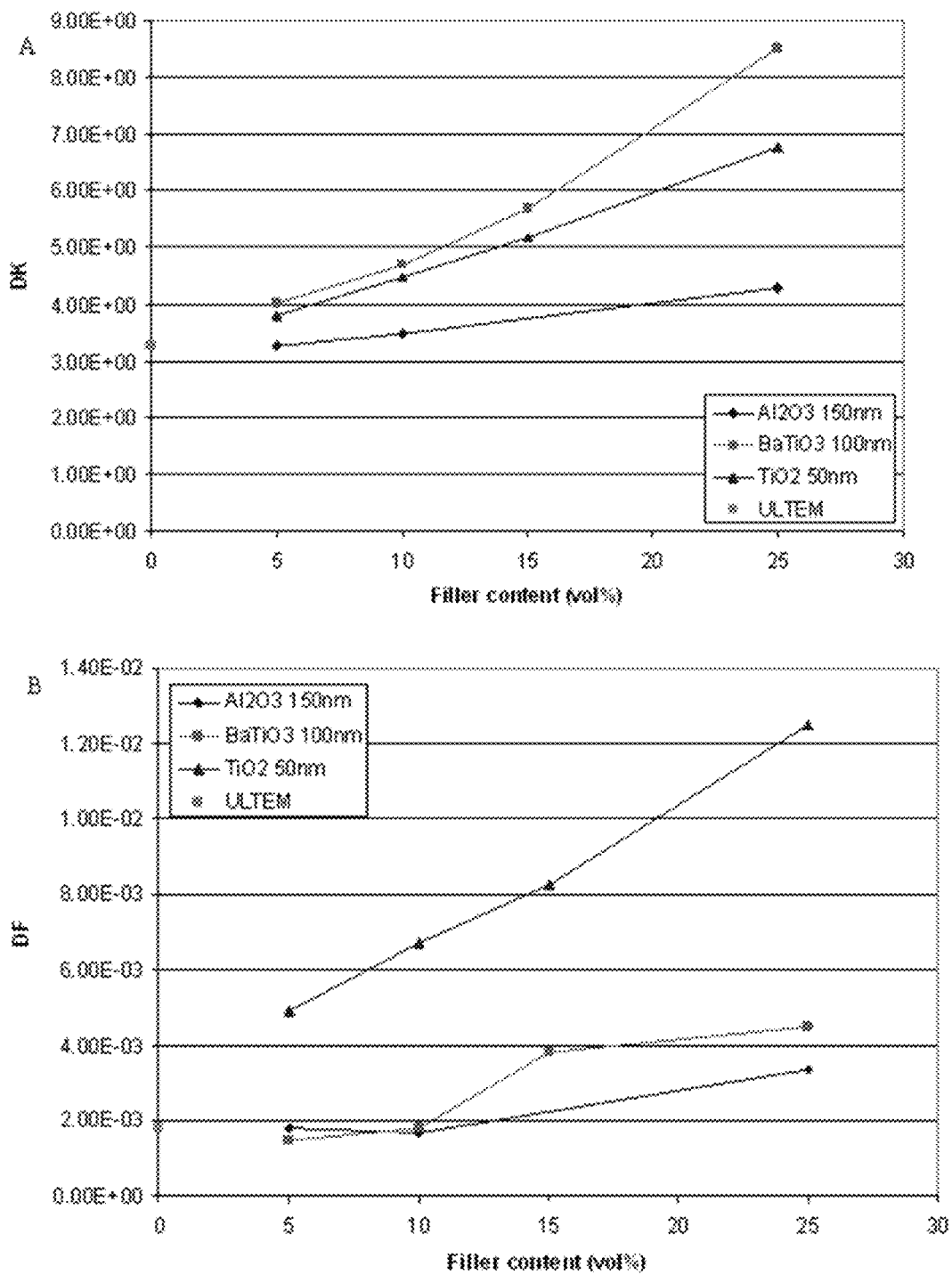
FIGS. 20A and 20B show the DK and DF of nanocomposites with $TiO_2$, $BaTiO_3$, or $Al_2O_3$ as filler in ULTEM 1000.

As the DK of the fillers are higher than the DK of the polymer the DK of the nanocomposite increases with increasing filler content (see FIG. 20A). The DF also increases with increasing filler content (see FIG. 20B)

Figures 21A, 21B:
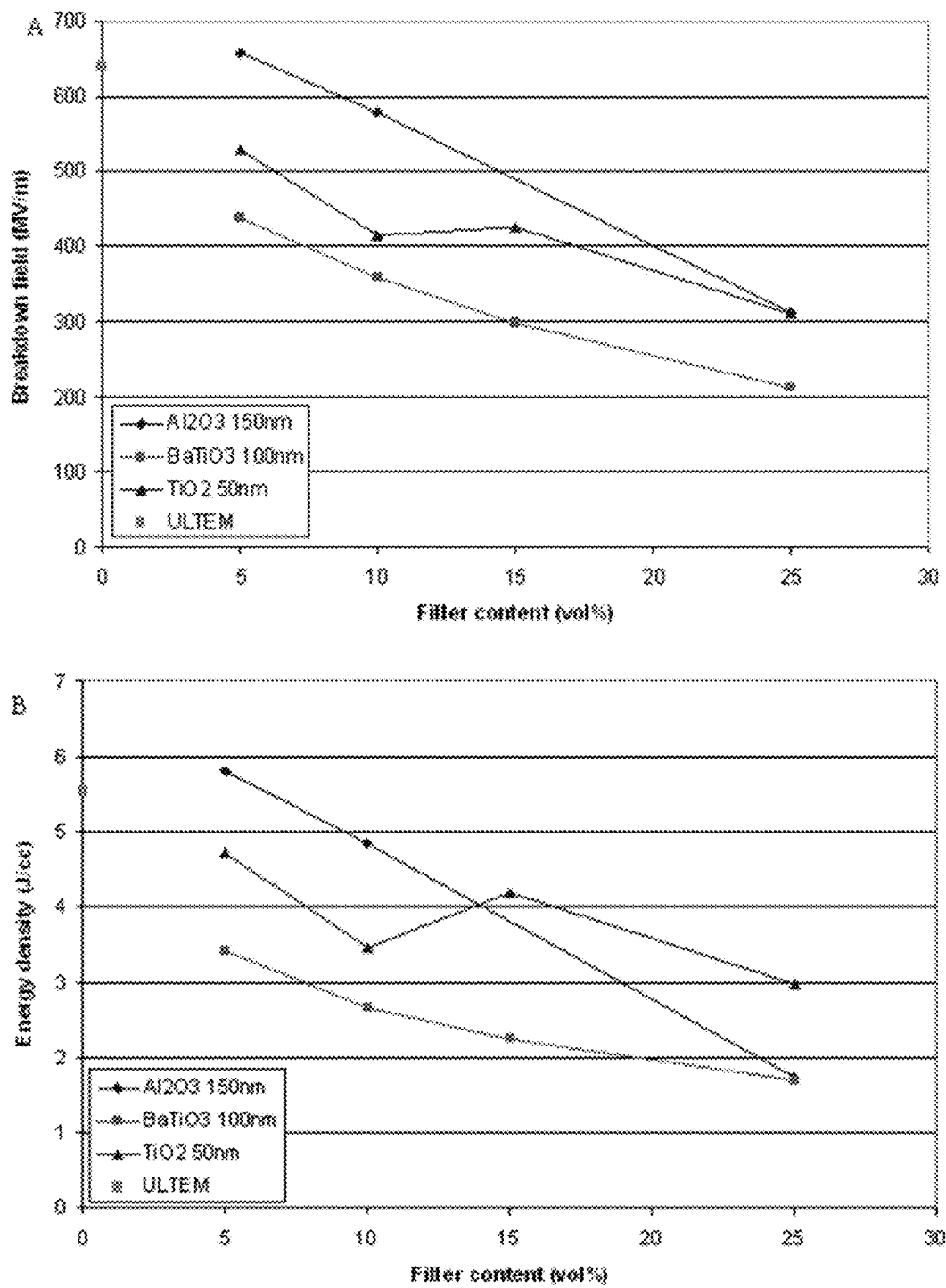
FIGS. 21A and 21B show the dielectric breakdown strength and energy density of nanocomposites with $TiO_2$, $BaTiO_3$, or $Al_2O_3$ as filler in ULTEM 1000.

The breakdown strength decreases with increasing filler content due to 1) higher local electric field and 2) the effect of percolation in heavily loaded composites (see FIG. 21A). The energy density strongly depends on the breakdown strength, so it also decreases with increasing filler content (see FIG. 21B).

Figure 22A:
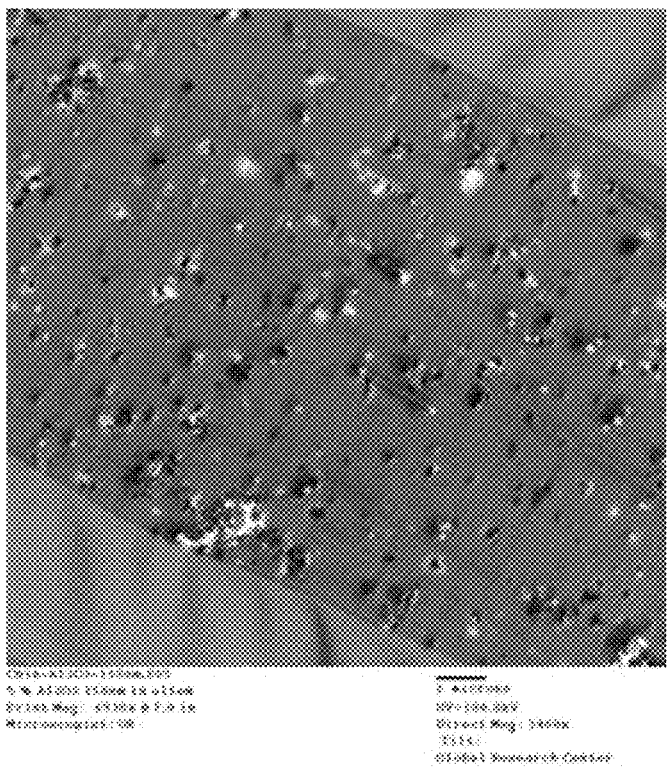
FIG. 22A-22C show scanning electron microscopy (SEM) images of the dispersion of nanofillers in ULTEM 1000 nanocomposites. 22A shows $Al_2O_3$ as filler in ULTEM 1000. 22B shows $TiO_2$ as filler in ULTEM 1000. 22C shows $BaTiO_3$ as filler in ULTEM 1000.
Figure 22B:
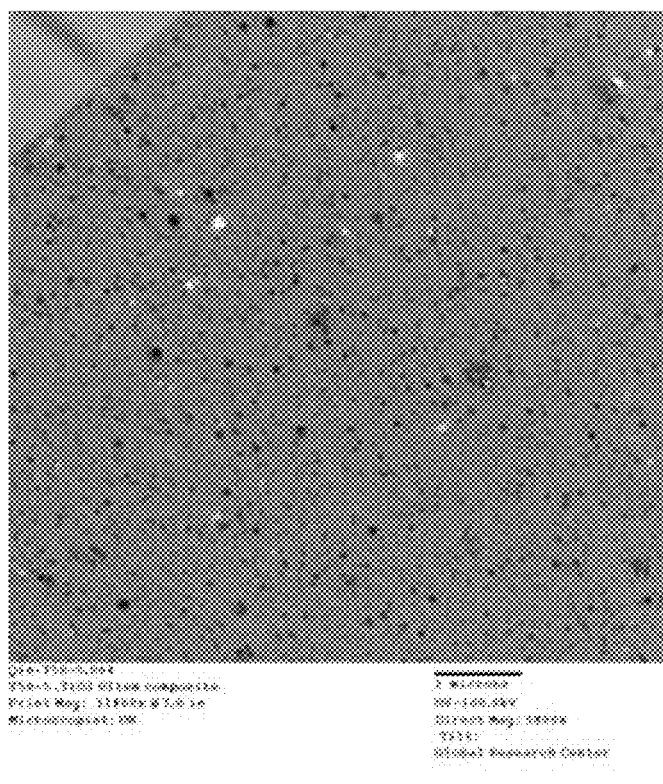
Figure 22C:
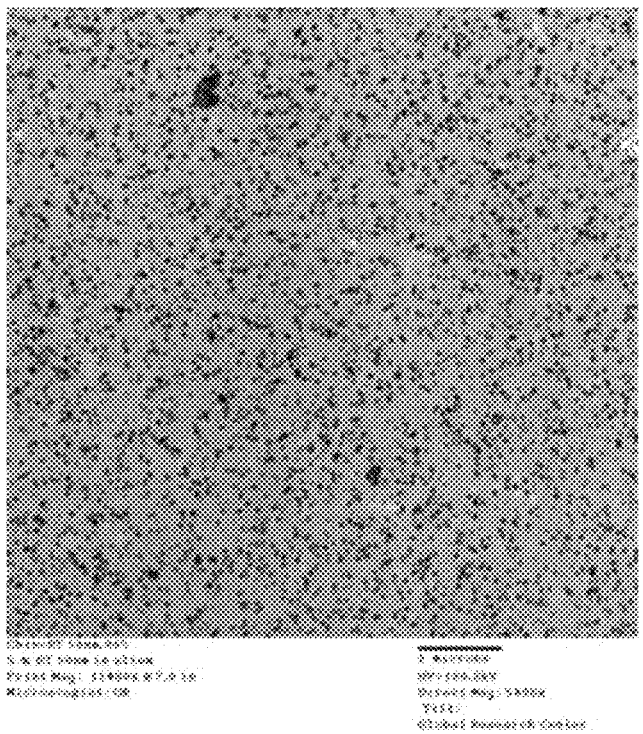

The dispersion of nanofillers in ULTEM 1000 is shown in FIGS. 22A-22C. The breakdown strengths seem to be dominated by the DK of the fillers rather than by the quality of filler dispersion, by comparison 22A with 22C.

7. Example 6

Silica Nanocomposites

Nanocomposites using silica (SiO$_2$) were made and tested. ULTEM 1000 was used as the polymer matrix in the nanocomposites. ULTEM 1000 without filler was used as the control. Table 8 shows the loading and particle size of the silica used in the nanocomposites.

TABLE 8

| Silica particle | Filler volume %: | | | |
|---|---|---|---|---|
| Fumed silica 12 nm | 5% | 10% | 15% | 40% |
| Silica particle, 15 nm | 5% | 10% | 25% | 40% |
| Silica particle, 80 nm | 5% | 10% | 25% | 40% |
| Quartz particle, 3 um | 5% | 10% | 25% | 40% |
| Colloidal silica, 10-15 nm | 5% | 10% | 25% | 40% |

Samples were prepared by dispersing the filler (i.e. silica) in NMP by sonicating the suspension for 1 hr. ULTEM 1000 was then dissolved in the suspension and stirred overnight at 80° C. A film was then cast from the solution at 90° C. for 1 hr. The film was dried for 12 hrs at 200° C. under vacuum and N$_2$ gas. Gold was sputtered on the films (25 mA, 4 min) for metallization, Different size silica was used to evaluate the DK of the nanocomposites. The silica was bought from NanoAmor (15 nm, 80 nm, quartz), Evonik (fumed silica) and Nissan Chemical Inc. (colloidal silica).

Figure 23A:
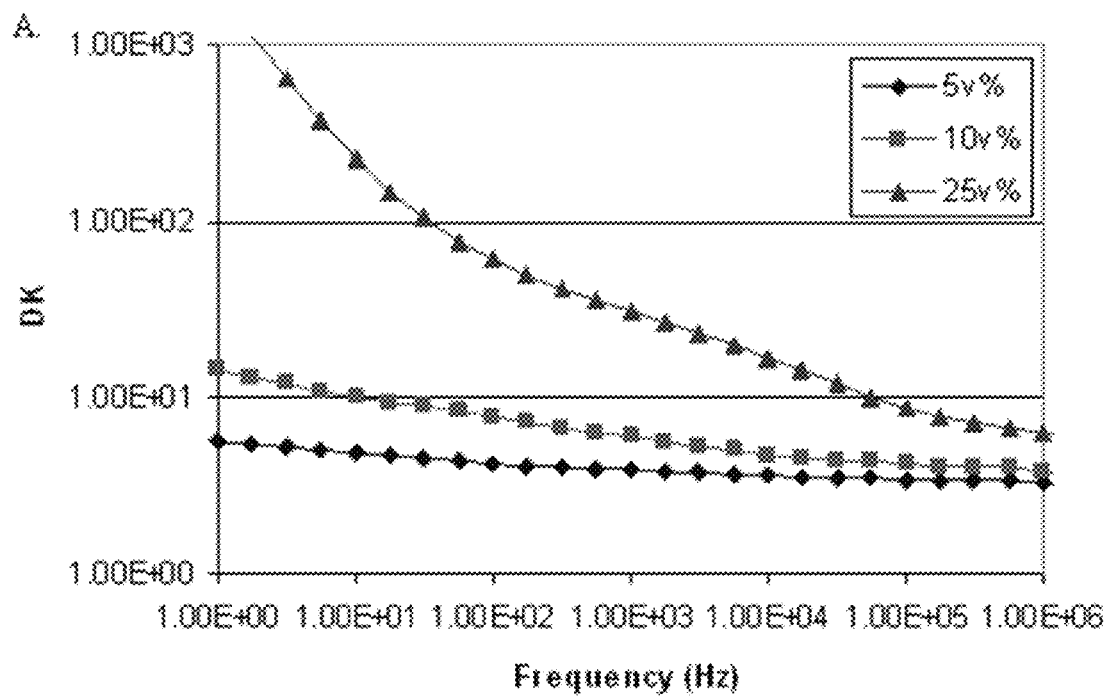
FIGS. 23A and 23B show the DK and DF of nanocomposites with 15 nm silica dry powder as filler in ULTEM 1000.
Figure 23B:
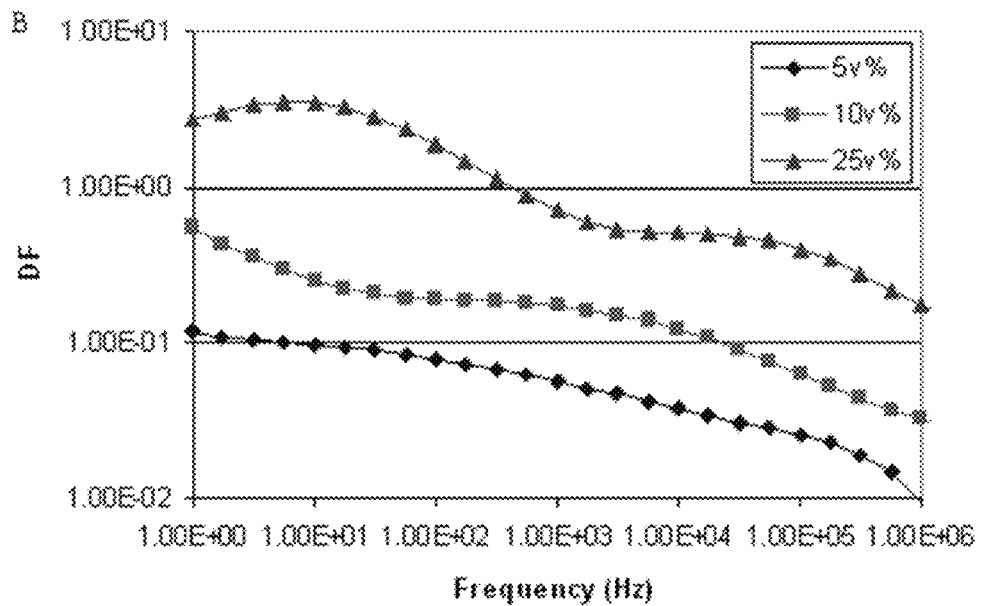

The DK and DF at different frequencies were tested in nanocomposites with 15 nm silica as filler, see FIGS. 23A and 23B. Higher filler loading increased the DF. Relaxations peaks were also observed.

Figure 24A:
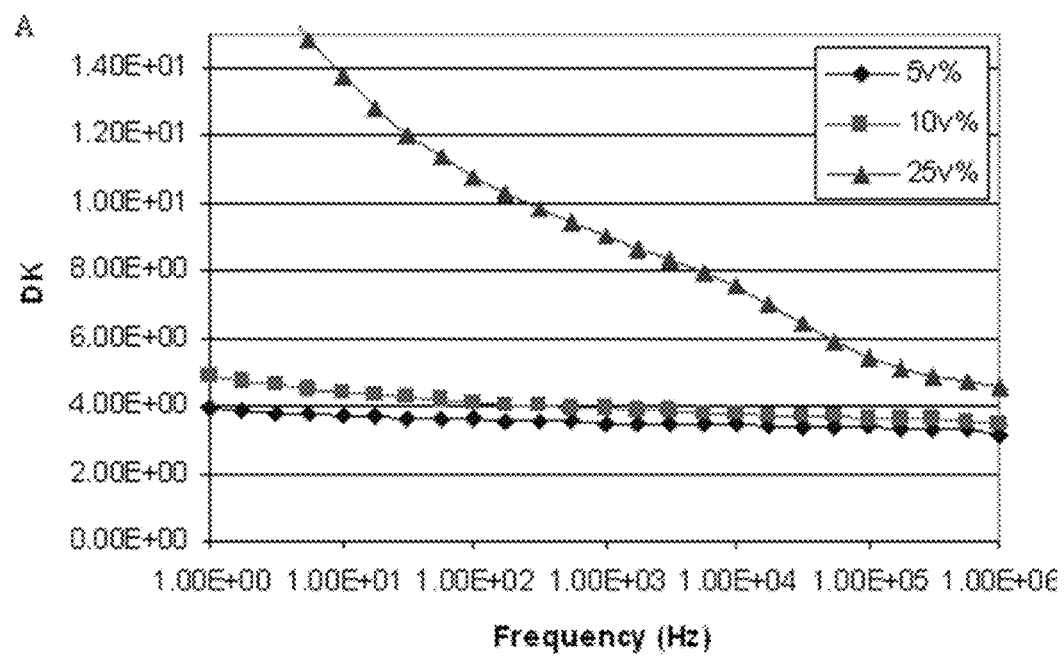
FIGS. 24A and 24B show the DK and DF of nanocomposites with 80 nm silica dry powder as filler in ULTEM 1000.
Figure 24B:
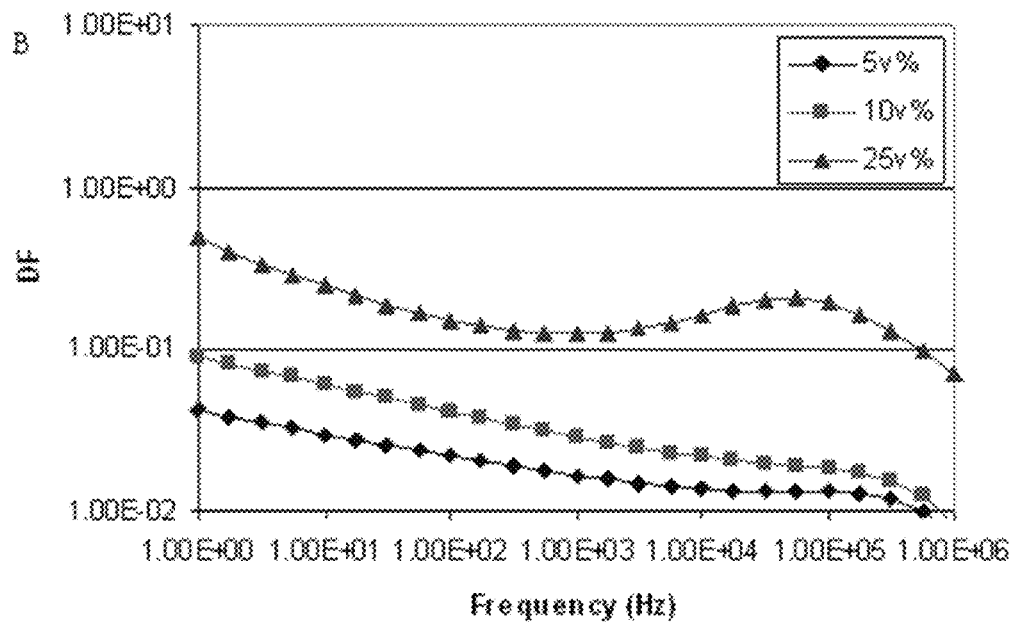

The DK and DF at different frequencies were tested in nanocomposites with 80 nm silica as filler, see FIGS. 24A and 24B. The DF was lower than for nanocomposites with 15 nm silica as filler. For higher loadings (25%) relaxations peaks were observed.

Figure 25A:
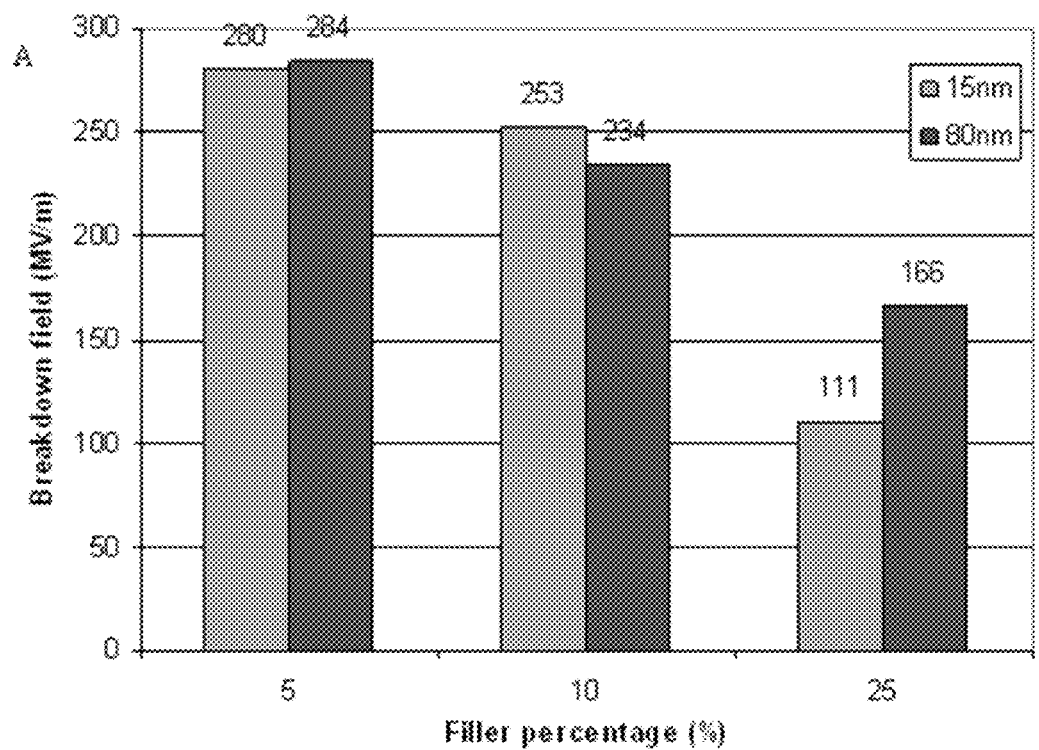
FIGS. 25A and 25B show the breakdown strength and energy density of nanocomposites with 15 or 80 nm silica dry powder as filler in ULTEM 1000.
Figure 25B:
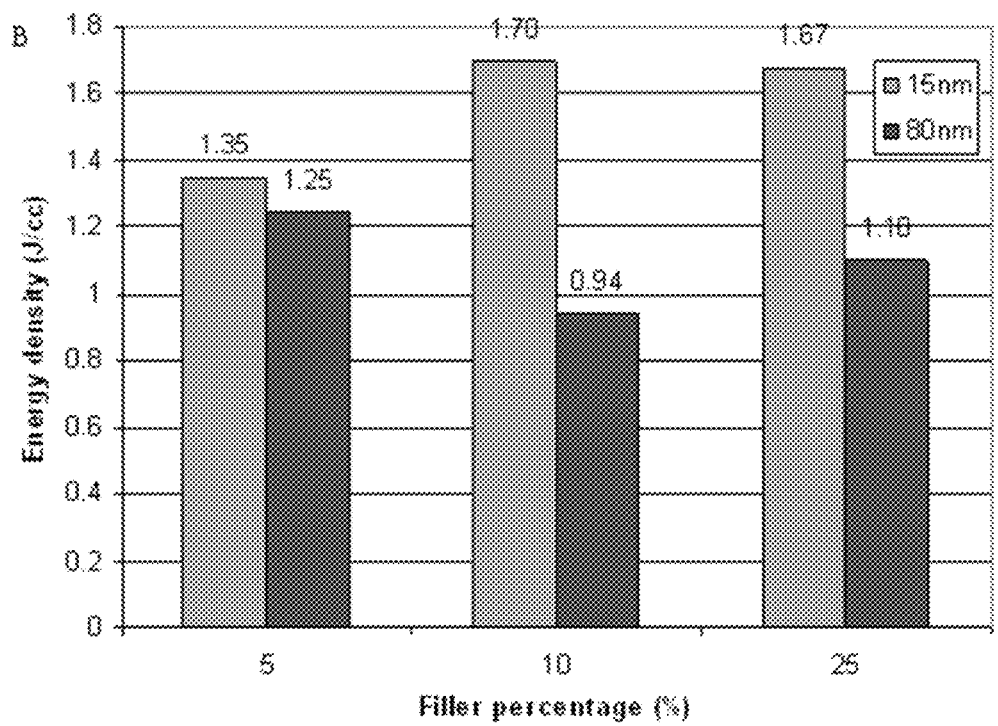

The breakdown strengths and energy density for nanocomposites with 15 nm and 80 nm silica fillers were measured; see FIGS. 25A and 25B. Both the breakdown strengths and energy density were lower than those of the control (ULTEM 1000).

Figure 26A:
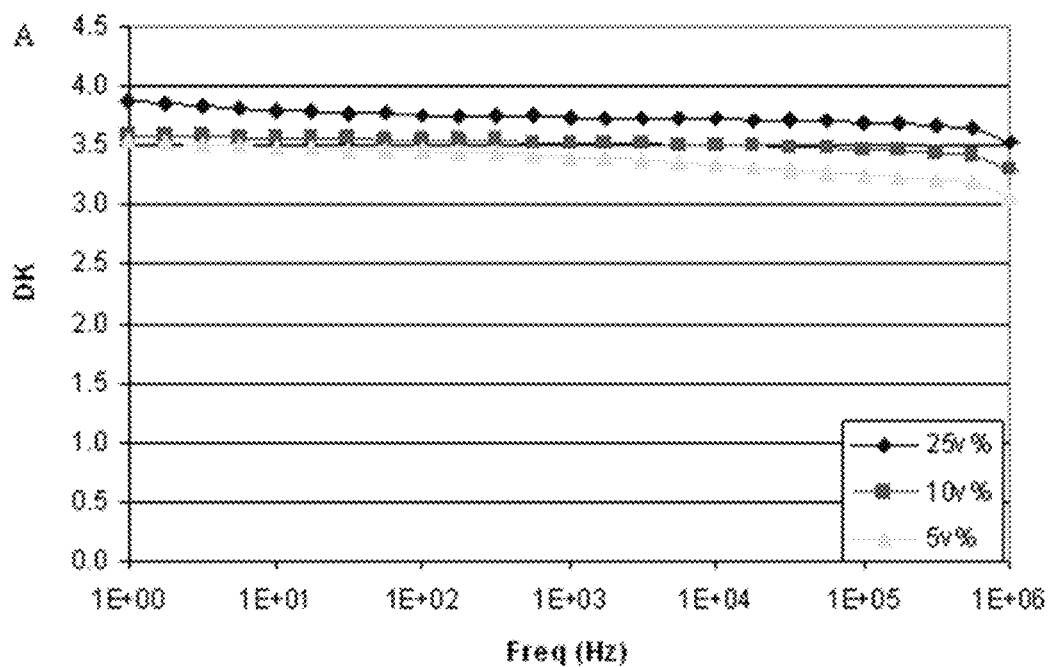
FIGS. 26A and 26B show the DK and DF of nanocomposites with 3 μm quartz as filler in ULTEM 1000.
Figure 26B:
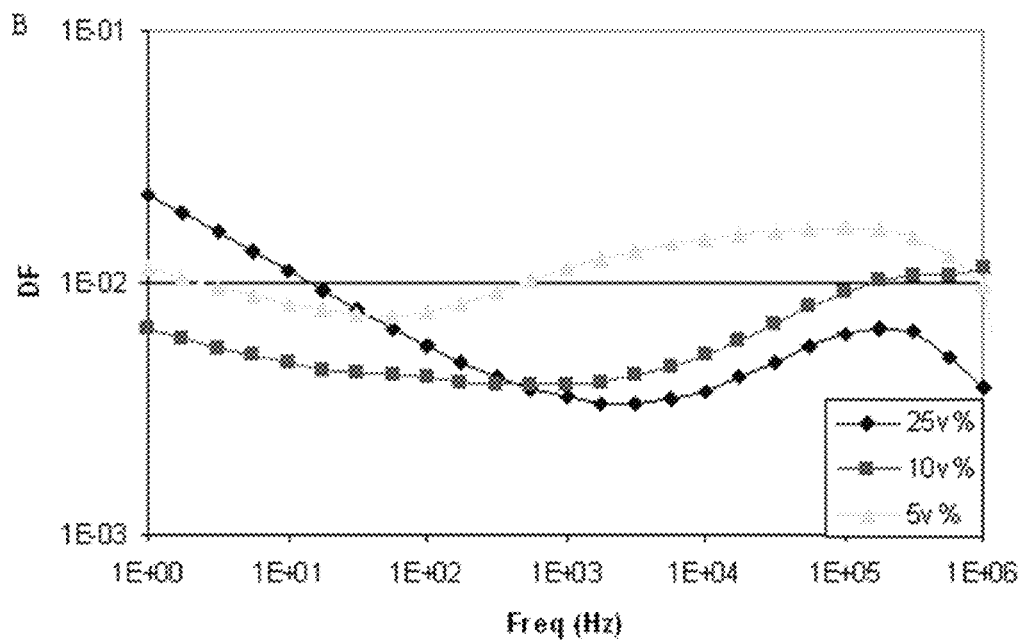

The DK and DF at different frequencies were measured in nanocomposites with 3 micron quartz as filler, see FIGS. 26A and 26B. The DK was constant over the tested range of frequencies. The DF was generally low for these nanocomposites.

Figure 27A:
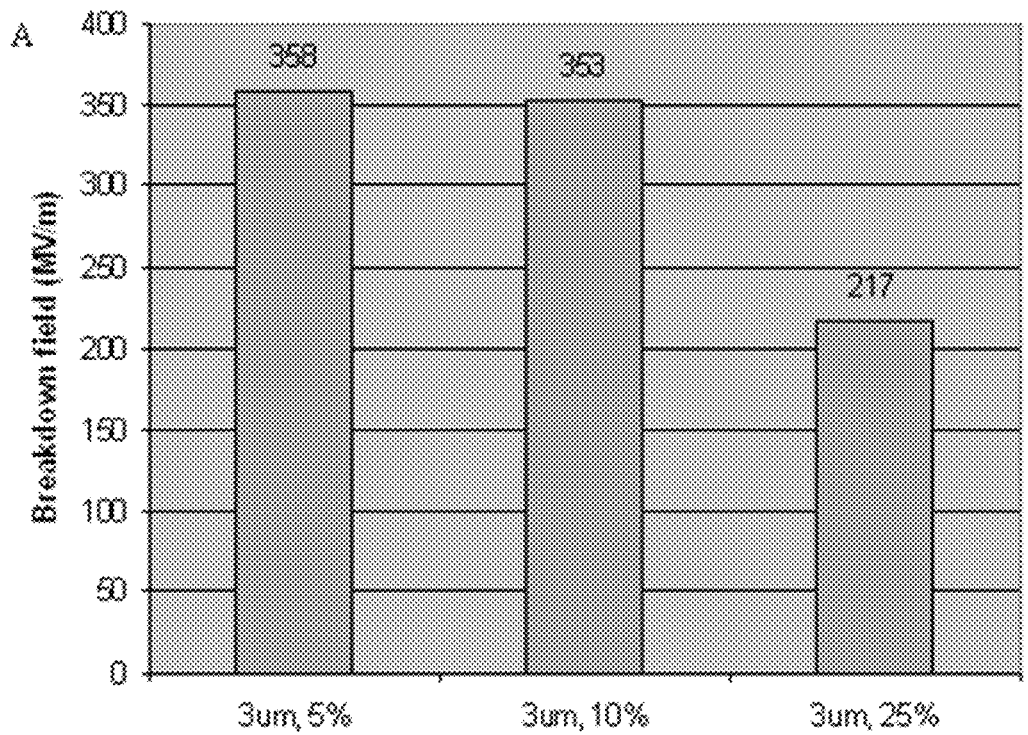
FIGS. 27A and 27B show the dielectric breakdown strength and the weibull probability plot of nanocomposites with 3 μm quartz as filler in ULTEM 1000.
Figure 27B:
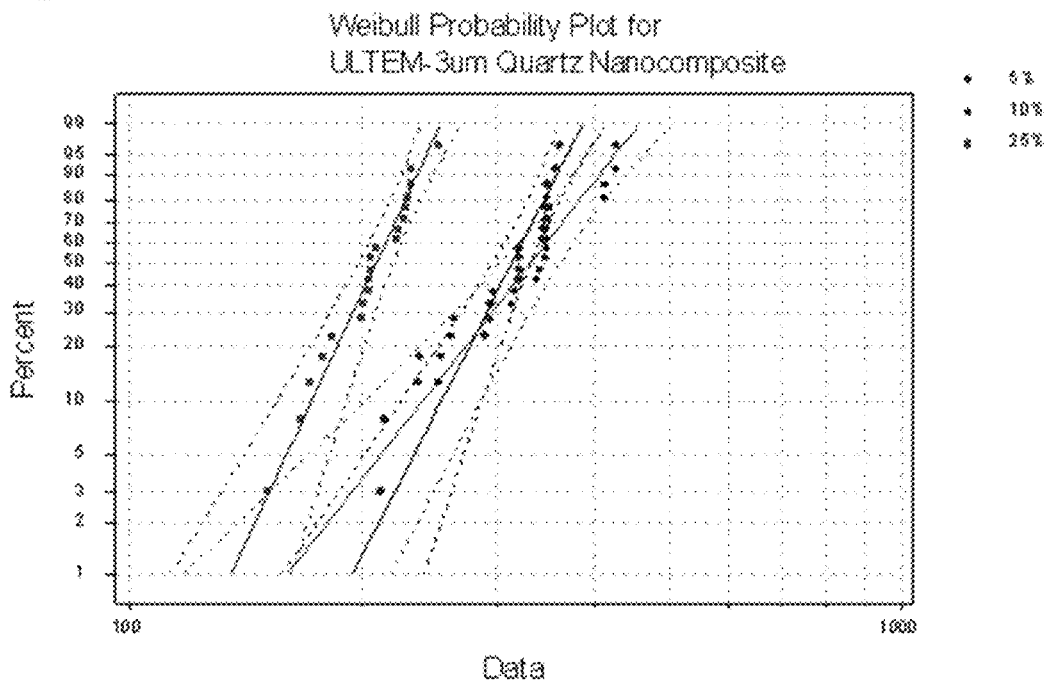
Figure 28:
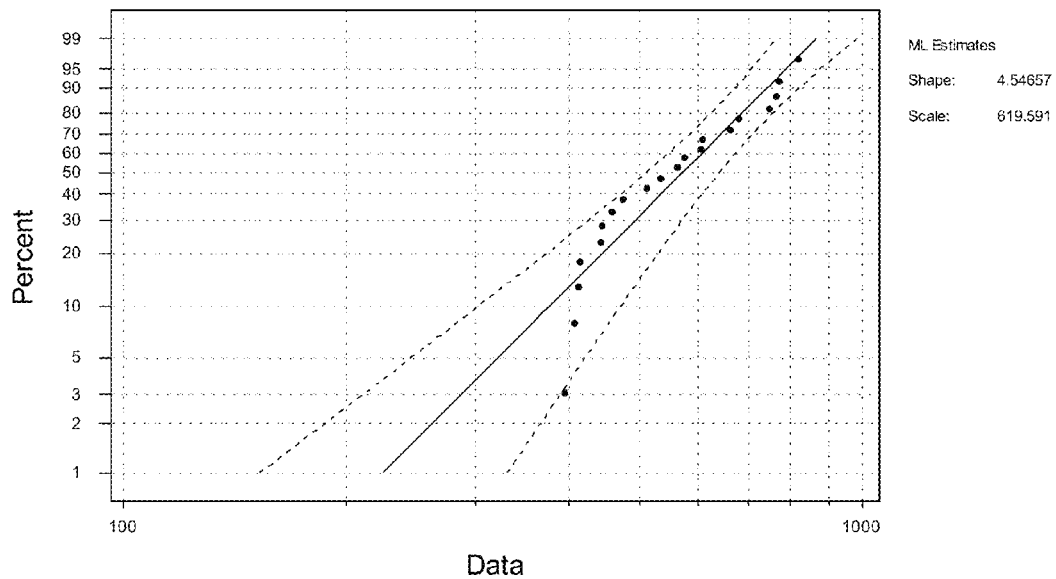
FIG. 28 shows the weibull probability plot of ULTEM 1000.

The breakdown strength of nanocomposites with 3 micron quartz as filler were lower than the control, see FIGS. 27 A and B. The breakdown strength of the control was 620 MV/m at 67% relative humidity, see FIG. 28. Accordingly, the test method is reliable.

Aerosil 200 fumed silica with an average primary particle size of 12 nm was added as filler to ULTEM 1000 to make nanocomposites as described above. The morphology of the silica filler is such that the primary particles fused into three-dimensional, chain like secondary particles (aggregates), then agglomerate into tertiary particles. The surface area of the fumed silica is high. The DK, DF and breakdown strength was tested for these nanocomposites under varying humidity, see FIGS. 29A and 29B. The breakdown strength was similar to the control at low loadings.

Figure 30A:
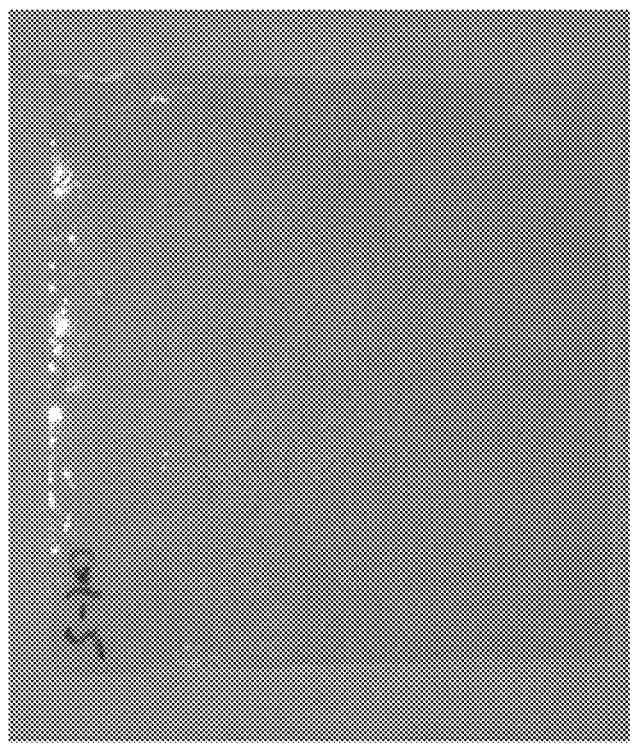
FIGS. 30A and 30B show nanocomposite films. 30A shows a nanocomposite film made from colloidal silica and ULTEM 1000. 30B shows a nanocomposite film made from 3 micron quartz and ULTEM 1000.
Figure 30B:
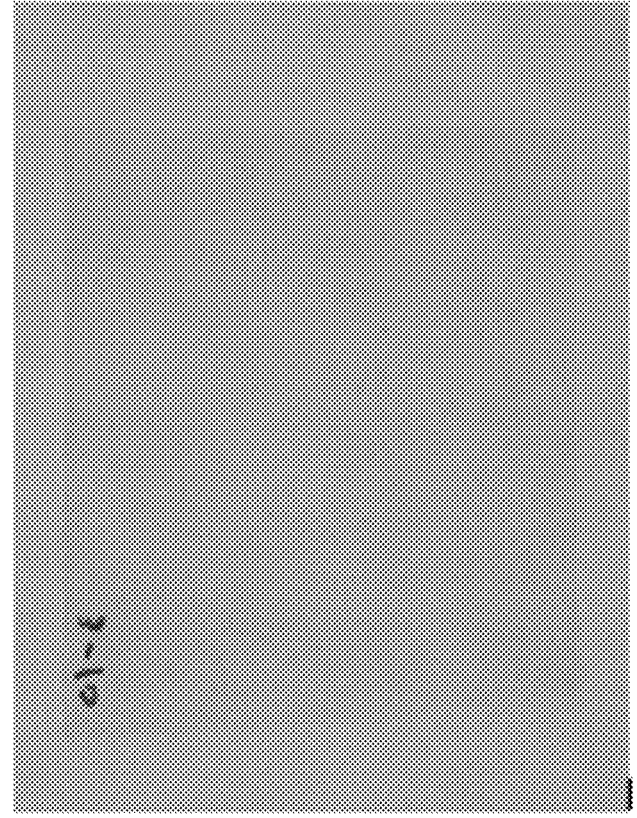

Nanocomposites with colloidal silica were made as follows. N,N-dimethyl acetamide (DMAc) was used to produce a stable colloidal dispersion of particle size of 10-15 nm at 20-21 weight % loading at pH of 4-6. ULTEM 1000 can be dissolved in DMAc, however the dispersion can contain agents that can promote polymer dispersion rather than a solution of polymer if ULTEM 1000 is added to the dispersion directly. Therefore, ULTEM was first dissolved in NMP or DMAc and then mixed with the colloidal dispersion. A film was case from this system successfully, see FIGS. 30A and 30B.

Figures 31A, 31B:
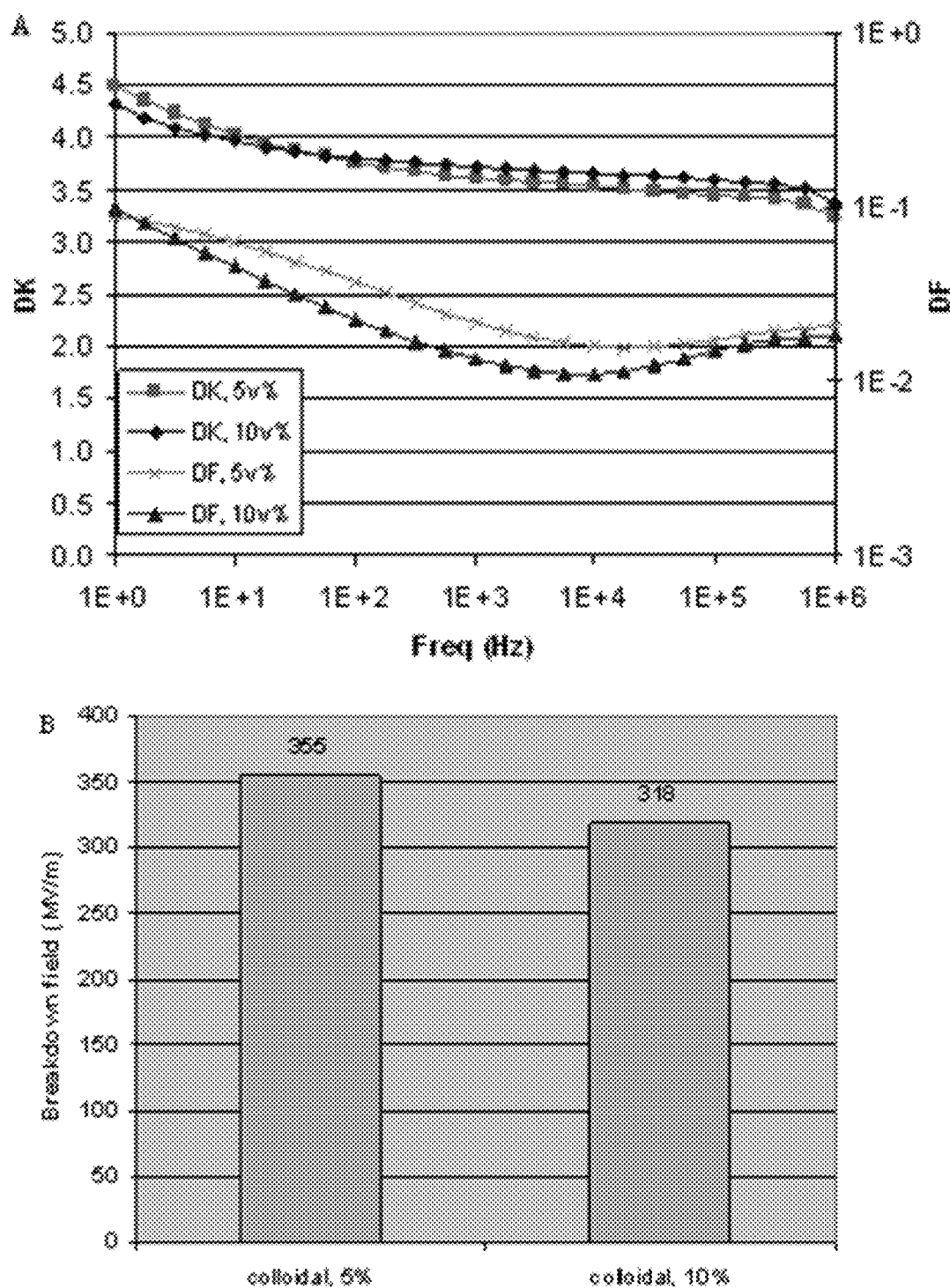
FIGS. 31A and 31B show the DK, DF and dielectric breakdown strength of nanocomposites with colloidal silica as filler in ULTEM 1000.
Figures 32A, 32B:
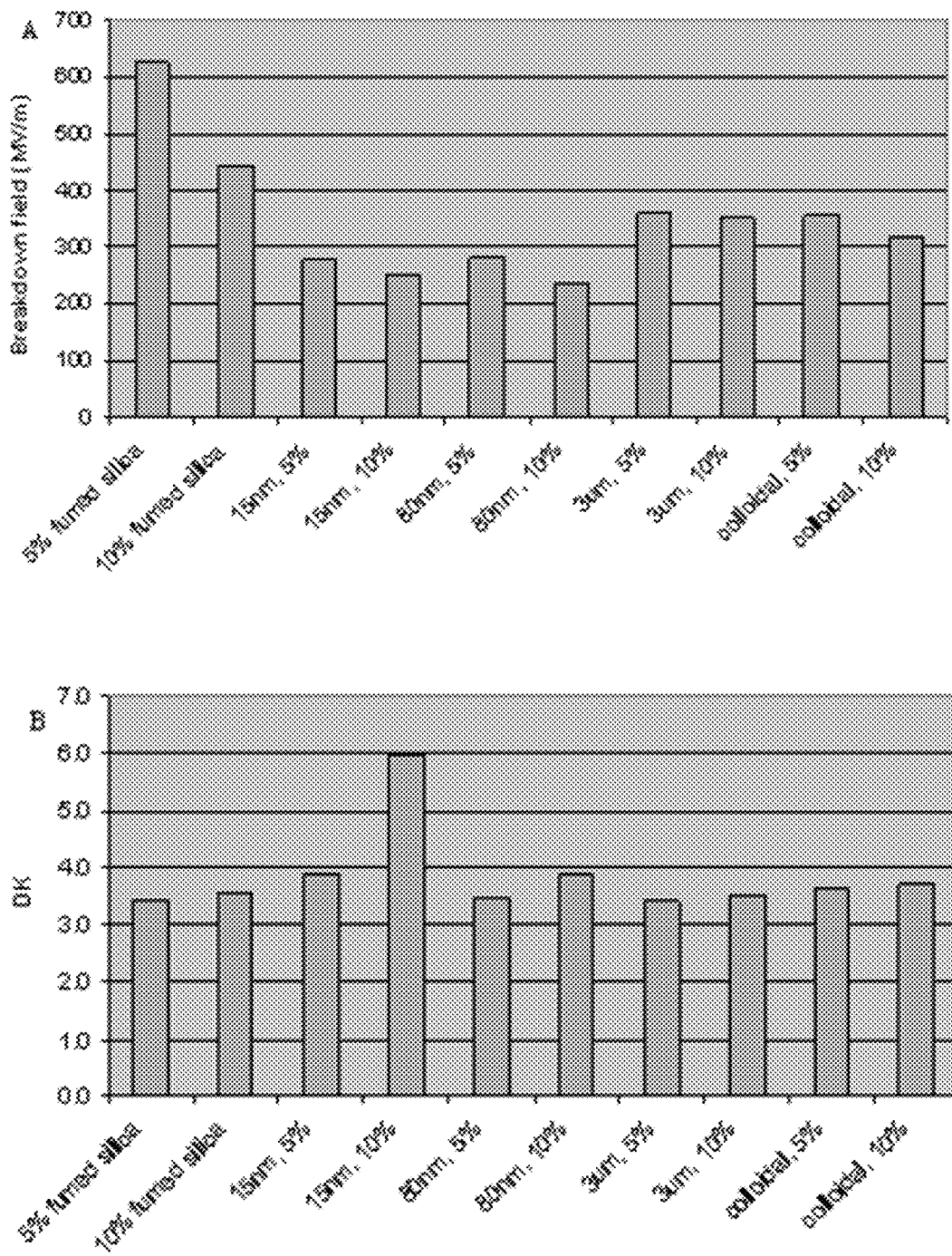
FIG. 32A-32D show the DK, DF, energy density and dielectric breakdown strength of nanocomposites with silica as filler in ULTEM 1000.
Figures 32C, 32D:
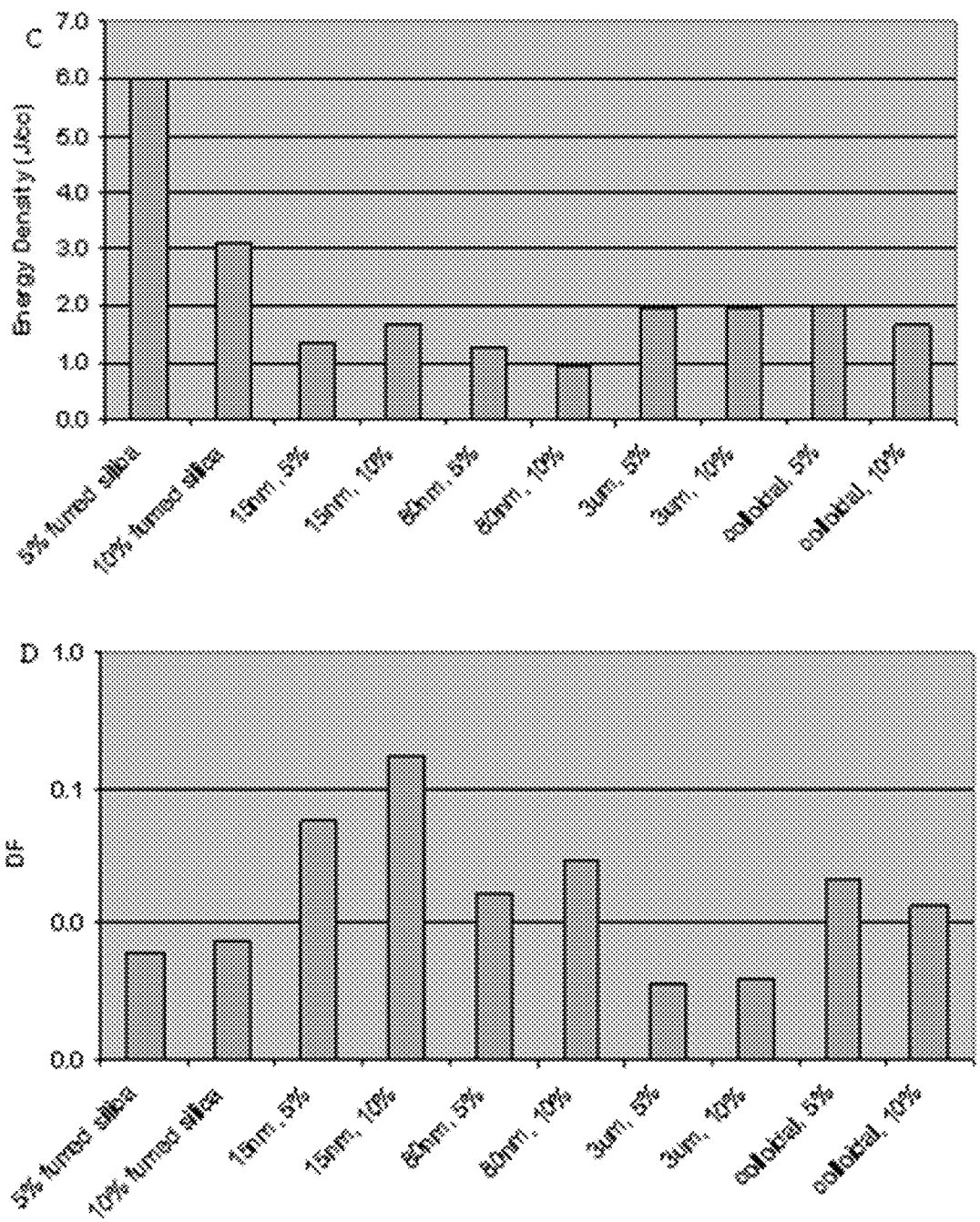
Figures 33A, 33B:
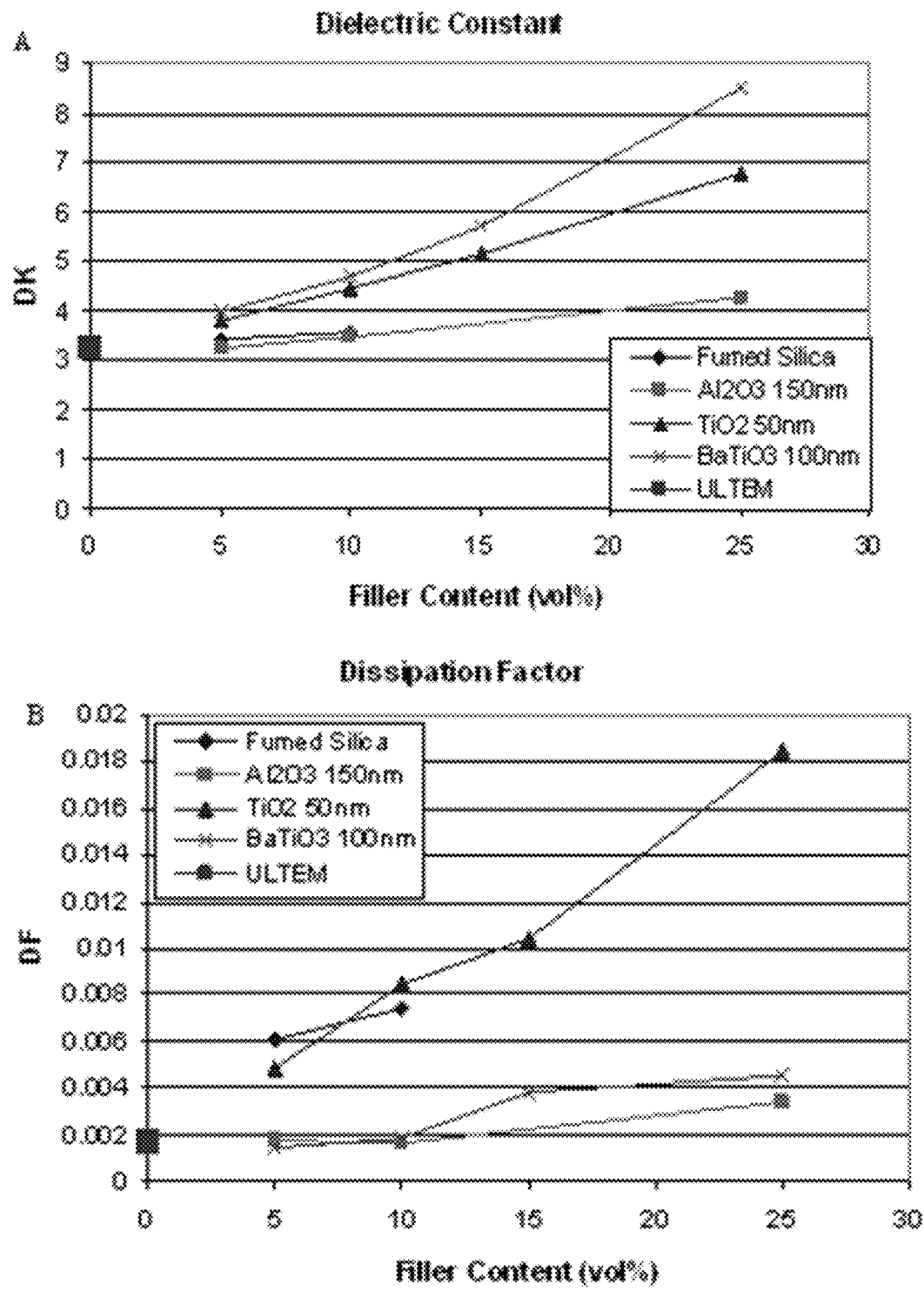
FIG. 33A-33D show the DK, DF, energy density and dielectric breakdown strength of nanocomposites with silica, $TiO_2$, $BaTiO_3$, or $Al_2O_3$ as filler in ULTEM 1000.
Figures 33C, 33D:
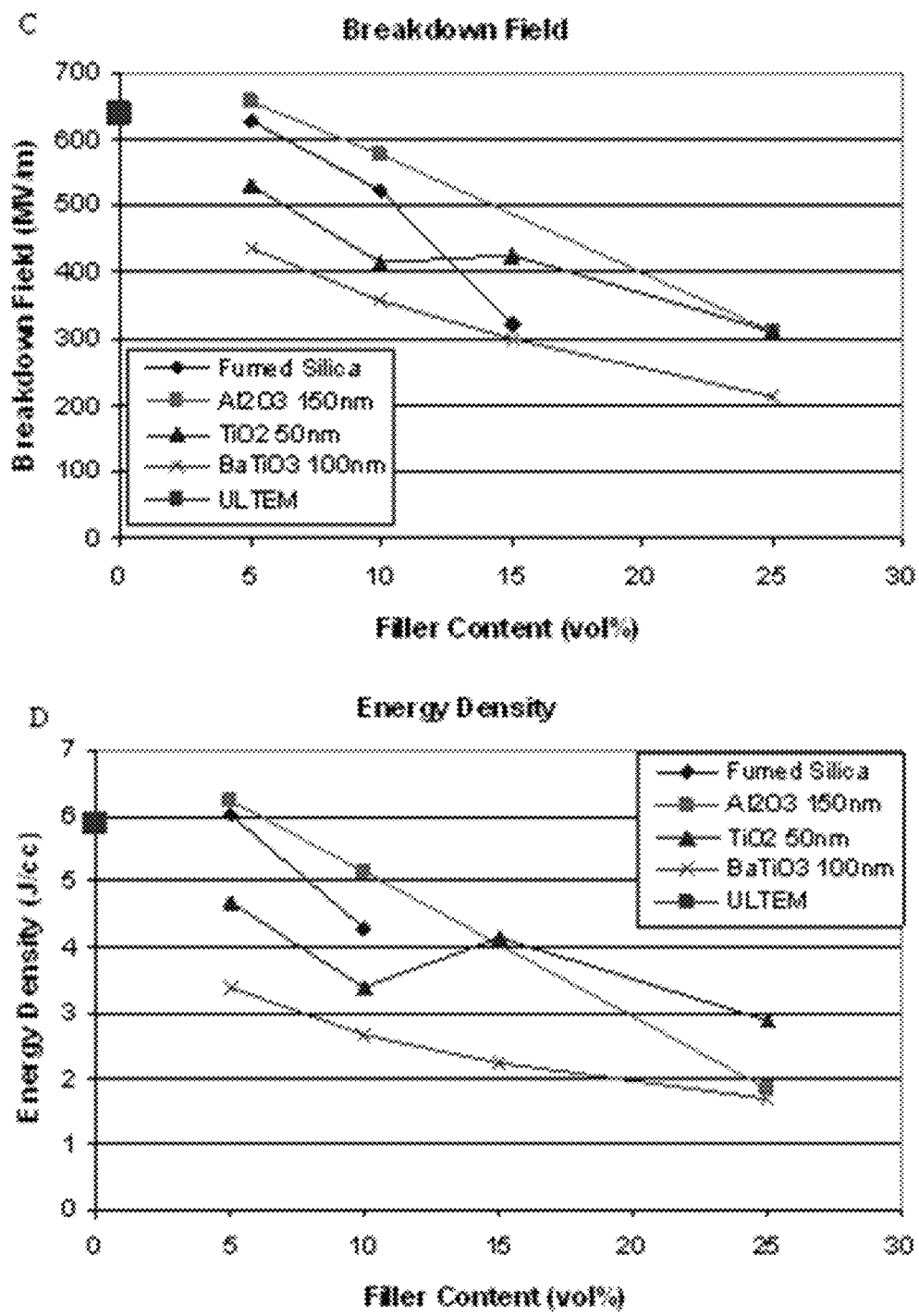

The DK, DF and breakdown strength were measured for the colloidal silica nanocomposites, see FIGS. 31A and 31B. Both the DK and DF increased at lower frequencies. The breakdown strength was lower than the control and nanocomposites with fumed silica as filler. The low breakdown strength could be due to the conduction loss of the film and the non-uniform morphology in the film.

A summary of the DK, DF, energy density and breakdown strength for all tested ULTEM-silica samples are shown in FIGS. 32A-32D. The results indicate that fumed silica composites have high energy density, low DF, high breakdown strength and good DK.

A summary of the DK, DF, energy density and breakdown strength for nanocomposites with all fillers (not limited to silica) are shown in FIGS. 33A-33D.

8. Example 7

Corona Resistance 1N Nanocomposites

Polymers, such as polyetherimides, such as ULTEM 1000, can fail fairly quickly under high voltage and are not stable under corona. By adding fillers, such as the one described herein, to the polymer, thereby forming nanocomposites, the corona resistance can increase. A filler creates a shielding layer to scatter and reflect electrons and ions produced by gaseous ionization (i.e. a plasma). High electrical conductivity reduces the magnitude of the corona effect. High thermal conductivity dissipates the heat generated by the corona effect, electrical loss. However, filler agglomeration could lead to a reduction of breakdown strength.

The corona resistance of the nanocomposites was tested at 70 MV/m, 3 KHz AC, 12.7 mm ball electrode. 8 samples of each nanocomposites were tested.

Figures 34A, 34B:
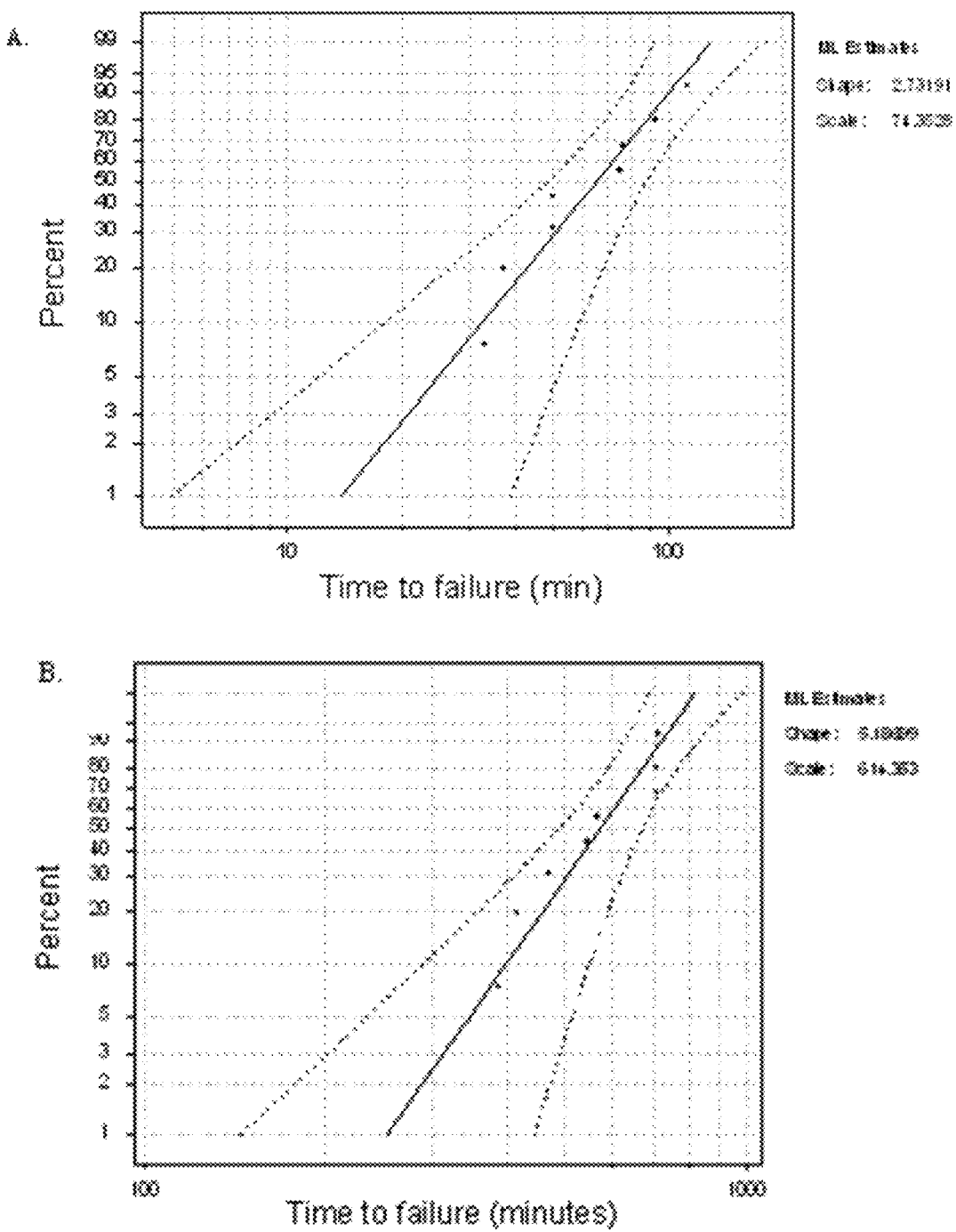
FIGS. 34A and 34B show the corona resistance of ULTEM 1000 and a nanocomposite with $Al_2O_3$ as filler in ULTEM 1000.

The corona resistance for the control (ULTEM 1000) was 74 min. The corona resistance for a nanocomposite made from ULTEM 1000 and 150 nm Alumina at 5 weight % loading had a corona resistance of 614 min (6.7 times increase in corona resistance), see FIGS. 34A and 34B.

ULTEM 1000, as before, was used as the polymer matrix in the corona resistance measurements. The corona resistance of nanocomposites having the following fillers was tested: 150 nm alumina, 50 nm titania, 100 nm barium titanate. The nanocomposites measured for their corona resistance are shown in Table 9.

TABLE 9

| Filler type | Filler volume %: | | |
|---|---|---|---|
| Al2O3, 150 nm | 5% | 10% | 25% |
| TiO2, 50 nm | 5% | 10% | 25% |
| BaTiO3, 100 nm | 5% | 10% | 25% |
| Plain ULTEM | No Filler | | |

Figures 35A, 35B:
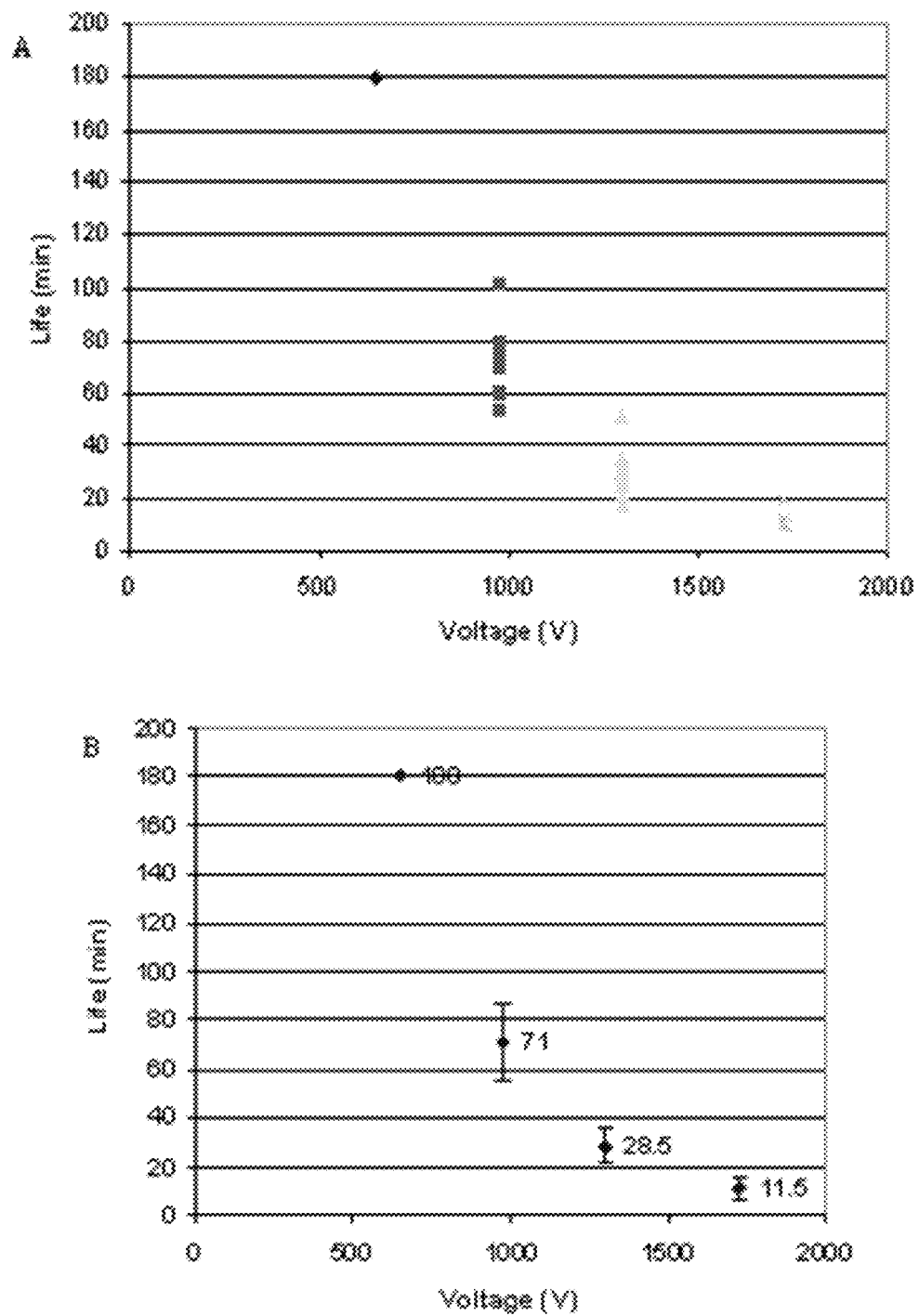
FIGS. 35A and 35B show a corona resistance test of ULTEM 1000 at different applied voltages.

Unfilled Ultem films were evaluated for corona resistance first to determine the optimum conditions of voltage level and number of samples to be used when testing the Ultem nanocomposites. Commercial 13 μm thick extruded Ultem films were evaluated for corona resistance using the following applied fields: 650V (50 MV/m), 975V (75 MV/m), 1300V (100 MV/m), and 1725 V (125 MV/m). The effect of testing 4, 8 and 16 samples was investigated. FIGS. 35A and 35B show the corona resistance of Ultem films as a function of voltage. The endurance life time is a nonlinear dependence on the applied voltage. Table 9 shows a summary of the corona resistance test for the unfilled Ultem films. As these data showed, as the voltage was increased the corona resistance of the Ultem films decreased. It was decided that 1300V was the appropriate voltage for measuring the corona resistance of the Ultem nanocomposites.

TABLE 9

| Voltage (V) | Thickness (um) | E-field at contact point (V/um) | Corona endurance life time (median) (min) | Probability of dielectric breakdown * |
|---|---|---|---|---|
| 650 | 13 | 50 | >180 | 0.0017% |
| 975 | 13 | 75 | 71 | 0.02% |
| 1300 | 13 | 100 | 28.5 | 0.11% |
| 1725 | 13 | 125 | 11.5 | 0.42% |

Figure 36:
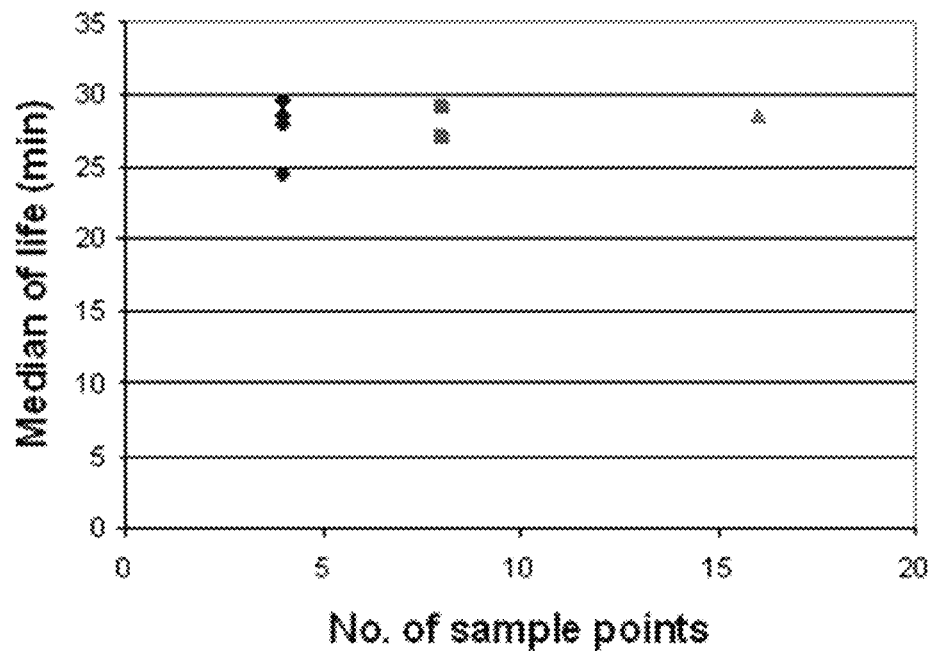
FIG. 36 shows the median life time of ULTEM 1000 at 1300V.

The effect of the number of samples tested for corona resistance at 1300 V (optimum voltage) is shown in FIG. 36. Four groups of four samples per group were tested (16 total measurements). The 16 measurements were then grouped into one group of 16 points, two groups of eight points each, and four groups of four points each. The average values of corona resistance lifetime (in minutes) for the three options were then calculated. Finally, the maximum difference between the averages for the three cases was also calculated. It was determined that 8 samples per composition was an acceptable compromise to measure the corona resistance of the nanocomposites (the average values of the two 8-sample groups differed by only 2 minutes). Table 10 shows the summary of the 16 individual measurements.

TABLE 10

| Point | Life (min) |
|---|---|
| 1 | 28 |
| 2 | 25 |
| 3 | 29 |
| 4 | 32 |
| 5 | 27 |

TABLE 10-continued

| Point | Life (min) |
|---|---|
| 6 | 29 |
| 7 | 30 |
| 8 | 33 |
| 9 | 35 |
| 10 | 25 |
| 11 | 26 |
| 12 | 30 |
| 13 | 18 |
| 14 | 21 |
| 15 | 28 |
| 16 | 51 |

Figure 37:
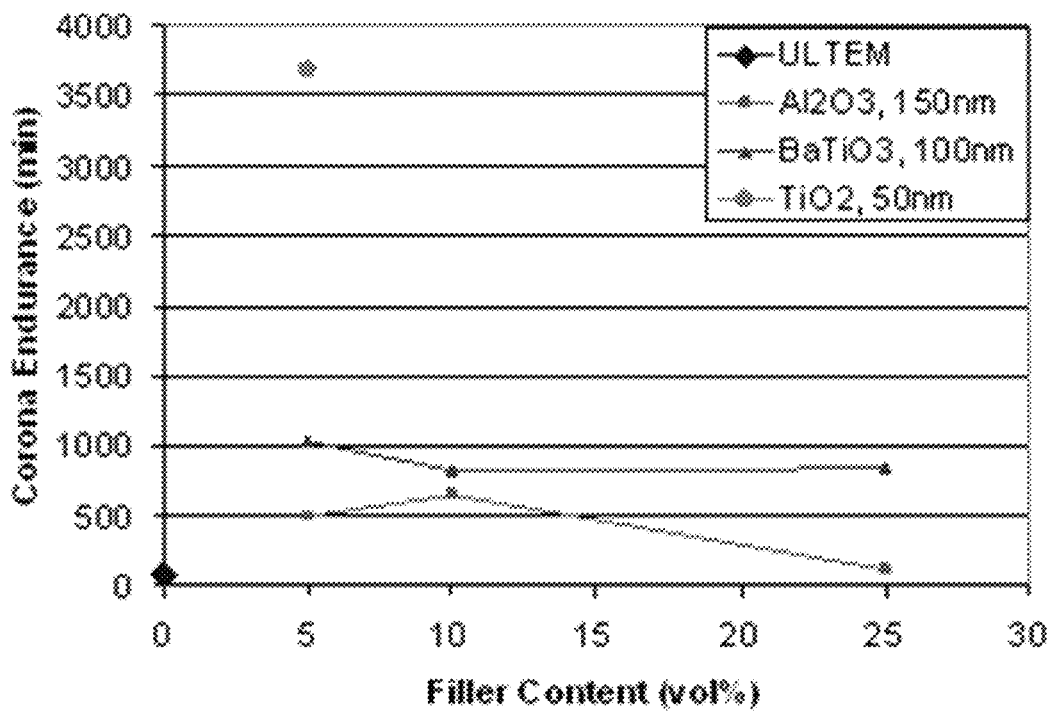
FIG. 37 shows the corona resistance of nanocomposites with $TiO_2$, $BaTiO_3$, or $Al_2O_3$ as filler in ULTEM 1000.

The corona resistance of Ultem increases significantly by adding fillers, see FIG. 37. Titania at 5% (volume) increased the corona resistance 50 times over the control. The type of filler determines the corona resistance of the nanocomposites. Smaller size fillers are typically more effective to increase the corona resistance as their packing is denser than larger fillers.

What is claimed is:

1. A dielectric nanocomposite, comprising
a continuous polymer phase comprising a polymeric material that exhibits a base corona resistance, a base dielectric constant (DK) value $K_1$, a base energy density, and a base dielectric breakdown strength; and
a dispersed particulate phase comprising a nano particulate inorganic filler material that exhibits a DK value $K_2$, wherein the value of $K_2$ is greater than $K_1$ and wherein the nano particulate inorganic filler material is dispersed within the continuous polymer phase;
wherein the nanocomposite exhibits a corona resistance that is greater than the base corona resistance of the polymeric material;
wherein the nanocomposite exhibits an energy density that is not less than 65% of the base energy density of the polymeric material; and
wherein the nanocomposite exhibits a dielectric breakdown strength that is not less than 80% of the base dielectric breakdown strength of the polymeric material.

2. The dielectric nanocomposite of claim 1, wherein the DK value $K_2$ is at least 30 times greater than the DK value $K_1$.

3. The dielectric nanocomposite of claim 1, wherein the DK value $K_2$ is at least 2 times greater than the DK value $K_1$.

4. The dielectric nanocomposite of claim 1, wherein the DK of the nanocomposite is at least 25% greater than the DK value $K_1$.

5. The dielectric nanocomposite of claim 1, wherein the DK of the nanocomposite is at least 60% greater than the DK value $K_1$.

6. The dielectric nanocomposite of claim 1, wherein the corona resistance of the nanocomposite is at least 6 times greater than the base corona resistance of the polymeric material.

7. The dielectric nanocomposite of claim 1, wherein the corona resistance of the nanocomposite is at least 12 times greater than the base corona resistance of the polymeric material.

8. The dielectric nanocomposite of claim 1, wherein the corona resistance of the nanocomposite is at least 50 times greater than the base corona resistance of the polymeric material.

9. The dielectric nanocomposite of claim 1, wherein the energy density of the nanocomposite is not less than 75% of the base energy density value of the polymeric material.

10. The dielectric nanocomposite of claim 1, wherein the dielectric breakdown strength of the nanocomposite is not less than 85% of the base dielectric breakdown strength of the polymeric material.

11. The dielectric nanocomposite of claim 1, wherein the dissipation factor (DF) of the nanocomposite is less than 1%.

12. The dielectric nanocomposite of claim 1, wherein the loading of nano particulate inorganic filler material in the nanocomposite is less than 5% by volume.

13. The dielectric nanocomposite of claim 1, wherein the loading of nano particulate inorganic filler material in the nanocomposite is at least 5% by volume.

14. The dielectric nanocomposite of claim 1, wherein the nano particulate inorganic filler material comprises $Al_2O_3$, $ZrO_2$, $TiO_2$, $SrTiO_3$, $BaTiO_3$, or fumed silica; or a combination thereof.

15. The dielectric nanocomposite of claim 14, wherein the nano particulate inorganic filler material has a size less than 900 nm.

16. The dielectric nanocomposite of claim 14, wherein the nano particulate inorganic filler material has a size between 10-200 nm.

17. The dielectric nanocomposite of claim 1, wherein the polymeric material comprises a polyetherimide, polyester, polystyrene, polyether, polyamide, polyurethane, polyethylene, polypropylene, polyethylene oxide or polyethylene glycol (PEG), polylactide, such as polylactic acid (PLA) and poly(lactic-co-glycolic acid) PLGA, polyimide, polyvinylidene fluoride (PVDF), polymethylmethacrylate (PMMA), polycarbonate, esterpolycarbonate, polysulfone, cyanated polycarbonate, cyanated polyetherimide, cyanated polysulfone, polyphenylene oxide, or polyvinyl chloride or co-polymers or mixtures thereof.

18. The dielectric nanocomposite of claim 1, wherein the polymeric material comprises

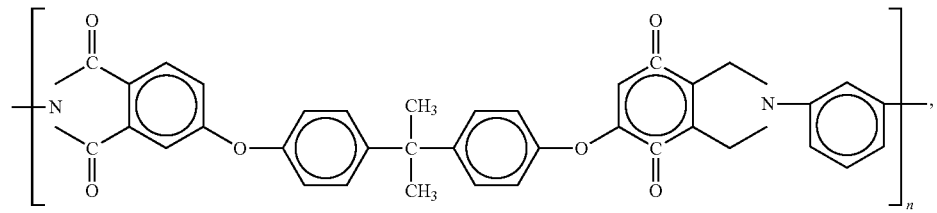

wherein n is greater than 10.

19. The dielectric nanocomposite of claim 1, further comprising an interface modifier.

20. A thin film comprising the nanocomposite material of claim 1.

21. A foam comprising the nanocomposite material of claim 1.

22. A fiber comprising the nanocomposite material of claim 1.

23. An article of manufacturer comprising a nanocomposite material of claim 1.

24. The article of manufacturer of claim 21, wherein the article is a membrane, separator, capacitor or supercapacitor.

25. A method of making a dielectric nanocomposite comprising:
providing a polymeric material that exhibits a base corona resistance, a base dielectric constant (DK) value $K_1$, a base energy density, and a base dielectric breakdown strength;
providing a nano particulate inorganic filler material that exhibits a DK value $K_2$, wherein the value of $K_2$ is greater than $K_1$; and
blending the polymeric material and the nano particulate inorganic filler under conditions effective to form a nanocomposite having a continuous phase comprising the polymeric material and a dispersed phase comprising the nano particulate inorganic filler;
wherein the formed nanocomposite exhibits a corona resistance that is greater than the base corona resistance of the polymeric material;
wherein the formed nanocomposite exhibits an energy density that is not less than 65% of the base energy density of the polymeric material; and
wherein the nanocomposite exhibits a dielectric breakdown strength that is not less than 80% of the base dielectric breakdown strength of the polymeric material.

26. The method of claim 24, wherein the DK value $K_2$ is at least 30 times greater than the DK value $K_1$.

27. The method of claim 24, wherein the DK value $K_2$ is at least 2 times greater than the DK value $K_1$.

28. The method of claim 24, wherein the DK of the nanocomposite is at least 25% greater than the DK value $K_1$.

29. The method of claim 24, wherein the DK of the nanocomposite is at least 60% greater than the DK value $K_1$.

30. The method of claim 24, wherein the corona resistance of the nanocomposite is at least 6 times greater than the base corona resistance of the polymeric material.

31. The method of claim 24, wherein the corona resistance of the nanocomposite is at least 12 times greater than the base corona resistance of the polymeric material.

32. The method of claim 24, wherein the corona resistance of the nanocomposite is at least 50 times greater than the base corona resistance of the polymeric material.

33. The method of claim 24, wherein the energy density of the nanocomposite is not less than 75% of the base energy density value of the polymeric material.

34. The method of claim 24, wherein the dielectric breakdown strength of the nanocomposite is not less than 85% of the base dielectric breakdown strength of the polymeric material.

35. The method of claim 24, wherein the formed nanocomposite exhibits a dissipation factor (DF) less than 1%.

36. The method of claim 24, wherein an amount of the nano particulate inorganic filler material is provided such that the nano particulate inorganic filler material is present in the nanocomposite in a loading amount that is at less than 5% by volume.

37. The method of claim 24, wherein an amount of the nano particulate inorganic filler material is provided such that the nano particulate inorganic filler material is present in the nanocomposite in a loading amount that is at least 5% by volume.

38. The method of claim 23, wherein the nano particulate inorganic filler material comprises $Al_2O_3$, $ZrO_2$, $TiO_2$, $SrTiO_3$, $BaTiO_3$, or fumed silica; or a combination thereof.

39. The method of claim 38, wherein the nano particulate inorganic filler material has a particle size less than 900 nm.

40. The method of claim 38, wherein the nano particulate inorganic filler material has a particle size between 10-200 nm.

41. The method of claim 24, wherein the polymeric material comprises a polyetherimide, polyester, polystyrene, polyether, polyarnide, polyurethane, polyethylene, polypropylene, polyethylene oxide or polyethylene glycol (PEG), polylactide, such as polylactic acid (PLA) and poly(lactic-co-glycolic acid) PLGA, polyimide, polyvinylidene fluoride (PVDF), polymethylmethacrylate (PMMA), polycarbonate, esterpolycarbonate, polysulfone, cyanated polycarbonate, cyanated polyetherimide, cyanated polysulfone, polyphenylene oxide, or polyvinyl chloride, or co-polymers or mixtures thereof.

42. The method of claim 24, wherein the blending conditions effective to form the nanocomposite comprise:
forming a solvent system by (i) dispersing the provided nano particulate inorganic filler material in a solvent; and (ii) dissolving the polymeric material in the solvent; and
casting the nanocomposite material from the formed solvent system.

43. The method of claim 24, wherein the blending conditions effective to form the nanocomposite comprise: feeding a polymer and a particulate filler to a mixer, such as an extruder of the single- or twin-screw type, melting the polymer by the action of the screw, dispersing the filler into the polymer to form a homogeneous dispersion, and pumping the composite material out of the extruder to form the melt into strands or films.

* * * * *